United States Patent
Sato

(10) Patent No.: US 9,531,955 B2
(45) Date of Patent: Dec. 27, 2016

(54) INFORMATION PROCESSING DEVICE, INFORMATION PROCESSING SYSTEM, AND STORAGE MEDIUM STORING PROGRAM

(71) Applicant: Sony Corporation, Tokyo (JP)

(72) Inventor: Tatsuhito Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 14/280,766

(22) Filed: May 19, 2014

(65) Prior Publication Data

US 2014/0375860 A1 Dec. 25, 2014

(30) Foreign Application Priority Data

Jun. 21, 2013 (JP) .................................. 2013-130504

(51) Int. Cl.
*H04N 5/232* (2006.01)

(52) U.S. Cl.
CPC ...... *H04N 5/23293* (2013.01); *H04N 5/23216* (2013.01); *H04N 5/23219* (2013.01)

(58) Field of Classification Search
CPC ............ H04N 5/23293; H04N 5/23216; H04N 5/23219; H04N 1/00336; H04N 21/44218; H04N 21/4223; G06K 9/00221; G06K 2209/17; G06T 2207/30201; G06T 2207/30128; G06F 17/30793; A61B 5/1176

See application file for complete search history.

(56) References Cited

U.S. PATENT DOCUMENTS

| | | | | |
|---|---|---|---|---|
| 2007/0160294 A1* | 7/2007 | Asano | ..... | G06K 9/72 382/190 |
| 2009/0074258 A1* | 3/2009 | Cotgreave | ..... | G06K 9/00221 382/118 |
| 2010/0111383 A1* | 5/2010 | Boushey | ..... | G06K 9/78 382/128 |
| 2011/0182482 A1* | 7/2011 | Winters | ..... | G06F 17/30256 382/116 |
| 2011/0182485 A1* | 7/2011 | Shochat | ..... | G06K 9/00221 382/118 |
| 2012/0096405 A1* | 4/2012 | Seo | ..... | G06F 3/04886 715/825 |
| 2012/0135384 A1* | 5/2012 | Nakao | ..... | G09B 19/0092 434/127 |
| 2013/0113933 A1* | 5/2013 | Boushey | ..... | A23L 1/293 348/143 |
| 2013/0121540 A1* | 5/2013 | Garcia | ..... | G06K 9/00288 382/118 |
| 2013/0262588 A1* | 10/2013 | Barak | ..... | H04L 67/22 709/204 |

FOREIGN PATENT DOCUMENTS

JP 2004-118562 4/2004

* cited by examiner

*Primary Examiner* — Jason Flohre
(74) *Attorney, Agent, or Firm* — Oblon, McClelland, Maier & Neustadt, L.L.P.

(57) ABSTRACT

There is provided an information processing device including an image obtaining unit configured to obtain an image including a plurality of objects, and a display control unit configured to, after an operation has been performed on a first object of the plurality of objects, control identification information associated with a second object, the identification information indicating the second object.

18 Claims, 47 Drawing Sheets

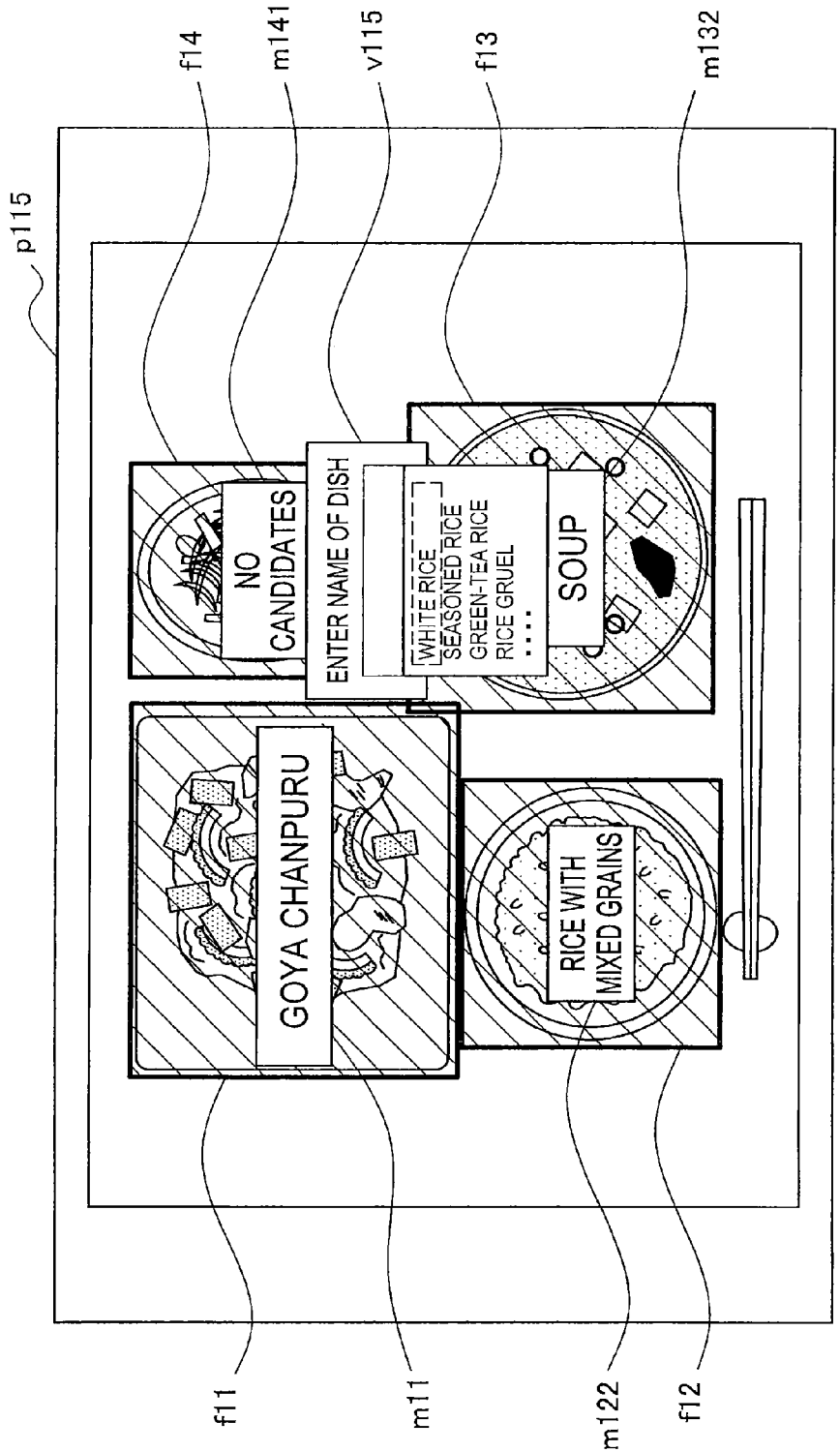

FIG. 10 d11

| NAME | ATTRIBUTE | VALUE RANGE |
|---|---|---|
| LOCATION OF REGION | x | [ 0.0 , 1.0 ] |
| | y | [ 0.0 , 1.0 ] |
| SIZE OF REGION | width | [ 0.0 , 1.0 ] |
| | height | [ 0.0 , 1.0 ] | d111 — d112 — d113

FIG. 12 d13

| NAME | CLASS | VALUE RANGE |
|---|---|---|
| | d131 d12 d132 | |
| DISH | RICE | [ -1.0 , 1.0 ] |
| | RICE BOWL DISH | [ -1.0 , 1.0 ] |
| | MISO SOUP | [ -1.0 , 1.0 ] |
| | WESTERN SOUP | [ -1.0 , 1.0 ] |
| | UDON | [ -1.0 , 1.0 ] |
| | SOBA | [ -1.0 , 1.0 ] |
| | RAMEN | [ -1.0 , 1.0 ] |
| | PASTA | [ -1.0 , 1.0 ] |
| | MEAT DISH | [ -1.0 , 1.0 ] |
| | FISH DISH | [ -1.0 , 1.0 ] |
| | VEGETABLE DISH | [ -1.0 , 1.0 ] |
| | SALAD | [ -1.0 , 1.0 ] |
| | FRUIT | [ -1.0 , 1.0 ] |
| | DESSERT | [ -1.0 , 1.0 ] |
| | DRINK | [ -1.0 , 1.0 ] |
| | BENTO | [ -1.0 , 1.0 ] |

FIG. 22
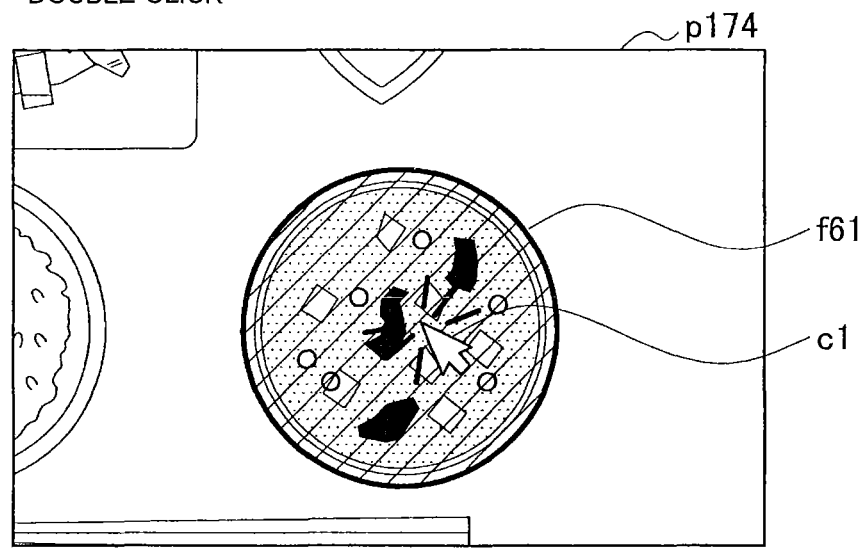
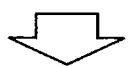
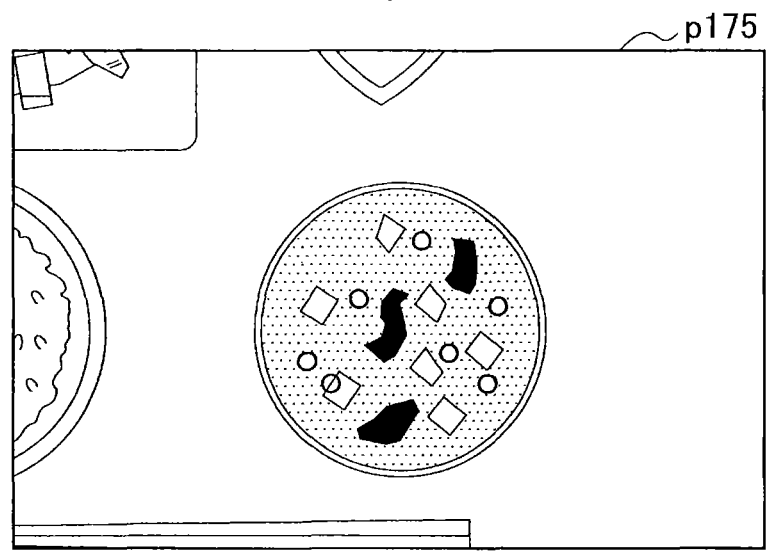

FIG. 26
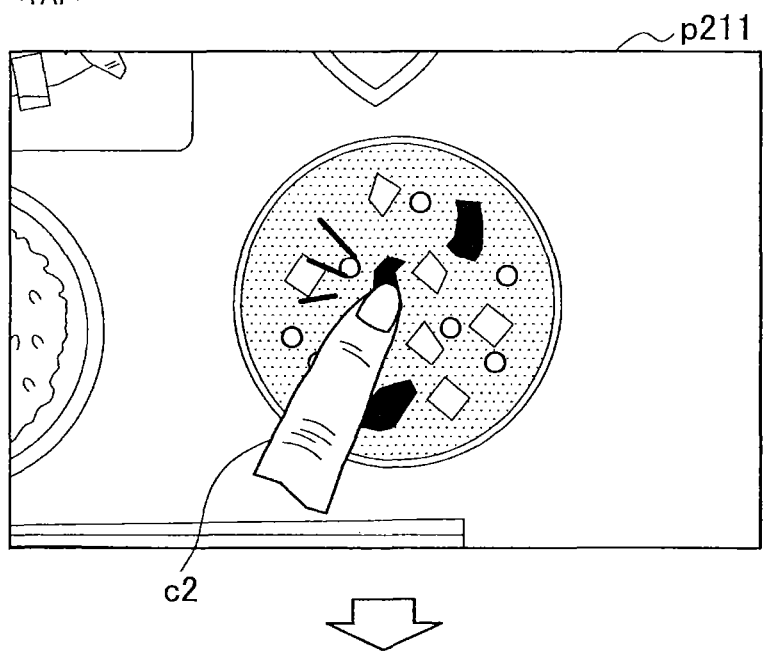
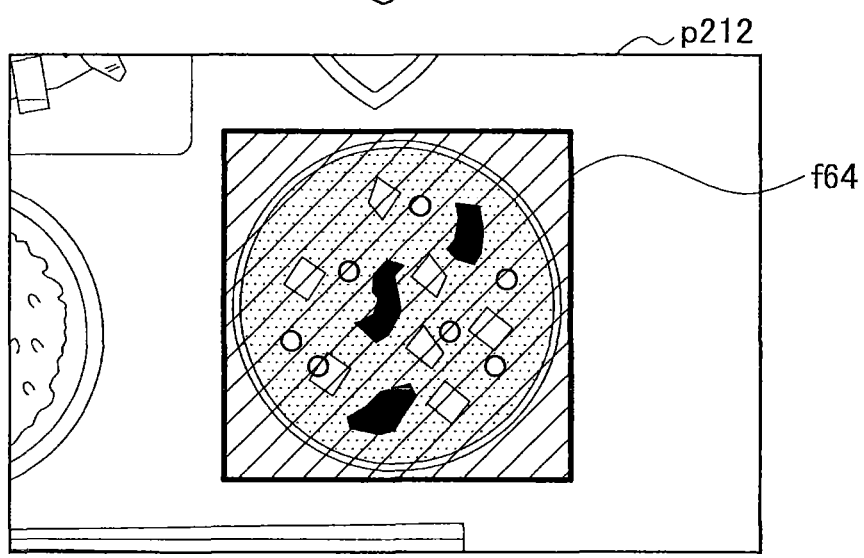

FIG. 29
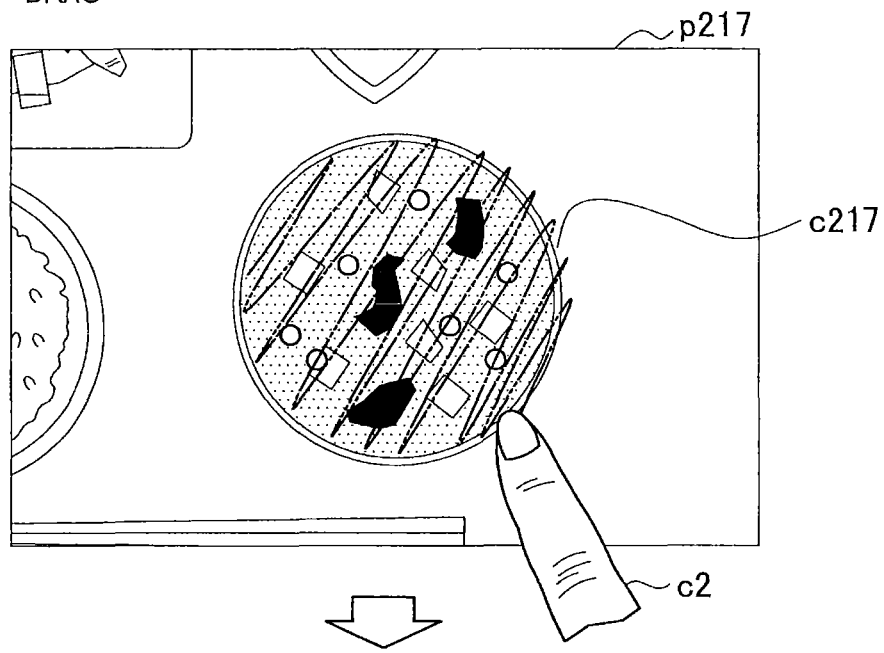
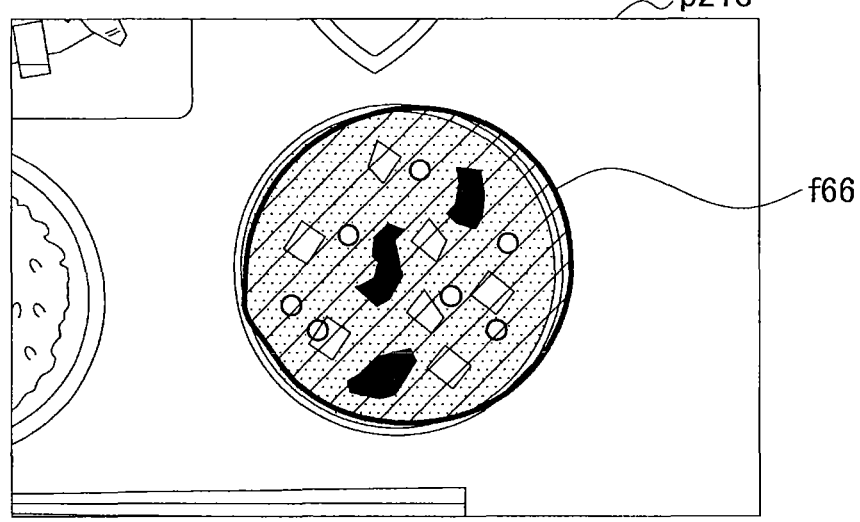

FIG. 30
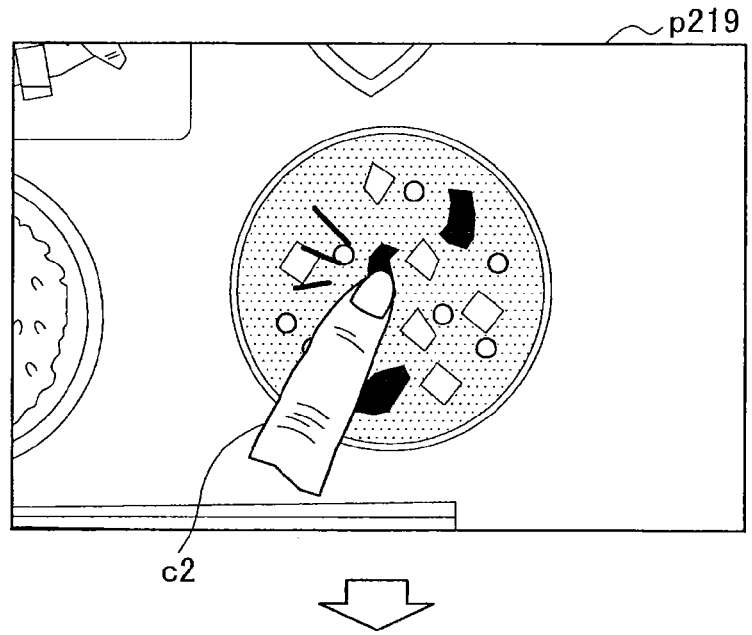
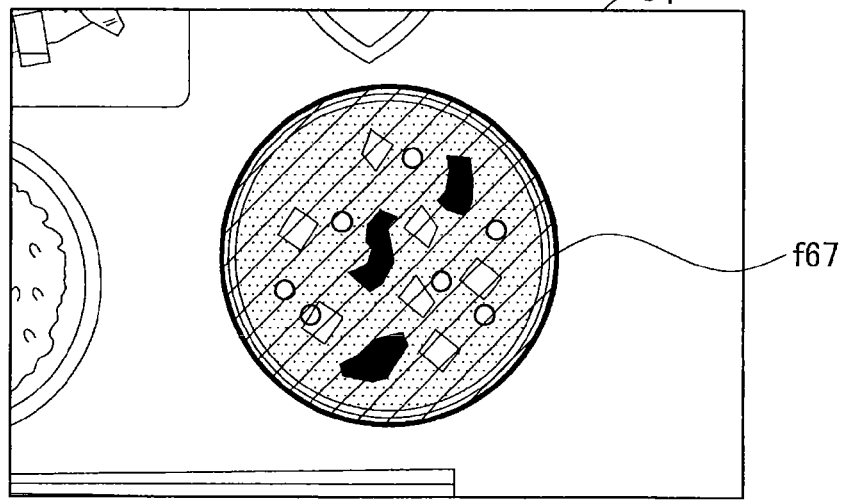

FIG. 33
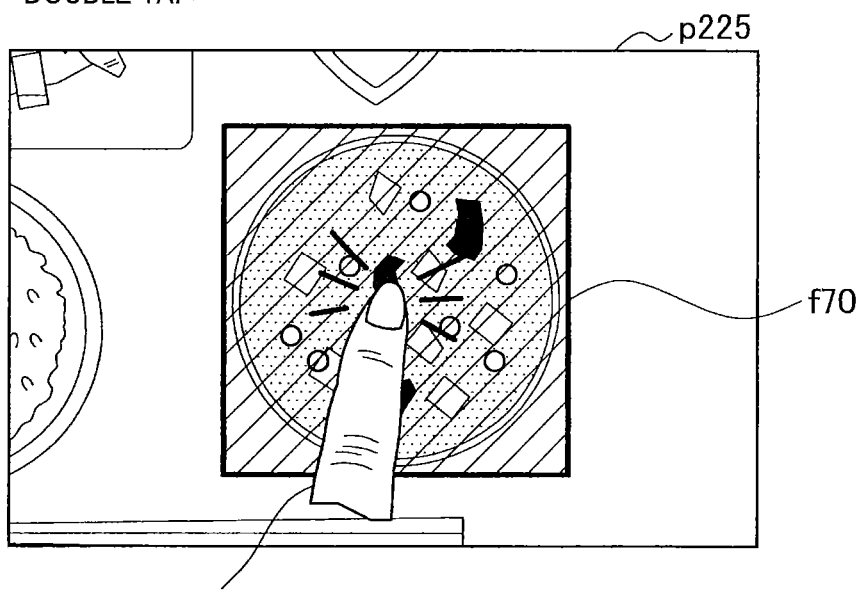
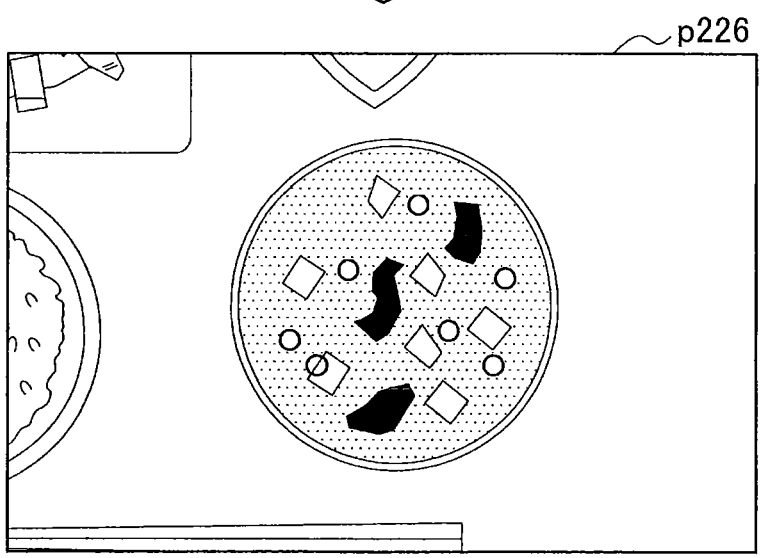

FIG. 39

| ICON | IDENTIFICATION SCORE |
|---|---|
| v51a | 0.75~ |
| v51b | 0.5~0.75 |
| v51c | 0.25~0.5 |
| v51d | ~0.25 |

INFORMATION PROCESSING DEVICE, INFORMATION PROCESSING SYSTEM, AND STORAGE MEDIUM STORING PROGRAM

CROSS REFERENCE TO RELATED APPLICATIONS

This application claims the benefit of Japanese Priority Patent Application JP 2013-130504 filed Jun. 21, 2013, the entire contents of which are incorporated herein by reference.

BACKGROUND

The present disclosure relates to information processing devices, information processing systems, and storage media storing programs.

Image analysis technology has been used to recognize an object captured in an image. Such a recognition technique has, for example, allowed for an information processing system which receives an image of a desired object, recognizes the object in the image, and identifies the recognized object, to obtain information about the identified object (for example, see JP 2004-118562A).

SUMMARY

On the other hand, different objects may have similar external appearances, it may be difficult to uniquely identify each object only by image analysis. To address such a case where it is difficult to uniquely identify an object by image analysis, an information processing system has been disclosed in which the user is allowed to set identification information indicating an object in an image, for example. In such an information processing system, after the user has set the identification information, information associated with the identification information may be obtained as information about the object.

However, it takes time and effort for the user to set identification information for an object in an image. Such time and effort increases with an increase in the number of images to be processed.

With the above circumstances in mind, the present disclosure proposes an information processing device, information processing, and program storage medium which can facilitate setting of identification information for an object in an image.

According to an embodiment of the present disclosure, there is provided an information processing device which includes an image obtaining unit configured to obtain an image including a plurality of objects, and a display control unit configured to, after an operation has been performed on a first object of the plurality of objects, control identification information associated with a second object, the identification information indicating the second object.

According to another embodiment of the present disclosure, there is provided an information processing system which includes a terminal including a display unit, and a server including an image obtaining unit configured to obtain an image including a plurality of objects, and a display control unit configured to display the image on the display unit. After an operation has been performed on a first object of the plurality of objects, the display control unit controls identification information associated with a second object, the identification information indicating the second object.

According to another embodiment of the present disclosure, there is provided a non-transitory computer-readable storage medium having a program stored therein, the program causing a computer to execute obtaining an image including a plurality of objects, and after an operation has been performed on a first object of the plurality of objects, controlling identification information associated with a second object, the identification information indicating the second object.

As described above, according to the present disclosure, a novel and improved information processing device, information processing, and program storage medium are provided which can facilitate setting of identification information for an object in an image.

BRIEF DESCRIPTION OF THE DRAWINGS

FIG. 3B is a diagram for describing an example operation of setting identification information for an object in an image;

FIG. 10 is a diagram for describing example data indicating a region set in an image;

FIG. 12 is a diagram for describing example data indicating a correctness of the result of identification of an object in an image;

FIG. 22 is a diagram for describing an example method for specifying a region according to Example 1;

FIG. 26 is a diagram for describing an example method for specifying a region according to Example 2;

FIG. 29 is a diagram for describing an example method for specifying a region according to Example 2;

FIG. 30 is a diagram for describing an example method for specifying a region according to Example 2;

FIG. 33 is a diagram for describing an example method for specifying a region according to Example 2;

FIG. 39 is a diagram for describing an example display form according to Example 3;

DETAILED DESCRIPTION OF THE EMBODIMENT(S)

Figure 1:
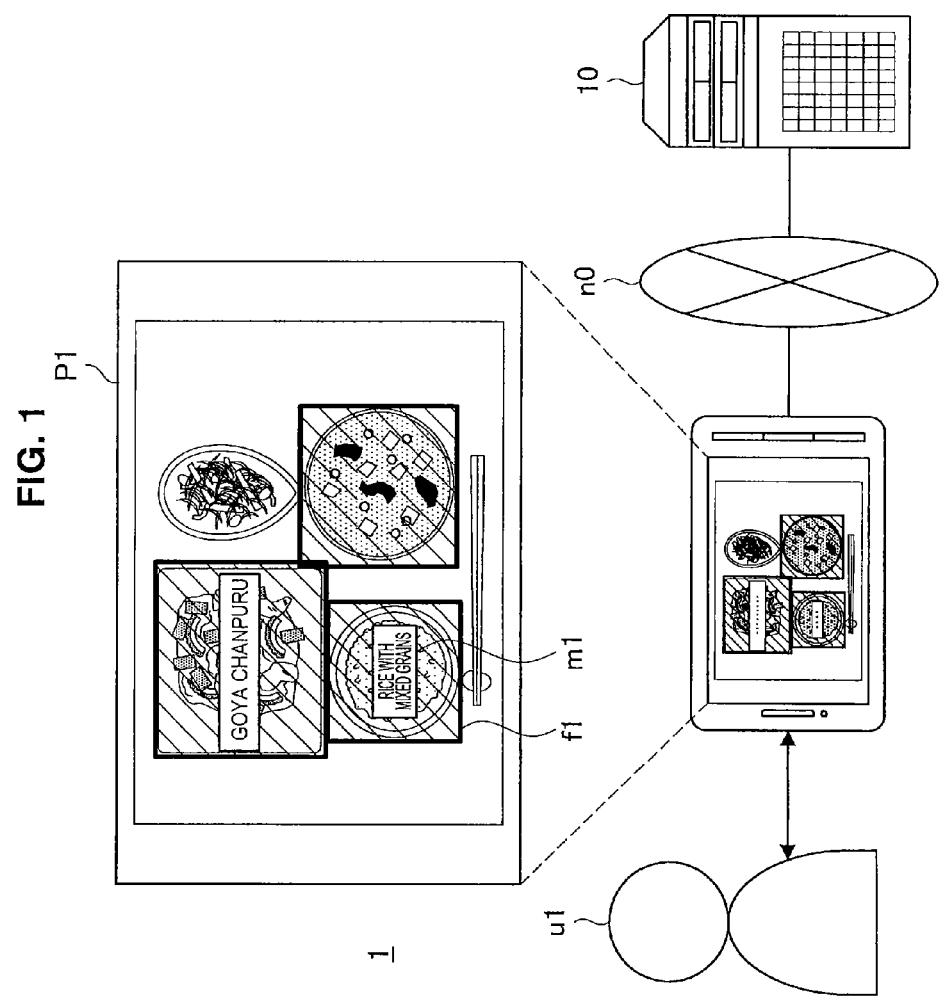
FIG. 1 is a diagram schematically showing a system configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First Embodiment
   1. 1. Overview
   1. 2. Configuration
   1. 3. Process
   1. 4. Example 1: Method for Specifying Area (Pointer Operation)
   1. 5. Example 2: Method for Specifying Area (Touchscreen)
   1. 6. Example 3: Method for Displaying Identification Information
   1. 7. Summary
2. Second Embodiment
   2. 1. Overview
   2. 2. Process
3. Hardware Configuration <1. First Embodiment>

[1. 1. Overview]

Firstly, an overview of an information processing system 1 according to a first embodiment of the present disclosure will be described with reference to FIG. 1. FIG. 1 is a diagram schematically showing a system configuration of the information processing system 1 of the first embodiment of the present disclosure. As shown in FIG. 1, the information processing system 1 of this embodiment includes an information processing device 10 and a user terminal 20. The information processing device 10 and the user terminal 20 are connected together by a network n0. Examples of the network n0 include the Internet, a dedicated line, a local area network (LAN), a wide area network (WAN), etc. Thus, the network n0 may be any network that can connect different devices together.

As shown in FIG. 1, in the information processing system 1 of this embodiment, a user U1 captures an image of a desired object using an image capture unit provided in the user terminal 20, such as a smartphone etc., and transmits the image to the information processing device 10. The information processing device 10, when receiving the image from the user terminal 20, recognizes and identifies the object captured in the image, and presents the result of the identification of the object to the user U1. As a specific example, the information processing device 10 performs an image analysis process on the obtained image to specify a region f1 of the object in the image, and presents identification information m1, such as a label etc., which indicates the result of the identification of the object, over the specified region f1, in association with the region f1.

On the other hand, different objects which are captured in an image may have similar external appearances, and it may be difficult for the information processing system 1 to uniquely identify each object in an image by an image analysis process. To overcome such a situation, the information processing system 1 provides a user interface (U/I) for specifying the region f1 corresponding to the object in the image or the identification information m1 indicating the object.

However, it takes time and effort for the user U1 to set identification information for an object in an image. Therefore, in the description that follows, problems which are solved by the information processing system 1 of this embodiment will be firstly summarized while describing an example operation which is performed in an information processing system according to a comparative example when identification information is set for an object in an image, with reference to FIGS. 2, 3A, and 3B. Next, an overview of the information processing system 1 of this embodiment will be described with reference to FIGS. 4, 5A, and 5B.

Note that, in the description that follows, the information processing system 1 of this embodiment will be described, assuming that the information processing system 1 recognizes dishes captured in an image, and presents labels indicating the recognized dishes as identification information. Note that the present disclosure is not limited to a dish, and is applicable to any object that can be captured in an image and can be recognized and then identified.

Figure 2:
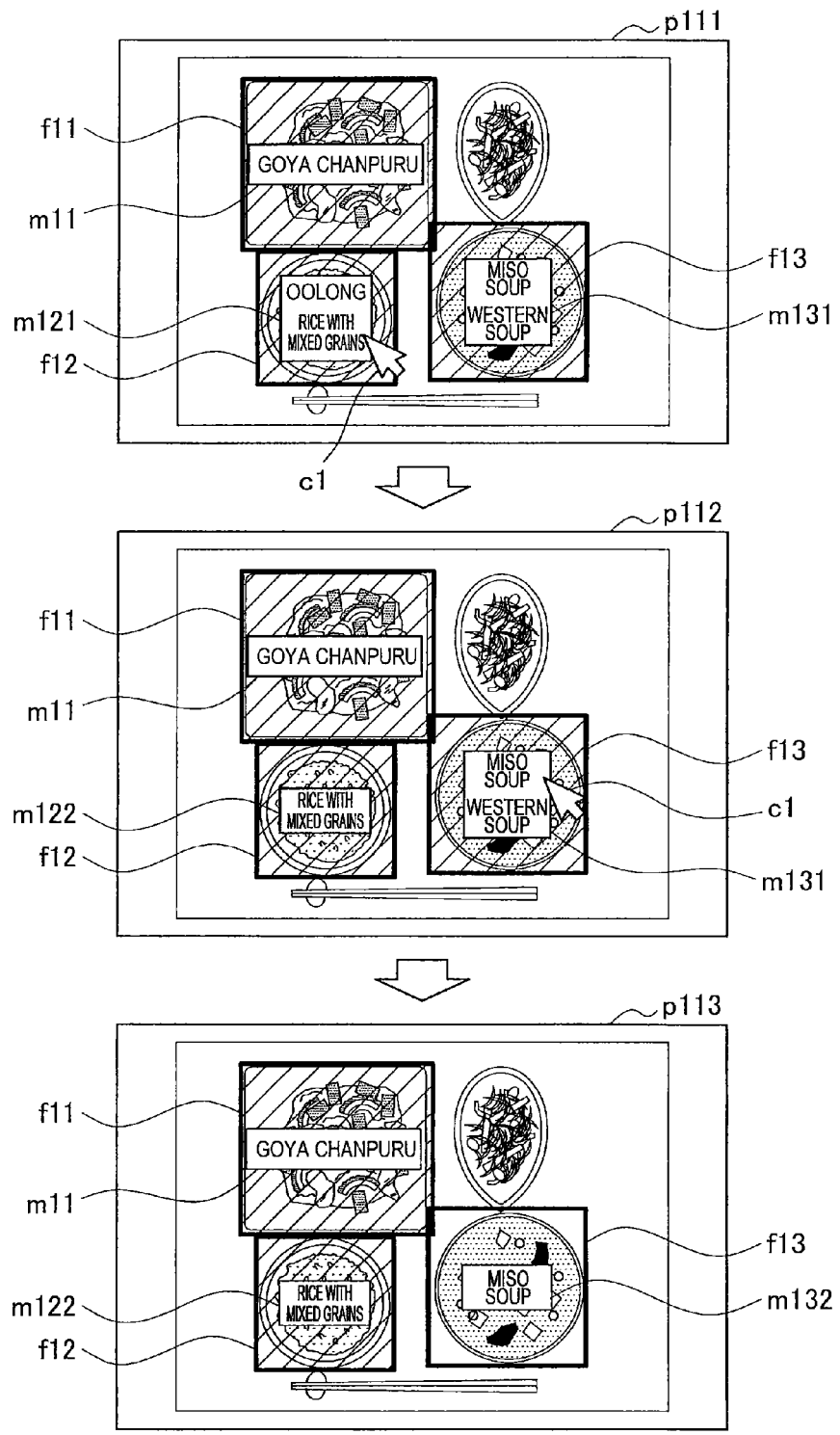
FIG. 2 is a diagram for describing an example operation of setting identification information for an object in an image.

Firstly, refer to FIG. 2. FIG. 2 is a diagram for describing an example operation of setting identification information for an object in an image, showing an example operation which is performed when a plurality of candidates are extracted as the result of recognition of the object.

Firstly, refer to an image p111. In the image p111, four dishes have been captured as objects, and three of the four dishes have been each recognized as a dish, and regions f11 to f13 have been set for the three recognized dishes, respectively.

The region f11 has been associated with identification information m11 indicating "goya chanpuru (a Japanese stir fry dish)" as identification information for a corresponding dish. On the other hand, an object corresponding to the region f12 has not been uniquely identified. The region f12 has been associated with identification information m121 indicating a plurality of candidates (i.e., "oolong" and "rice with mixed grains") for the result of the recognition of the object. Similarly, an object corresponding to the region f12 has not been uniquely identified. The region f13 has been associated with identification information m131 indicating a plurality of candidates (i.e., "miso soup" and "western soup").

Here, it is assumed that, by operating, for example, a cursor c1 with respect to the image p111 of FIG. 2, the user U1 selects, from the candidates shown as the identification information m121, "rice with mixed grains" as identification information indicating the object in the region f12. An image p112 shows a situation that "rice with mixed grains" has been selected from the candidates indicated as the identification information m121 in the image p111. In this case, the information processing system of the comparative example recognizes the object shown in the region f12 as "rice with mixed grains" according to the selection by the user U1, and associates the region f12 with identification information m122 indicating "rice with mixed grains" as shown in the image p112.

Next, refer to the image p112. Here, it is assumed that, by operating, for example, the cursor c1, the user U1 selects, from the candidates indicated as the identification information m131, "miso soup" as identification information indicating the object shown in the region f13. An image p113 shows a situation that "miso soup" has been selected from the candidates indicated as the identification information m131 in the image p112. In this case, the information processing system of the comparative example recognizes the object shown in the region f13 as "miso soup" according to the selection by the user U1, and associates the region f13 with identification information m132 indicating "miso soup" as shown in the image p113.

Thus, in the regions f12 and f13 in which the objects have previously not been uniquely identified, the identification information m122 and m132 indicating the objects captured in the regions are set, respectively.

Figure 3A:
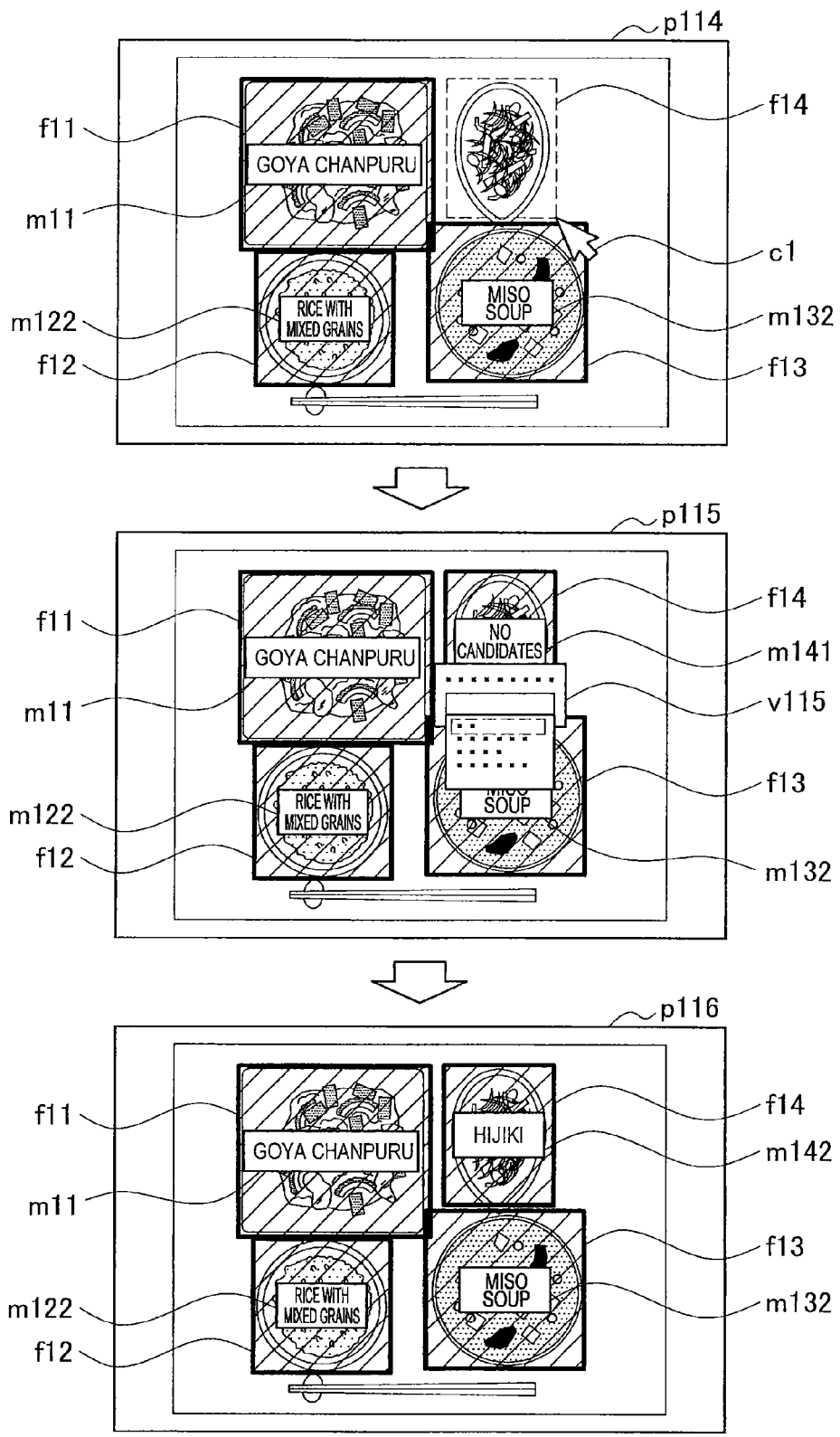
FIG. 3A is a diagram for describing an example operation of setting identification information for an object in an image.

Next, refer to FIG. 3A. FIG. 3A is a diagram for describing an example operation of setting identification information for an object in an image, showing an example operation of specifying a region in which an object has previously not been recognized, and setting identification information for the object.

Firstly, refer to an image p114. In the image p114, the regions f11, f12, and f13 have been associated with the identification information m11, m122, and m132 which uniquely identify the respective objects in the respective regions. On the other hand, one of the four captured dishes has not been recognized. Therefore, a procedure in the information processing system of the comparative example will now be described for setting a region f14 showing an object which has not been recognized as a dish, in the image p114, and setting identification information for the region f14.

The user U1 specifies a region for an object which has previously not been recognized, by operating, for example, the cursor c1. After the region has been specified, the information processing system of the comparative example sets the specified region as the region f14. After having set the region f14, the information processing system of the comparative example performs an image analysis process on the region f14 in the image p114 to try to identify an object included in the region f14. Here, it is assumed that the information processing system of the comparative example has failed to identify the object in the region f14.

Next, refer to an image p115. The image p115 shows a situation that the region f14 has been set, and it is difficult to identify the object included in the region f14. Note that, in the image p115, identification information m141 is set which indicates that the object in the region f14 has not been identified. In this case, the information processing system of the comparative example displays a setting screen v115 for setting identification information which is specified by the user U1 according to the identification information m141.

Here, refer to FIG. 3B. FIG. 3B is a diagram for describing an example operation of setting identification information for an object in an image, particularly showing details of the image p115 of FIG. 3A. As shown in FIG. 3B, the setting screen v115 may have an input field for allowing the user to input identification information, or a U/I for presenting a list of candidates and setting one selected from the candidate list as identification information.

Here, refer to an image p116 of FIG. 3A. The image p116 shows a situation that, in the image p115, based on an operation using the setting screen v115, "hijiki (a sea vegetable)" has been set as identification information for the object in the region f14. In this case, according to the identification information input by the user U1, the information processing system of the comparative example recognizes that the object shown in the region f14 is "hijiki," and associates the region f14 with identification information m142 indicating "hijiki" as shown in the image p116.

As described above, in the information processing system of the comparative example, when it is difficult to uniquely identify an object captured in an image or when it is difficult to recognize an object in an image, it is necessary that the user U1 set identification information for individual regions corresponding to respective objects, and it takes time and effort to do so.

To overcome such a problem, in the information processing system 1 of this embodiment, when identification information is specified for an object in an image, another object(s) that co-occurs with that object with a high probability is estimated (guessed or suggested). By estimating other objects in this manner, the information processing system 1 of this embodiment removes or simplifies the operation of setting identification information for those other objects, thereby simplifying the procedure of setting identification information for regions corresponding to the respective objects. Note that the probability with which objects co-occur with each other may be hereinafter referred to as a "co-occurrence probability."

The co-occurrence probability will now be described. The co-occurrence probability refers to a probability with which an object and another object co-occur with each other, for example, two objects coexist. The information processing system 1 may also define the co-occurrence probability, for example, as a probability with which when an object is captured in an image, another object is captured along with that object. Note that the "co-occurrence" in this case is not limited to "co-occurrence" which is used in the field of natural language processing. As a specific example, when objects are dishes, the "co-occurrence probability" may refer to a probability with which when a dish is selected, another dish is or is not selected along with that dish based on whether or not these dishes go well together (e.g., the dishes taste good together). In other words, the "co-occurrence probability" is a probability with which when a dish is captured in an image, another dish is captured along with that dish in the image, where these dishes are provided in a single meal. Note that the present disclosure is, of course, not limited to a dish. For example, when objects are humans, the "co-occurrence probability" may refer to a probability with which when a human is captured in an image, another human is captured along with that human in the image. Such a co-occurrence probability between an object and another object may be set based on a relationship between these objects, a predetermined logic, or may be empirically obtained by analyzing images which have previously been captured.

Next, an overview of the information processing system 1 of this embodiment will be described with reference to FIGS. 4, 5A, and 5B, particularly an example where identification information is set for dishes captured in an image as in the above description with reference to FIGS. 2, 3A, and 3B.

Figure 4:
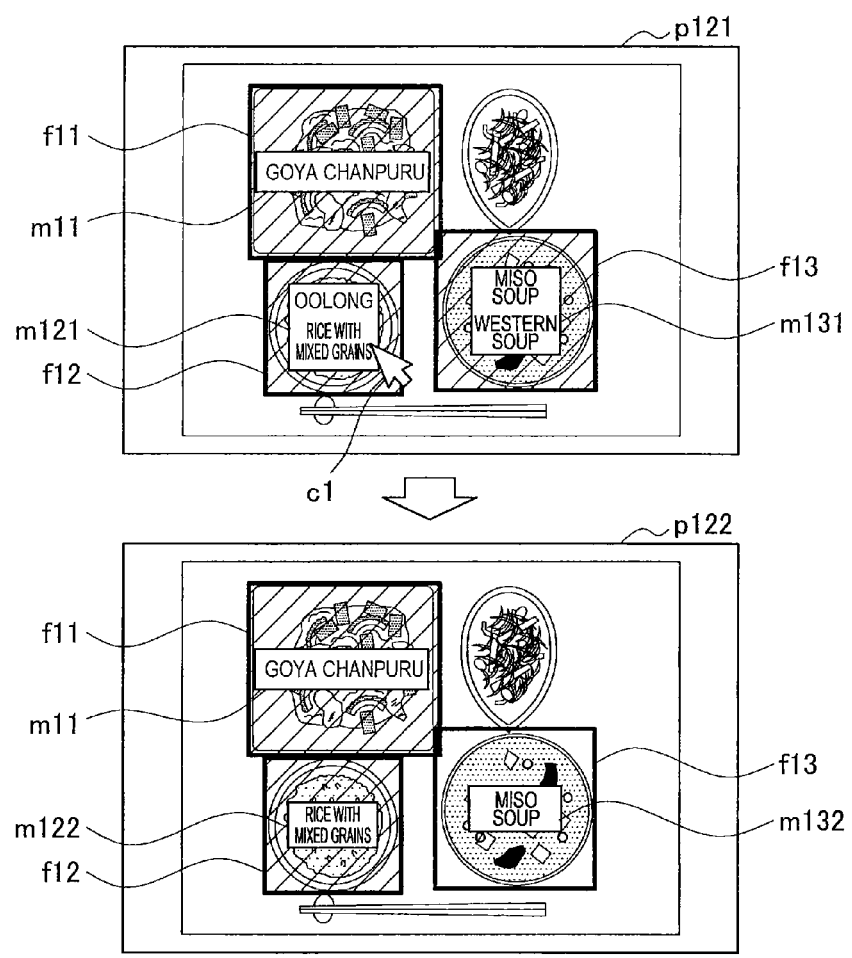
FIG. 4 is a diagram for describing an example operation of setting identification information for an object in an image in the information processing system of the first embodiment of the present disclosure.

Firstly, refer to FIG. 4. FIG. 4 is a diagram for describing an example operation of setting identification information for an object in an image in the information processing system 1 of this embodiment. Note that an image p121 of FIG. 4 shows a situation similar to that of the image pi11 of FIG. 2 and therefore will not be described in detail.

It is assumed that, by operating, for example, the cursor c1, the user U1 selects, from candidates indicated as the identification information m121, "rice with mixed grains" as identification information indicating an object shown in a region f12. The information processing system 1 recognizes the object shown in the region f12 as "rice with mixed grains" according to the selection by the user U1, and associates the region f1 with identification information m122 indicating "rice with mixed grains" as shown in an image p122.

Because the object corresponding to the region f12 has been determined to be "rice with mixed grains," the information processing system 1 obtains the co-occurrence probability between "rice with mixed grains" and each of "miso soup" and "western soup" indicated by identification information m131. Thereafter, the information processing system 1 compares the obtained co-occurrence probability corresponding to "miso soup" with that corresponding to "western soup," and based on the comparison result, identifies (or estimates) identification information for an object in a region f13. Here, it is assumed that the co-occurrence probability between "rice with mixed grains" and "miso soup" is higher than that between "rice with mixed grains" and "western soup." In this case, the information processing system 1 recognizes the object shown in the region f13 as "miso soup," which has a higher co-occurrence probability in connection with "rice with mixed grains" than that of "western soup," and associates the region f13 with identification information m132 indicating "miso soup."

Thus, after the identification information m122 indicating the object corresponding to the region f12 has been specified, the information processing system 1 of this embodiment estimates the object corresponding to the region f13 based on the co-occurrence probability in connection with the object indicated by the specified identification information. Thereafter, based on the result of the estimation, the information processing system 1 sets the identification information m132 for the region f13. With such a configuration, in the information processing system 1 of this embodiment, operations involved in setting identification information for the region f13 can be removed compared to the above information processing system of the comparative example (see FIG. 2).

Figure 5A:
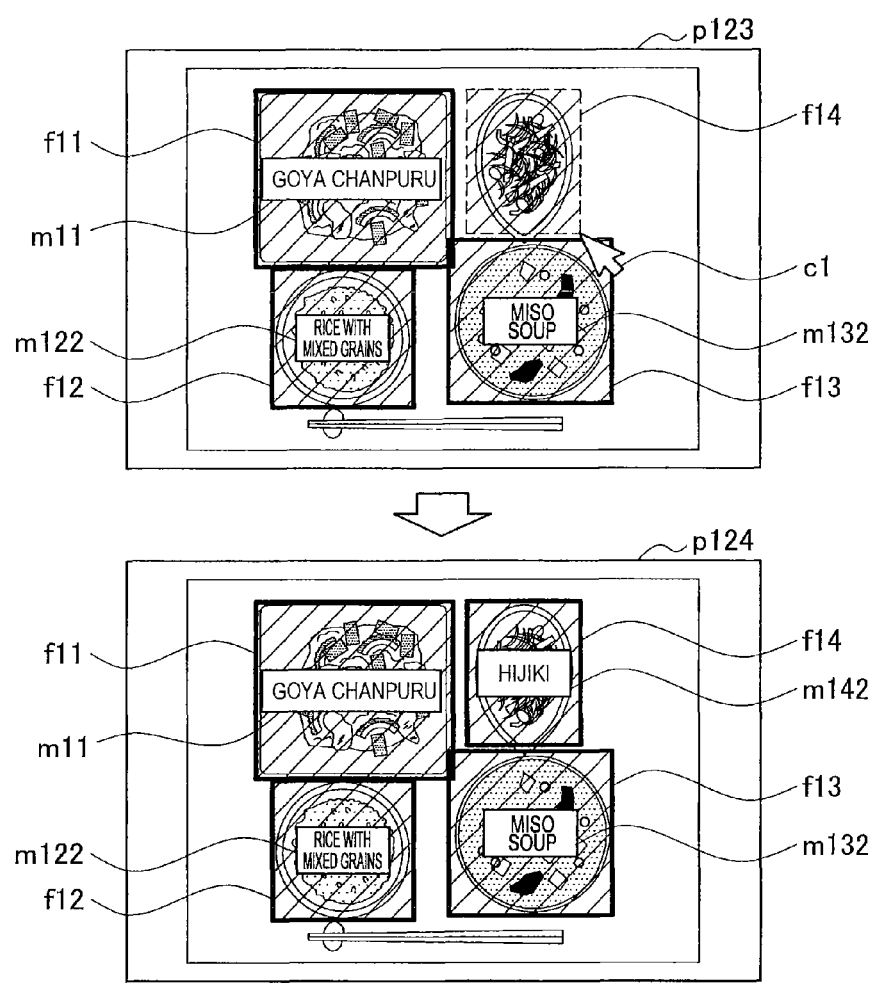
FIG. 5A is a diagram for describing an example operation of setting identification information for an object in an image in the information processing system of the first embodiment of the present disclosure.

Next, refer to FIG. 5A. FIG. 5A is a diagram for describing an example operation of setting identification information for an object in an image in the information processing system 1 of this embodiment. Note that an image p123 of FIG. 5A shows a situation similar to that of the image p114 of FIG. 3 and therefore will not be described in detail.

The user U1 specifies a region of an object which has not been recognized, by operating, for example, the cursor c1. After the region has been specified, the information processing system 1 of this embodiment sets the specified region as a region f14. After the region f14 has been set, the information processing system 1 performs an image analysis process on the region f14 in the image p123 to try to identify an object included in the region f14. Here, it is assumed that the information processing system 1 has failed to identify the object in the region f14.

Next, the information processing system 1 estimates another object(s) having a high co-occurrence probability in connection with each of the objects corresponding to the regions f11, f12, and f13. In the example of FIG. 5A, the information processing system 1 selects "hijiki" as an object having a high co-occurrence probability in connection with each of "goya chanpuru" indicated by the identification information m11, "rice with mixed grains" indicated by the identification information m122, and "miso soup" indicated by the identification information m132. Specifically, the information processing system 1 recognizes the object shown in the region f14 as "hijiki," and associates the region f14 with identification information m142 indicating "hijiki" as shown in an image p124.

When the region f14 is set, the object in the region f14 may be recognized as "hijiki," and based on the result of the identification of the object, an object in another region may be recognized. For example, FIG. 5B is a diagram for describing an example operation of setting identification information for an object in an image in the information processing system 1 of this embodiment, particularly an example in which an object in another region is recognized based on the setting of the region f14.

Figure 5B:
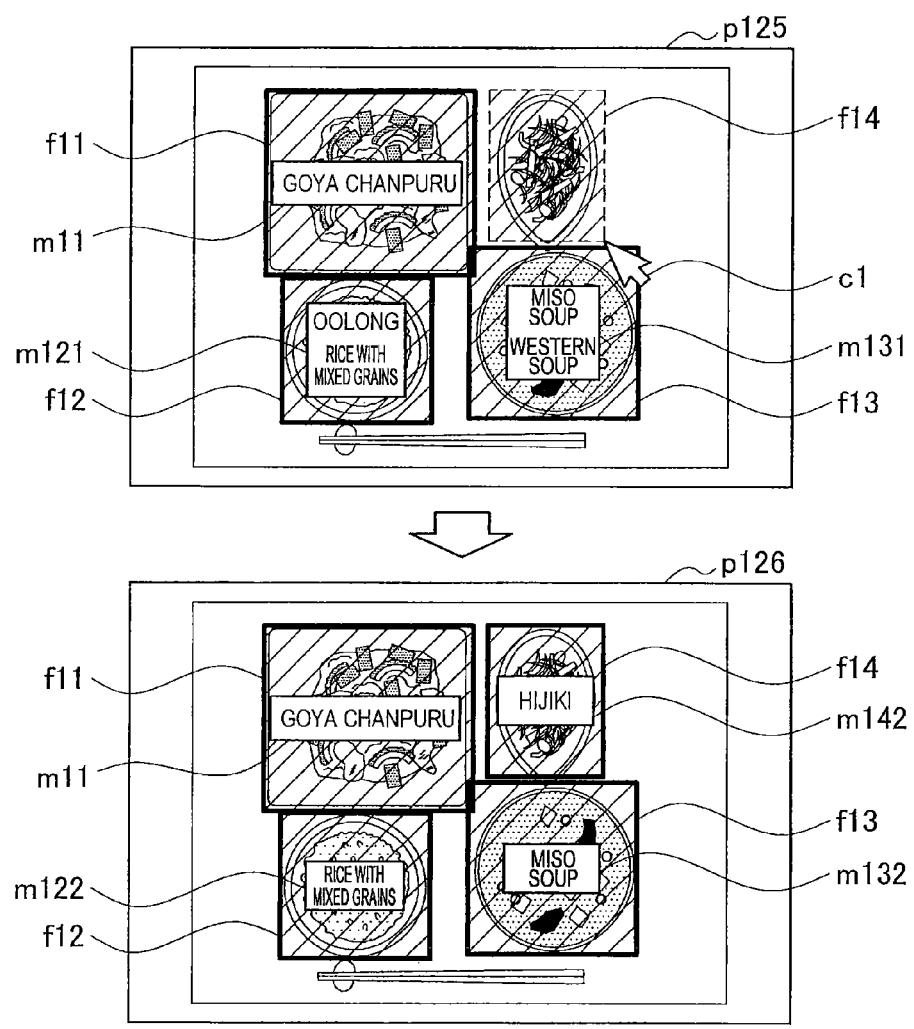
FIG. 5B is a diagram for describing an example operation of setting identification information for an object in an image in the information processing system of the first embodiment of the present disclosure.

An image p125 of FIG. 5B shows a situation which is similar to that of the image p121 of FIG. 4 and in which a region including "hijiki" which has not yet been recognized is specified by the user U1 operating the cursor c1. Note that, as shown in FIG. 5B, it is assumed that, at this time, the information processing system 1 has failed to uniquely identify the objects in the regions f12 and f13.

After the user U1 has specified a region, the information processing system 1 sets the specified region as a region f14, and tries to identify an object included in the region f14. Here, it is assumed that the information processing system 1 has successfully recognized the object in the region f14 as "hijiki." In this case, as shown in an image p126, the information processing system 1 associates the region f14 with identification information m142 indicating "hijiki."

The information processing system 1 also identifies the objects in the regions f12 and f13 based on the co-occurrence probabilities in connection with the object in the region f14 which has been newly identified as "hijiki." In the example of the image p126, the information processing system 1 selects, from "oolong" and "rice with mixed grains" indicated by the identification information m121, "rice with mixed grains," which has the higher co-occurrence probability in connection with "hijiki," and displays identification information m122 indicating "rice with mixed grains" in association with the region f12. Similarly, the information processing system 1 selects, from "miso soup" and "western soup" indicated by the identification information m131, "miso soup," which has the higher co-occurrence probability in connection with "hijiki," and displays identification information m132 indicating "miso soup" in association with the region f13.

Thus, the information processing system 1 of this embodiment, when having failed to recognize the object corresponding to the region f14 based on an image analysis process, estimates the object corresponding to the region f14 based on the co-occurrence probability in connection with another object(s) in another region(s). Thereafter, based on the result of the estimation, the information processing system 1 sets the identification information m142 for the region f14. With such a configuration, the information processing system 1 of this embodiment can remove operations involved in setting identification information for the region f14, compared to the above information processing system of the comparative example (see FIG. 3).

[1. 2. Configuration]

Figure 6:
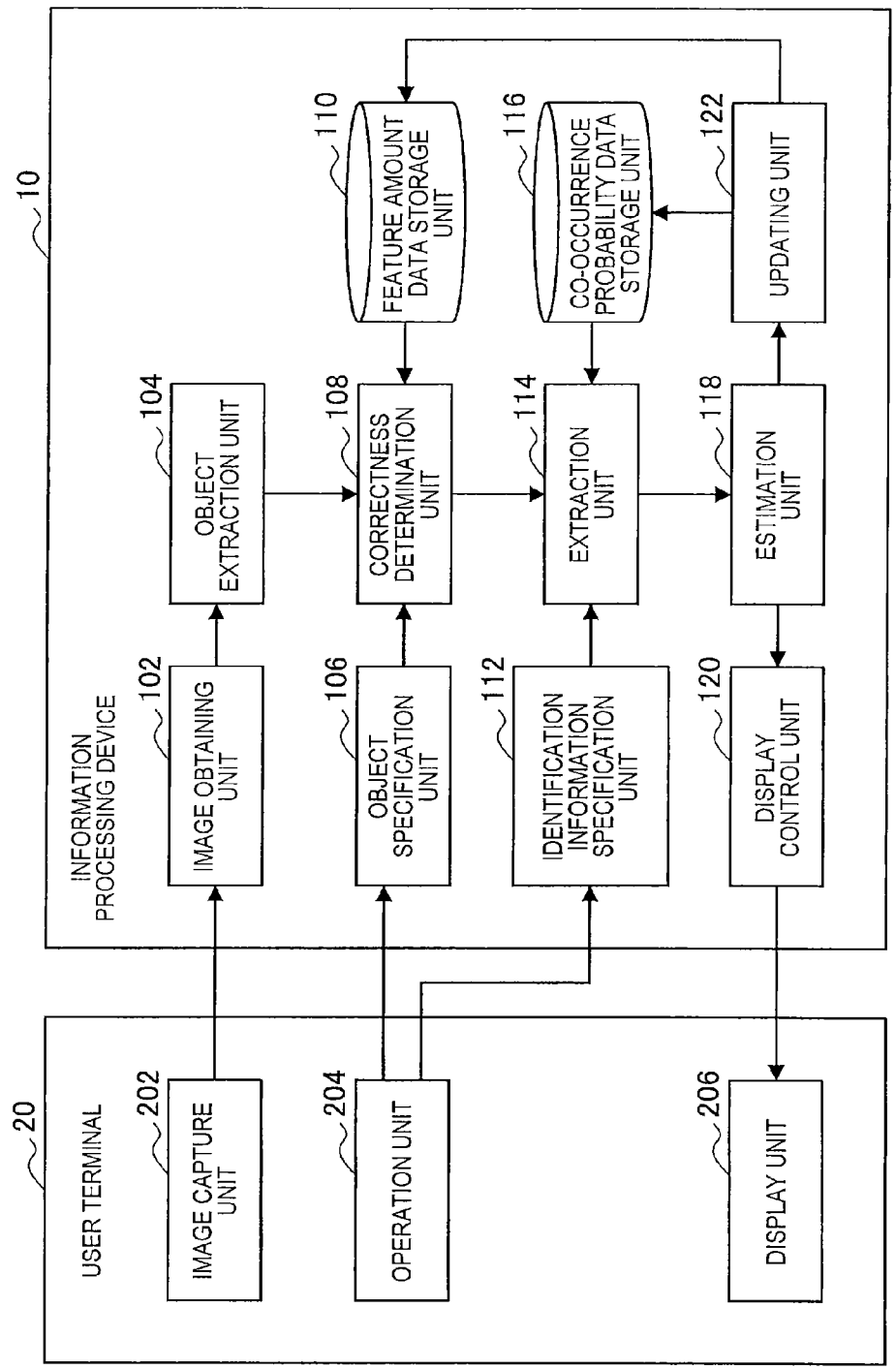
FIG. 6 is a block diagram showing a configuration of an information processing device and a user terminal according to this embodiment.

Next, a configuration of the information processing device 10 and the user terminal 20 of this embodiment will be described with reference to FIG. 6. FIG. 6 is a block diagram showing the configuration of the information processing device 10 and the user terminal 20 of this embodiment. As shown in FIG. 6, the information processing device 10 includes an image obtaining unit 102, an object extraction unit 104, an object specification unit 106, a correctness determination unit 108, a feature amount data storage unit 110, an identification information specification unit 112, an extraction unit 114, a co-occurrence probability data storage unit 116, an estimation unit 118, a display control unit 120, and an updating unit 122. The user terminal 20 includes an image capture unit 202, an operation unit 204, and a display unit 206.

Note that the configuration of each of the information processing device 10 and the user terminal 20 will now be described, particularly components whose operations are triggered by events in each of a "process based on obtaining of an image," a "process based on setting of a region," and a "process based on setting of identification information."

(Process Based on Obtaining of Image)

Firstly, components operating in a process which is performed when the information processing device 10 obtains an image captured by the image capture unit 202, as the "process based on obtaining of an image," will be described. Specifically, the information processing device 10 recognizes an object in the image obtained from the image capture unit 202, and based on the result of the recognition, presents a region corresponding to the recognized object, and identification information of the object, to the user U1.

The image capture unit 202 captures an image including at least one object. The image captured at this time may be a still image. A specific example of the image capture unit 202 may be a camera provided in the user terminal 20 such as a smartphone. Although FIG. 6 shows an example in which the image capture unit 202 is provided in the user terminal 20, the image capture unit 202 may not necessarily be a part of the user terminal 20. For example, the image capture unit 202 may be separated from the user terminal 20.

The image obtaining unit 102 obtains the image captured by the image capture unit 202. The image obtaining unit 102 outputs the obtained image to the object extraction unit 104.

The object extraction unit 104 obtains the image from the image obtaining unit 102. The object extraction unit 104 extracts, as a region of an object, a region having a specific shape included in the obtained image or a region having a characteristic color component or texture. An example technique of extracting a region of an object from an image will now be described with reference to FIGS. 7 and 8.

Figure 7:
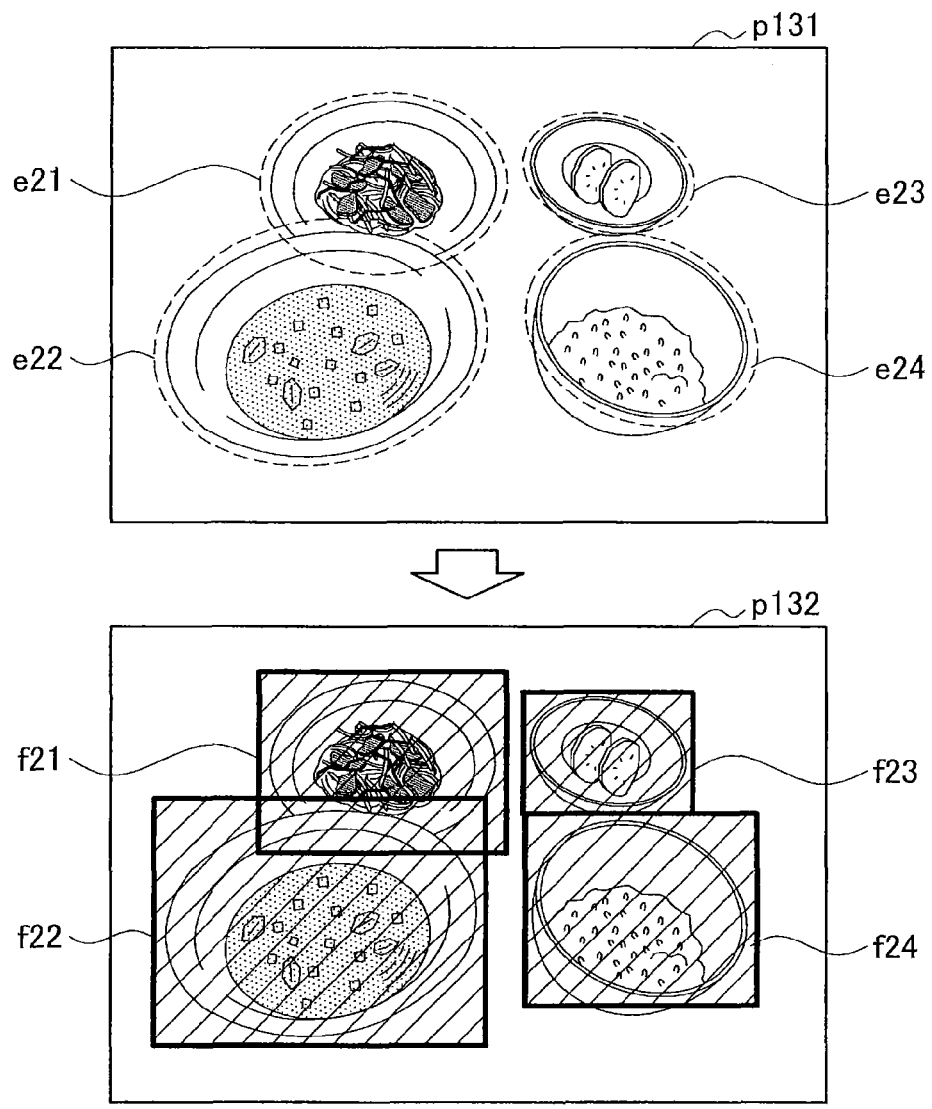
FIG. 7 is a diagram for describing an example method for extracting an object from an image.

Firstly, refer to FIG. 7. FIG. 7 is a diagram for describing an example method for extracting an object from an image, showing an example in which a circular or elliptical region included in an image is extracted as a region of an object. In most cases, a dish is served in a container, such as a plate etc. Therefore, for example, if a region corresponding to a circular or elliptical container is extracted from an image, the extracted region often includes a dish as an object. Therefore, for example, the object extraction unit 104, when extracting a circular or elliptical region corresponding to a container from an image, can recognize the extracted region as a region including a dish as an object. Note that the terms "circle" and "ellipse" or "circular" and "elliptical" are hereinafter collectively referred to as "ellipse" or "elliptical." Therefore, the term "ellipse" or "elliptical" herein includes "circle" or "circular."

For example, an image p131 shows four dishes served in elliptical plates. For example, the object extraction unit 104 performs an image analysis process on the image p131 to extract edges from the image p131, thereby extracting elliptical regions e21 to e24 which are formed by the extracted edges. Thereafter, as shown in an image p132, the object extraction unit 104 recognizes the extracted elliptical regions e21 to e24 as dish regions f21 to f24.

Note that, in the image p132, the object extraction unit 104 sets, as the dish regions f21 to f24, regions which circumscribe the elliptical regions e21 to e24 by vertical lines extending along the vertical direction of the image p132 and horizontal lines extending along the horizontal direction of the image p132. Note that the shapes of the regions f21 to f24 of FIG. 7 are only for illustrative purposes, and may be any shape that allows a region of a dish (object) to be set. For example, the object extraction unit 104 may directly set the extracted elliptical regions e21 to e24 as the dish regions f21 to f24.

Figure 8:
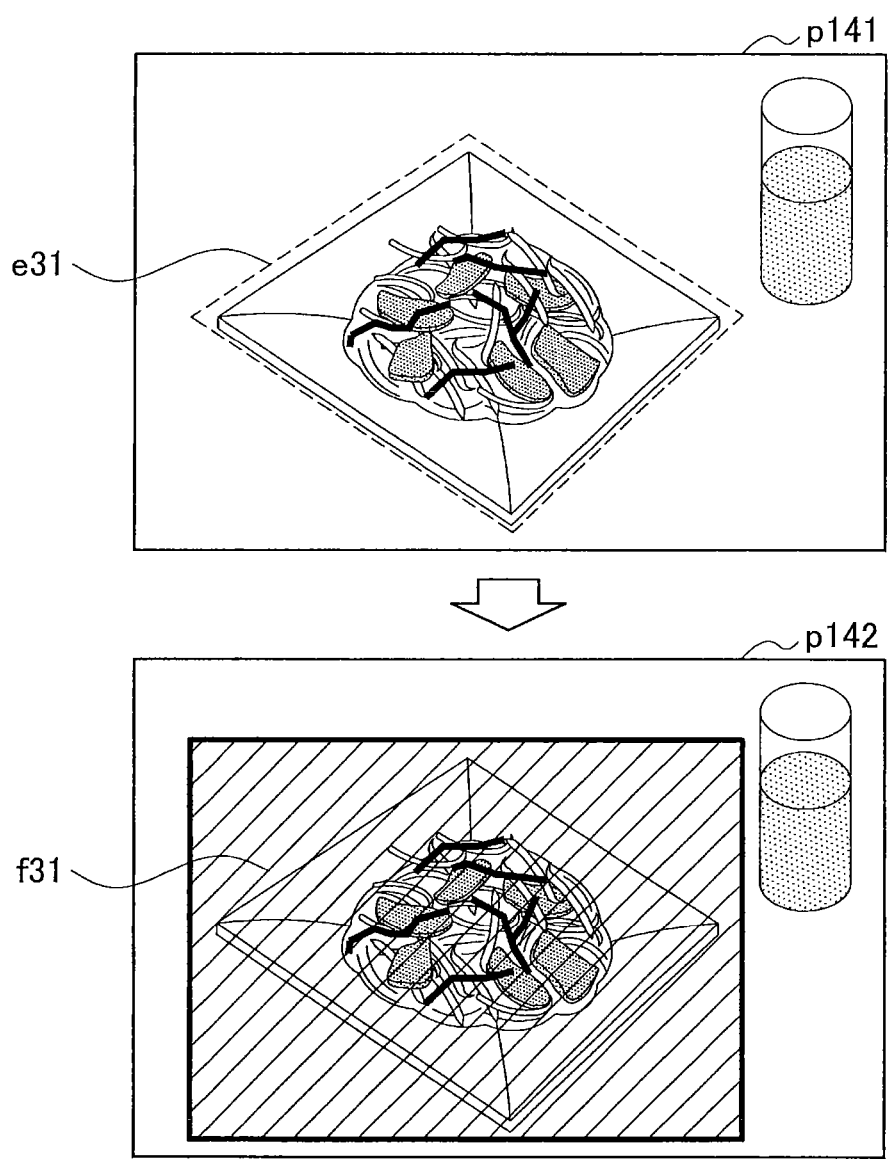
FIG. 8 is a diagram for describing an example method for extracting an object from an image.

Next, refer to FIG. 8. FIG. 8 is a diagram for describing an example method for extracting an object from an image, showing an example in which a quadrangular region is extracted as a region of an object from an image.

For example, a dish served in a quadrangular plate has been captured in an image p141. For example, the object extraction unit 104 performs an image analysis process on the image p141 to extract edges from the image p141, thereby extracting a quadrangular region e31 which is formed by the extracted edges. Thereafter, as shown in an image p142, the object extraction unit 104 recognizes the extracted quadrangular region e31 as a dish region f31.

Note that, in the image p142, similar to the image p132 of FIG. 7, a region which circumscribes the quadrangular region e31 by vertical lines extending along the vertical direction of the image p142 and horizontal lines extending along the horizontal direction of the image p142, is set as the dish region f31.

Figure 9:
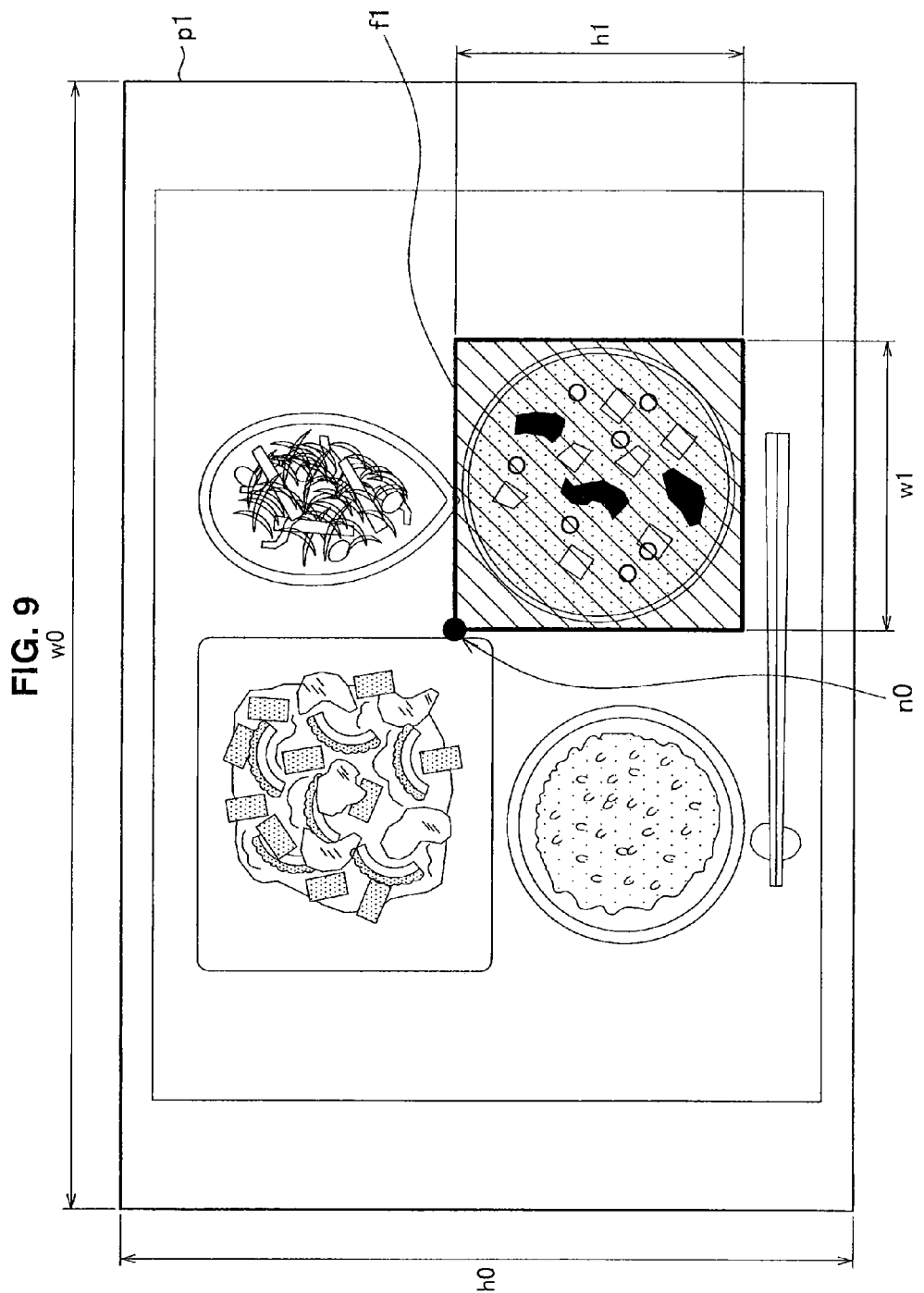
FIG. 9 is a diagram for describing example data indicating a region set in an image.

Next, an example method for defining data indicating a region set in an image will be described with reference to FIGS. 9 and 10. Firstly, refer to FIG. 9. FIG. 9 is a diagram for describing example data indicating a region set in an image, particularly example data indicating a region f1 which has been set in an image p1 and formed by vertical lines extending along the vertical direction of the image p1 and horizontal lines extending along the horizontal direction of the image p1.

In FIG. 9, a reference character h0 indicates the height (length in the vertical direction) of the image p1. A reference character w0 indicates the width (length in the horizontal direction) of the image p1. A reference character n0 indicates a reference vertex of the vertices of the quadrangular region f1. In the example of FIG. 9, the upper left vertex of the quadrangular the region f1 is the reference vertex n0. A reference character h1 indicates the height of the region f1. A reference character w1 indicates the width of the region f1.

Here, refer to FIG. 10. FIG. 10 is a diagram for describing example data indicating a region set in an image, showing an example in which data indicating a region is defined. Note that data indicating a region may be hereinafter referred to as "region data." In the example of FIG. 10, region data d11 has a format (e.g., a data structure) including names d111, attributes d112, and value ranges d113.

The names dill indicate the categories of data. As shown in the names d111, the region data d11 may be specified by data indicating the "location of the region" and data indicating the "size of the region."

The attributes d112 indicate the attributes of information included in each of the data indicating the "location of the region" and the data indicating the "size of the region." The value ranges d113 indicate the ranges of values taken by the information indicated by the attributes d112.

For example, the data indicating the "location of the region" indicates the location of the region f1 in the image p1 of FIG. 9, and corresponds to the location of the vertex n0. Note that, in the example of FIG. 10, the location of the vertex n0 is represented by relative values with respect to the height h0 and width w0 of the image p1. As a specific example, in the data indicating the "location of the region," the location "x" in the horizontal direction of the vertex n0 represents a location in the horizontal direction, where the left and right ends of the image p1 of FIG. 9 are "0.0" and "1. 0," respectively. Similarly, the location "y" in the vertical direction of the vertex n0 represents a location in the vertical direction, where the upper and lower ends of the image p1 of FIG. 9 are "0.0" and "1.0," respectively.

The data indicating the "size of the region" indicates the size of the region f1 in the image p1 of FIG. 9. Note that, in the example of FIG. 10, the size of the region f1 is represented by relative values with respect to the height h0 and width w0 of the image p1. As a specific example, in the data indicating the "size of the region," the "width" of the region f1 represents a relative width of the region f1, where the width w0 of the image p1 is "1. 0," and is derived from w1/w0. Similarly, the "height" of the region f1 represents a relative height of the region f1, where the height h0 of the image p1 is "1. 0," and is derived from h1/h0.

Note that the examples of FIGS. 9 and 10 are only for illustrative purposes, and a region in an image may be represented in any data format that allows the region to be specified.

Thus, the object extraction unit 104 extracts regions indicating objects from an obtained image, and for each of the extracted regions, generates region data indicating the region. The object extraction unit 104 outputs the obtained image, and the region data corresponding to each of the regions extracted from the image, to the correctness determination unit 108.

The correctness determination unit 108 obtains the image, and the region data corresponding to the regions extracted from the image, from the object extraction unit 104. The correctness determination unit 108 specifies the regions set in the obtained image based on the obtained region data.

After a region has been specified in an image, the correctness determination unit 108 identifies an object included in the specified region. As a specific example, the correctness determination unit 108 checks a feature amount determined from each region in an image against feature amounts previously stored for object classes, to calculate a correctness of an object included in the region for each object class. Data indicating a feature amount for each object class is stored in the feature amount data storage unit 110. Note that the term "correctness" refers to an index which indicates how correct it is that an object in an image corresponds to an object class. The correctness may, for example, be determined based on how much the feature amount of an object extracted from an image matches the feature amount of an object class. Note that information indicating the correctness of an object calculated for each object class may be hereinafter referred to as an "identification score d13."

Figure 11:
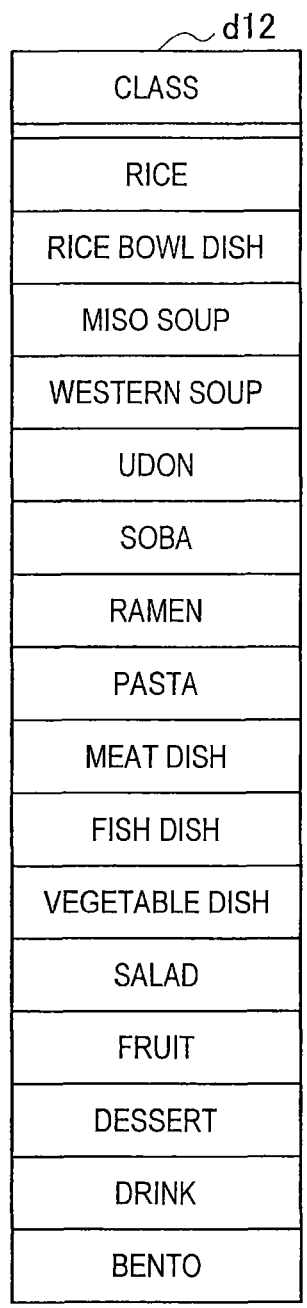
FIG. 11 is a diagram showing example object classes detected from an image.

Note that the feature amount data storage unit 110 may store data indicating the feature amount of each object class, together with sample data (e.g., an image of each object class) for deriving that data. Here, refer to FIG. 11. FIG. 11 shows example object classes which may be detected from an image, particularly an example in which dishes are detected as objects. Note that, in the example of FIG. 11, object classes are indicated by a class d12.

Next, refer to FIG. 12. FIG. 12 is a diagram for describing example data indicating the correctness of the result of identification of an object in an image, i.e., an example identification score d13. In the example of FIG. 12, the identification score d13 has a format (e.g., a data structure) including a name d131, classes d12, and value ranges d132.

The name d131 indicates the category of the identification score d13. For example, in the example of FIG. 12, the identification score d13 is for a dish as object classes.

Therefore, in the name d131, a "dish" is set which indicates the identification score d13 is for a dish as object classes.

The classes d12 correspond to the classes d12 of FIG. 11. The value ranges d132 indicate the ranges of values taken by the correctnesses of the object classes indicated by the classes d12. In the example of FIG. 12, the ranges of values taken by the correctnesses of the object classes indicated by the classes d12 are set to from "−1. 0" to "1. 0." Note that the value indicating the correctness, when exceeding zero, indicates how correct it is that an object in an image corresponds to an object class indicated by the classes d12, and when being lower than zero, indicates how incorrect it is that an object in an image corresponds to an object class indicated by the classes d12. Specifically, when the value indicating the correctness exceeds zero, the higher the value indicating the correctness, the higher the probability that an object in an image corresponds to an object class indicated by the classes d12. Similarly, when the value indicating the correctness is low, the probability that an object in an image is an object class indicated by the classes d12 is low. When the value indicating the correctness is lower than zero, the probability that an object in an image corresponds to another object class.

Note that the correctness which is lower than zero may be defined by accumulating, as sample data, for example, data indicating that an object in an image is different from objects indicated by an object class.

As described above, the correctness determination unit 108 calculates the identification score d13 indicating the correctness for each object class indicated by the classes d12, for each of objects included in regions in an image. Note that the identification score d13 may, for example, be calculated as information indicating the probability that an object included in each region in an image corresponds to each object class indicated by the classes d12. The identification score d13 corresponds to an example of "correctness information."

The correctness determination unit 108 outputs the obtained image, the region data of the regions extracted from the image, and the identification scores d13 calculated for the respective objects in the regions, to the extraction unit 114.

The extraction unit 114 obtains the image, the region data corresponding to the regions extracted from the image, and the identification scores d13 calculated for the respective objects in the regions, from the correctness determination unit 108.

The extraction unit 114 looks up the identification score d13 corresponding to the object classes indicated by the classes d12 for each object, to find any object class for which the identification score d13 has a value higher than or equal to a predetermined threshold.

As a specific example, the threshold is set to "0.8." If an object has an identification score d13 of not less than "0.8" for "fish dish" which is one of the object classes indicated by the classes d12, the extraction unit 114 identifies the object as "fish dish" based on the identification score d13 of the object.

If there is an object class for which the identification score d13 of an object is higher than or equal to the threshold, the extraction unit 114 extracts the co-occurrence probability data d14 corresponding to that object class from the co-occurrence probability data storage unit 116. The co-occurrence probability data storage unit 116 is a storage unit for storing the co-occurrence probability data d14.

The co-occurrence probability data d14 will now be described. The co-occurrence probability data d14 indicates probabilities with which an object which has been identified co-occurs with the object classes indicated by the classes d12. For example, the co-occurrence probability data d14 corresponding "fish dish" indicates probabilities with which "fish dish" co-occurs with respective dishes in the object classes indicated by the classes d12. The co-occurrence probability data storage unit 116 stores the co-occurrence probability data d14 for each of the object classes indicated by the classes d12. In other words, the co-occurrence probability data storage unit 116 manages and stores information indicating the co-occurrence probabilities for each combination of the object classes indicated by the classes d12. Note that the value range of information indicating the co-occurrence probability is from "0.0" to "1.0." For example, in the co-occurrence probability data d14 for "fish dish," an object class having a higher co-occurrence probability co-occurs with "fish dish" with a higher probability.

If "fish dish" has been found as an object class for which the identification score d13 is higher than or equal to the threshold, the extraction unit 114 extracts the co-occurrence probability data d14 corresponding to "fish dish" from the co-occurrence probability data storage unit 116.

Also, if an object class for which the identification score d13 is higher than or equal to the threshold has been found, the extraction unit 114 may identify the object having the identification score d13 as the found object class. In this case, the extraction unit 114 associates the region data of a region corresponding to the object with identification information indicating the found object class, i.e., identification information indicating the result of the identification of the object. Note that this threshold is also the threshold of the identification score d13 which is used by the extraction unit 114 to identify an object.

Figure 13:
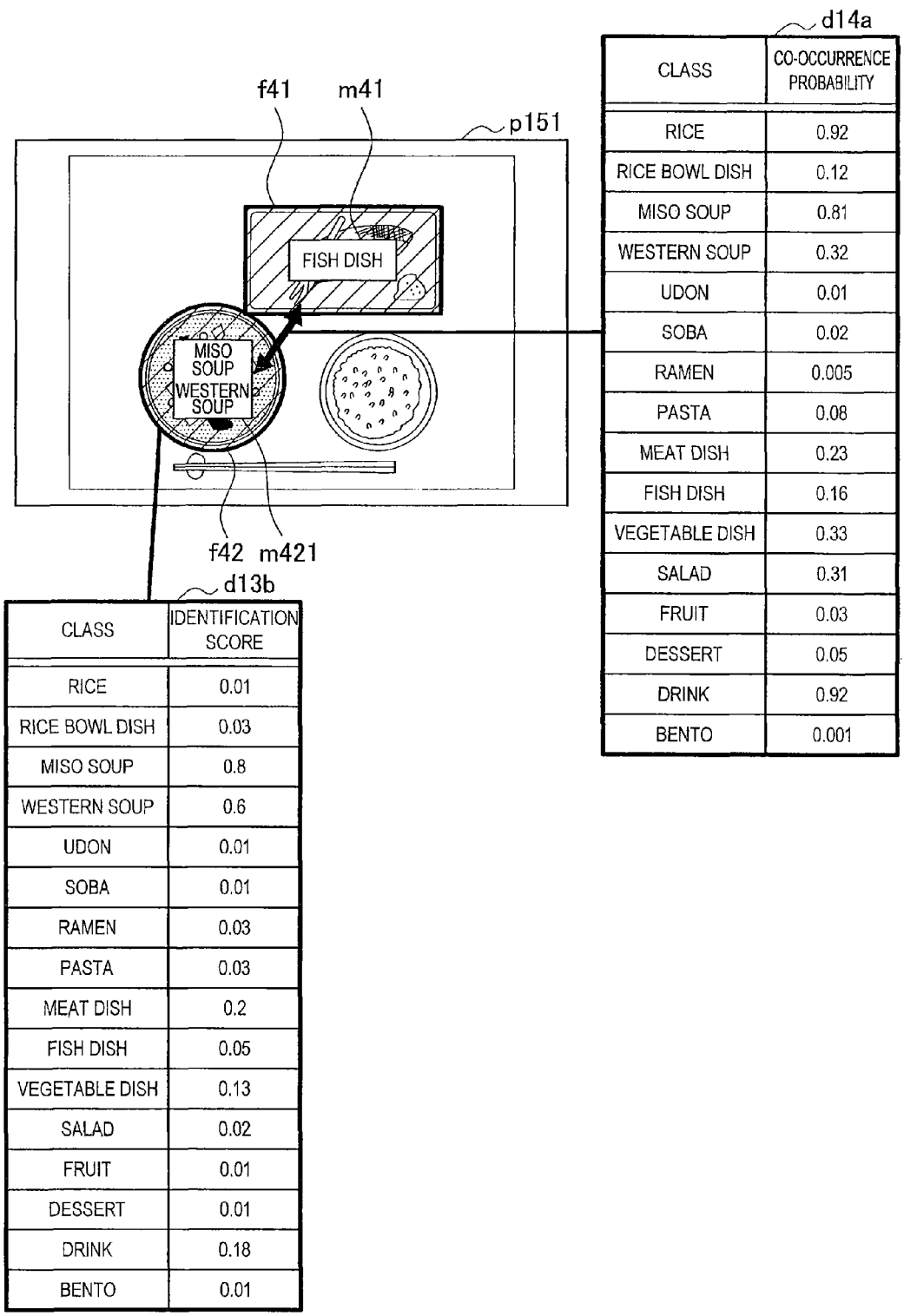
FIG. 13 is a diagram for describing a process of estimating identification information indicating an object in an image, which is performed by the information processing device of this embodiment.

Here, refer to FIG. 13. FIG. 13 is a diagram for describing a process of estimating identification information indicating an object in an image, which is performed by the information processing device 10 of this embodiment. For example, it is assumed that the extraction unit 114 has obtained an image p151 shown in FIG. 13, region data indicating regions f41 and f42 in the image, and the identification scores d13 calculated for the respective objects in the regions.

In the example of FIG. 13, it is assumed that the object in the region f41 has an identification score d13 of not less than the threshold for "fish dish." In this case, the extraction unit 114 extracts co-occurrence probability data d14a corresponding to "fish dish" from the co-occurrence probability data storage unit 116. The extraction unit 114 also associates the region data corresponding to the region f41 with identification information indicating "fish dish."

Note that identification scores d13b are for the object in the region f42. Note that, for the object in the region f42, it is assumed that the extraction unit 114 has failed to find an object class for which the identification score d13b is higher than or equal to the threshold.

The extraction unit 114 outputs the obtained image, the region data corresponding to the regions extracted from the image, the identification scores d13 for each of the objects in the regions, and the extracted co-occurrence probability data d14, to the estimation unit 118. Note that if the co-occurrence probability data d14 has not been successfully extracted, the co-occurrence probability data d14 is, of course, not output from the extraction unit 114 to the estimation unit 118. Also, in the example of FIG. 13, the object in the region f41 has been identified as "fish dish." Therefore, in this case, the extraction unit 114 may not necessarily output identification scores d13 to the estimation unit 118 for the object in the region f41.

The estimation unit 118 obtains the image, the region data corresponding to the regions extracted from the image, the identification scores d13 for each of the objects in the regions, and the extracted co-occurrence probability data d14, from the extraction unit 114.

The estimation unit 118 determines whether or not each of the obtained pieces of region data has been associated with identification information indicating the result of identification of an object in a region indicated by the region data, to extract region data which has not been associated with identification information.

For example, in the example of FIG. 13, region data corresponding to the region f41 has been associated with identification information m41, and region data corresponding to the region f42 has not been associated with identification information. In this case, the estimation unit 118 extracts region data corresponding to the region f42.

For each of the extracted pieces of region data, the estimation unit 118 multiplies the identification scores d13 of the object by the obtained co-occurrence probability data d14 to calculate new identification scores d13'.

For example, in the example of FIG. 13, for an object corresponding to the region f42, the identification score d13b of the object for "western soup" is "0.6." The co-occurrence probability between "fish dish" (i.e., the result of identification of the object in the region f41) and "western soup" is "0.32." Therefore, the new identification score d13b' of the object corresponding to the region f42 for "western soup" is "0.192."

On the other hand, the identification score d13b of the object corresponding to the region f42 for "miso soup" is "0.8." The co-occurrence probability between "fish dish" and "miso soup" is "0.81." Therefore, the identification score d13b' of the object for "miso soup" is "0.648."

According to such a result, for example, when the identification scores d13b of the object corresponding to the region f42 are looked up, the identification score d13b is "0.6" for "western soup" and "0.8" for "miso soup." Therefore, it is difficult to determine whether the object corresponding to the region f42 is "western soup" or "miso soup" only based on the identification scores d13b. On the other hand, the identification score d13b' calculated based on the identification score d13b and the co-occurrence probability in connection with "fish dish" is "0.192" for "western soup" and "0.648" for "miso soup." Therefore, compared to when the determination is performed only based on the identification scores d13b, when the determination is performed based on the identification scores d13b', the correctness with which the object corresponding to the region f42 is "western soup" and the correctness with which the object corresponding to the region f42 is "miso soup" diverges more significantly, whereby the object can be more easily identified.

After the identification scores d13' have thus been calculated for each of the objects corresponding to the extracted region data, the estimation unit 118 firstly compares each of the calculated identification scores d13' with a predetermined first threshold for determining the identification scores d13'. If there is an object class for which the identification score d13' is higher than or equal to the first threshold, the estimation unit 118 recognizes the object as that object class, and associates region data corresponding to the object with identification information indicating that object class.

As a specific example, it is assumed that the first threshold is "0.7." If an object has an identification score d13' of not less than "0.7" for "meat dish" which is one of the object classes indicated by the classes d12, the estimation unit 118 identifies the object as "meat dish" based on the identification score d13' of the object. Thereafter, the estimation unit 118 associates region data corresponding to the object with identification information indicating "meat dish." Note that the above first threshold for identifying an object may be hereinafter referred to as a "criterion 1."

If there is no object class for which the identification score d13' satisfies the criterion 1, the estimation unit 118 compares each identification score d13' with a second threshold which is lower than the first threshold. The second threshold is for extracting a candidate for the result of identification of an object. The estimation unit 118 selects an object class for which the identification score d13' is higher than or equal to the second threshold, and associates region data corresponding to the object with identification information indicating the selected object class. At this time, the estimation unit 118 may attach, to the identification information with which the region data has been associated, information indicating that the identification information is a candidate for the result of identification of the object.

As a specific example, it is assumed that the second threshold is "0.3." If an object has an identification score d13' of not less than "0.3" for "miso soup" and "western soup" which are each one of the object classes indicated by the classes d12, the estimation unit 118 selects "miso soup" and "western soup" based on the identification scores d13' of the object. Thereafter, the estimation unit 118 associates region data corresponding to the object with identification information indicating "miso soup" and identification information indicating "western soup." At this time, the estimation unit 118 attaches, to each of the identification information indicating "miso soup" and the identification information indicating "western soup," information indicating that the identification information is a candidate for the result of identification of the object. Note that the above second threshold for selecting a candidate for the result of identification of an object may be hereinafter referred to as a "criterion 2."

Thus, the estimation unit 118 determines whether or not the calculated identification score d13' of each object corresponding to extracted region data satisfies the criterion 1 or 2. Thereafter, based on the result of the determination, the estimation unit 118 associates region data of each object with identification information indicating the result of the identification of the object or identification information indicating a candidate for the result of the identification. Note that if there is no object class for which the identification score d13' satisfies either of the criteria 1 and 2, the corresponding region data is not associated with identification information. Thus, the estimation unit 118 estimates the result of identification of an object corresponding to each piece of region data by determining whether or not the identification score d13' satisfies the criterion 1 or 2.

The estimation unit 118 outputs the obtained image, and the region data corresponding to the regions extracted from the image, to the display control unit 120.

The display control unit 120 obtains the image, and the region data corresponding to the regions extracted from the image, from the estimation unit 118. The display control unit 120 displays the obtained image on the display unit 206.

The display control unit 120 superimposes the regions based on the obtained region data on top of the image displayed on causes the display unit 206. For example, in the example of FIG. 13, the display control unit 120 displays the image p151 on the display unit 206, and superimposes the regions f41 and f42 on top of the image p151 based on the obtained region data.

Next, the display control unit 120 extracts the identification information with which each piece of region data has been associated. If the identification information has been successfully extracted, the display control unit 120 displays the extracted identification information in association with the region corresponding to the region data on the display unit 206. For example, in the example of FIG. 13, it is assumed that the region data of the region f41 has been associated with identification information indicating "fish dish." In this case, the display control unit 120 displays identification information m41 indicating "fish dish" in association with the region f41 on the display unit 206.

When region data has been associated with identification information indicating a candidate for the result of identification of an object, the display control unit 120 associates a region corresponding to the region data with the extracted identification information, and displays the identification information on the display unit 206 in a selective fashion. For example, in the example of FIG. 13, it is assumed that the region data of the region f42 has been associated with identification information indicating "miso soup" and identification information indicating "western soup" which are candidates for the result of identification. In this case, the display control unit 120 displays identification information m421 which selectively presents "miso soup" and "western soup" in association with the region f42 on the display unit 206. As a result, the user U1 is allowed to select one of "miso soup" and "western soup" presented as the identification information m421 using the operation unit 204.

(Process Based on Setting of Region)

Figure 14:
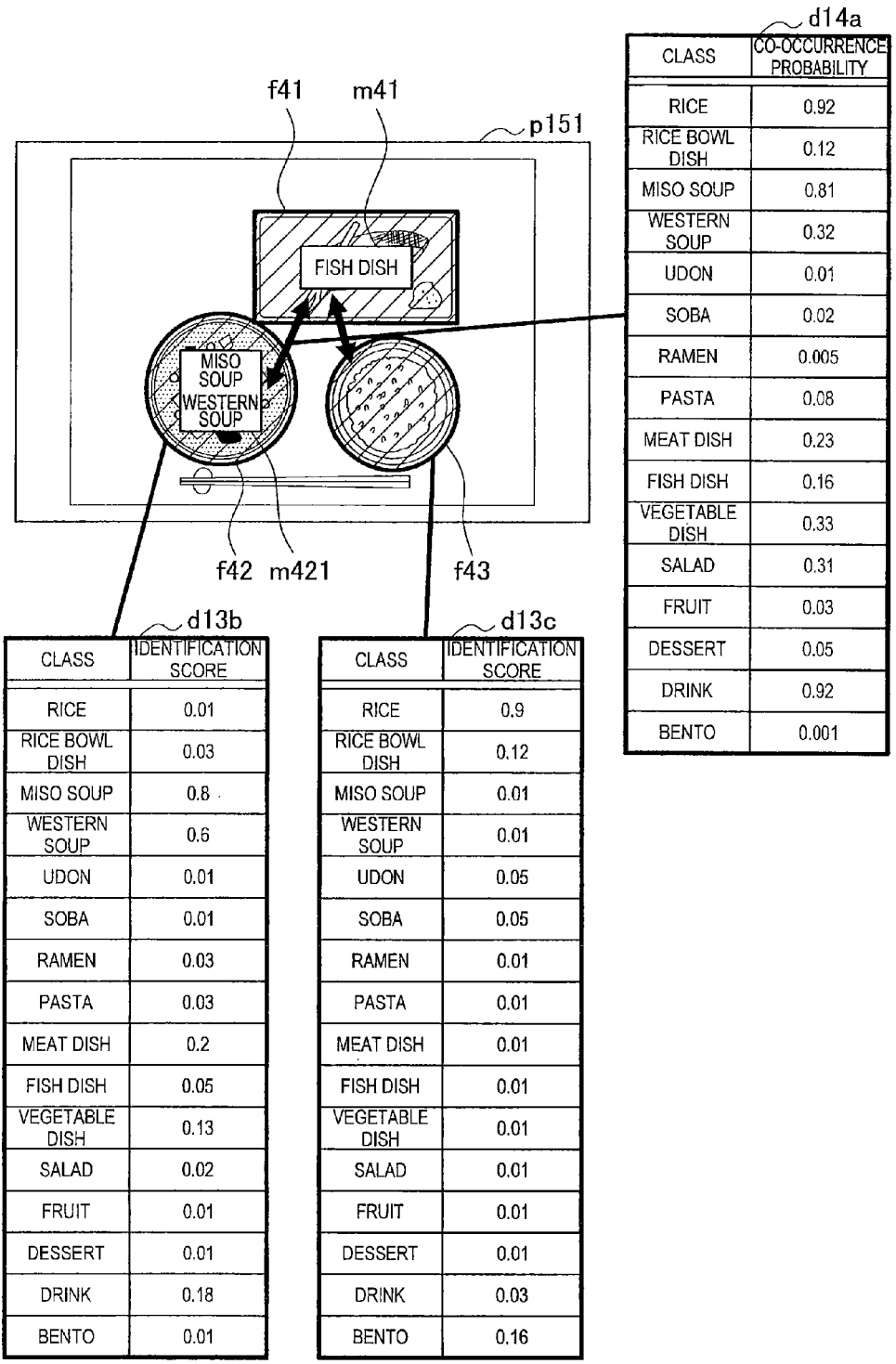
FIG. 14 is a diagram for describing a process of estimating identification information indicating an object in an image, which is performed by the information processing device of this embodiment.

Next, an operation of the information processing device 10 will be described which is performed when the user U1 newly sets a region indicating an object with respect to an image displayed on the display unit 206. Note that, in the description that follows, it is assumed that the image p151 of FIG. 13 shows a situation before a region has been specified, and FIG. 14 shows a situation after a region has been specified. FIG. 14 is a diagram for describing a process of estimating identification information indicating an object in an image, which is performed by the information processing device 10 of this embodiment. Specifically, in the example of FIG. 14, an image p152 is shown in which a region f43 has been specified with reference to the image p151 of FIG. 13. Therefore, in the description that follows, an operation of each component of the information processing device 10 will be described, assuming that the user U1 has specified the region f43 of FIG. 14. It is also assumed that the correctness determination unit 108, the extraction unit 114, and the estimation unit 118 hold data which has been obtained in the "process based on obtaining of an image." Note that if data obtained in the "process based on obtaining of an image" is discarded in succession, the correctness determination unit 108, the extraction unit 114, and the estimation unit 118 may newly obtain the data when necessary.

The display control unit 120 displays, on the display unit 206, a U/I for specifying a region in an image displayed on the display unit 206. Note that control data for displaying the U/I may be stored in a place from which the display control unit 120 can read the data.

The user U1 specifies a region in an image by operating the U/I displayed on the display unit 206 using the operation unit 204. Here, it is assumed that, as shown in FIG. 14, the region f43 has been specified in the image p152. Note that a specific example of the U/I for specifying a region in an image will be described below in Examples 1 and 2.

When the region f43 has been specified in the image p152 displayed on the display unit 206, the object specification unit 106 obtains information indicating the region f43 in the image p152 from the operation unit 204. The information indicating the region f43 may, for example, be information indicating the location and size of the region f43 in the image p152. The object specification unit 106 generates region data corresponding to the region f43 based on the obtained information indicating the region f43. Note that the region data generated by the object specification unit 106 is similar to that which is generated by the object extraction unit 104 as described above.

The object specification unit 106 outputs the generated region data to the correctness determination unit 108. Note that, in the description that follows, it is assumed that the object specification unit 106 has output the region data corresponding to the region f43 to the correctness determination unit 108.

The correctness determination unit 108 obtains the region data of the region f43 from the object specification unit 106. Based on the obtained region data, the correctness determination unit 108 specifies the region f43 in the image which has been obtained from the object extraction unit 104 in the "process based on obtaining of an image." After the region f43 has been specified in the image, the correctness determination unit 108 calculates the identification scores d13 of an object included in the region f43. Note that the method for calculating the identification scores d13 is similar to that which has been described above in the "process based on obtaining of an image." The identification scores d13 of the object corresponding to the region f43 may be hereinafter referred to as "identification scores d13c."

The correctness determination unit 108 outputs the newly obtained region data, and the identification scores d13 of the object in the region, to the extraction unit 114. In the description that follows, it is assumed that the correctness determination unit 108 has output the region data of the region f43 and the identification scores d13c of the object in the region f43 to the extraction unit 114.

The extraction unit 114 obtains the region data of the region f43 and the identification scores d13c of the object in the region f43 from the correctness determination unit 108. The extraction unit 114 looks up the obtained identification scores d13c to find any object class for which the identification score d13c has a value of not less than a predetermined threshold. Note that when an object class is successfully found, the extraction unit 114 extracts the co-occurrence probability data d14 corresponding to the object class, and associates the region data with identification information indicating the object class as described above in the "process based on obtaining of an image."

The extraction unit 114 outputs the region data of the region f43 to the estimation unit 118. The extraction unit 114, when extracting the co-occurrence probability data d14 based on the identification scores d13 of the object in the region f43, outputs the extracted co-occurrence probability data d14 to the estimation unit 118. Note that, here, it is assumed that the extraction unit 114 has failed to extract the co-occurrence probability data d14 based on the identification scores d13 of the object in the region f43. Therefore, it is assumed that the region data corresponding to the region f43 has not associated with identification information indicating the object in the region f43.

The estimation unit 118 obtains the region data corresponding to the region f43 and the identification scores d13 of the object in the region f43c from the extraction unit 114.

The estimation unit 118 determines whether or not identification information is associated with the obtained region data corresponding to the region f43. Here, it is assumed that identification information is not associated with the region data corresponding to the region f43.

The estimation unit 118 multiplies the identification score d13*c* of the object in the region f43 by the co-occurrence probability data d14 obtained in the "process based on obtaining of an image" to calculate new identification scores d13'. In the example of FIG. 14, the estimation unit 118 multiplies the identification scores d13*c* by the co-occurrence probability data d14*a* corresponding to the object in the region f41 to calculate identification scores d13'.

Note that the subsequent process performed on the region f43 is similar to the above "process based on obtaining of an image." Specifically, the estimation unit 118 compares the identification scores d13' corresponding to the object in the region f43 with the criteria 1 and 2, and based on the result of the comparison, associates the region data corresponding to the region f43 with identification information. Note that, in the description that follows, for ease of understanding an operation of the information processing device 10 of this embodiment, it is assumed that no object class that satisfies either of the criteria 1 and 2 has been found based on the identification scores d13' corresponding to the region f43. In other words, in this case, the region data corresponding to the region f43 has not been associated with identification information.

The display control unit 120 obtains the region data corresponding to the region f43 from the estimation unit 118, and based on the obtained region data, superimposes the region f43 on top of an image obtained in the "process based on obtaining of an image" on the display unit 206. Note that the region data corresponding to the region f43 has not been associated with identification information. Therefore, in this case, identification information corresponding to the region f43 is not displayed.

Thus, as shown in the image p152 of FIG. 14, the region f43 is superimposed on top of the image with reference to the image p151 of FIG. 13.

Although, in the foregoing, an example in which a new region is shown in an image has been described, a region already displayed in an image may be modified. In this case, the object specification unit 106 may obtain region data of a region which has been modified based on the user U1's operation from the operation unit 204, and output the region data to the correctness determination unit 108. Thereafter, the correctness determination unit 108, the extraction unit 114, the estimation unit 118, and the display control unit 120 may update unmodified region data which has already been obtained with modified region data, and perform the above series of processes on the updated region data.

Note that the object specification unit 106 may additionally obtain information indicating a region to be modified from the operation unit 204, and output the obtained information indicating the region to the correctness determination unit 108. Here, the information indicating a region refers to information for uniquely specifying a region in an image. As a specific example, the information indicating a region may be identification information attached to region data for identifying the region in an image, or the region data itself. If the correctness determination unit 108, the extraction unit 114, the estimation unit 118, and the display control unit 120 are notified of the information indicating a region, these components are allowed to specify region data of an object from unmodified region data which has already been obtained.

(Process Based on Setting of Identification Information)

Figure 15:
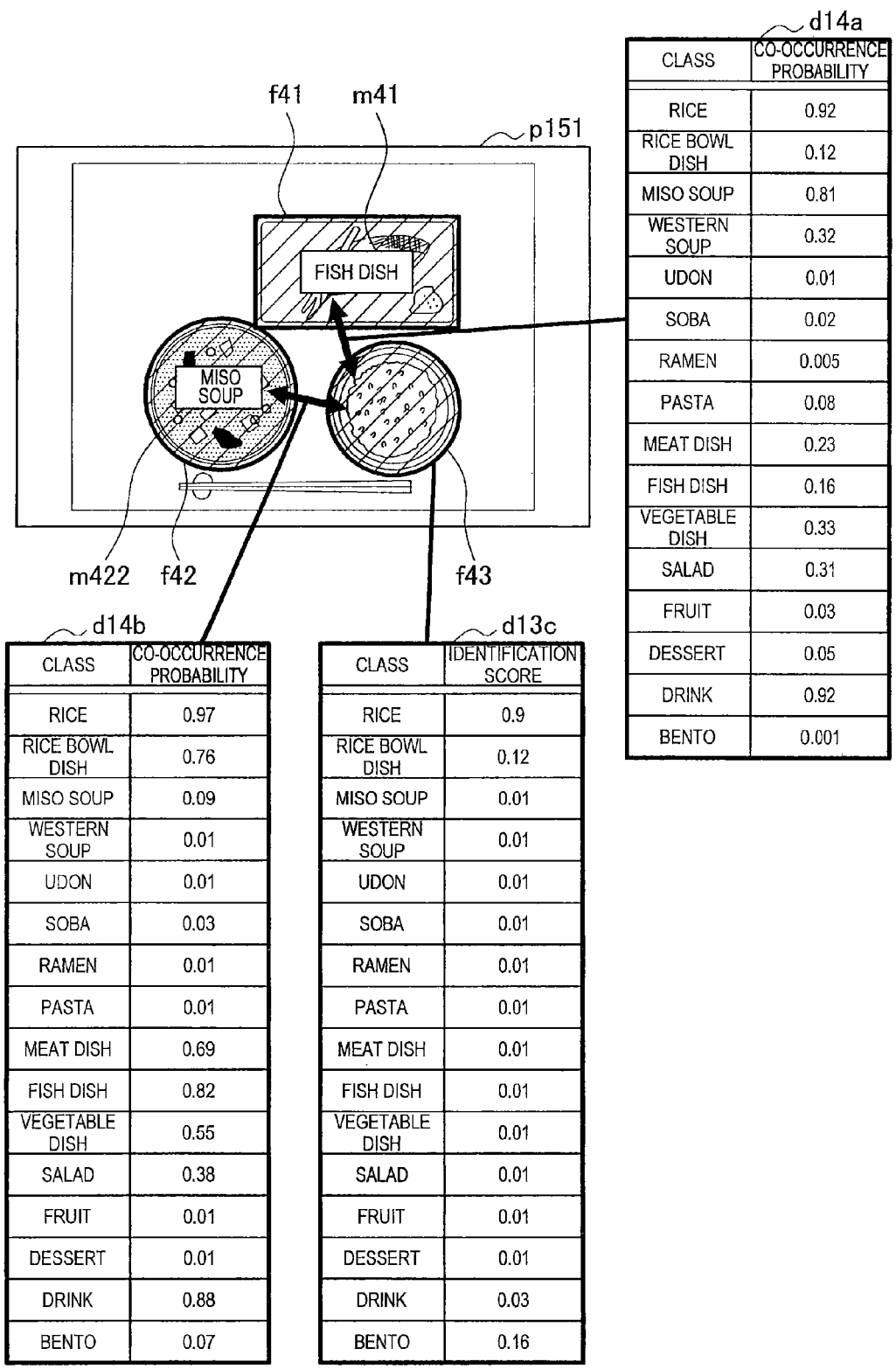
FIG. 15 is a diagram for describing a process of estimating identification information indicating an object in an image, which is performed by the information processing device of this embodiment.

Next, an operation of the information processing device 10 which is performed when the user U1 sets identification information with respect to a region in an image displayed on the display unit 206, will be described. Note that, in the description that follows, it is assumed that the image p152 of FIG. 14 shows a situation before identification information has been set, and FIG. 15 shows a situation after identification information has been set. FIG. 15 is a diagram for describing a process of estimating identification information indicating an object in an image, which is performed by the information processing device 10 of this embodiment. Specifically, in the example of FIG. 15, an image p153 is shown in which "miso soup" has been selected from candidates for the object in the region f42 which are presented as the identification information m421, with reference to the image p152 of FIG. 14. Note that, as in the description of the "process based on setting of a region," it is assumed that the correctness determination unit 108, the extraction unit 114, and the estimation unit 118 hold data obtained in the "process based on setting of a region."

The user U1 selects one corresponding to identification information indicating the object in the region f42 from the candidates presented as the identification information m421 by operating a U/I displayed on the display unit 206 using the operation unit 204. In the description that follows, it is assumed that "miso soup" has been selected as identification information indicating the object in the region f42.

When one is selected from the candidates presented as the identification information m421, the identification information specification unit 112 obtains, from the operation unit 204, information indicating the selected candidate and information indicating the region f42 associated with the identification information m421.

Note that when it is difficult to obtain the information indicating the selected candidate and the information indicating the region f42 directly from the operation unit 204, the identification information specification unit 112 may obtain information indicating a location in the image specified by the user U1 from the operation unit 204. In this case, the identification information specification unit 112 may obtain location information of each region and identification information displayed in an image from the display control unit 120, and check the location information with the location specified by the user U1, to specify the information indicating the selected candidate and the information indicating the region f42.

The identification information specification unit 112 outputs the information indicating the candidate selected by the user U1 and the information indicating the region f42 to the extraction unit 114.

The extraction unit 114 obtains the information indicating the candidate selected by the user U1 and the information indicating the region f42 from the identification information specification unit 112.

The extraction unit 114 extracts the co-occurrence probability data d14 corresponding to an object class indicated by the obtained candidate from the co-occurrence probability data storage unit 116. In the example of FIG. 15, "miso soup" has been selected from candidates for the object in the region f42 which are presented as the identification information m421. Therefore, the extraction unit 114 extracts co-occurrence probability data d14*b* corresponding to "miso soup."

Based on the obtained information indicating the region f42, the extraction unit 114 also selects region data corresponding to the region f42 from the region data which has already been obtained. After having selected region data corresponding to the region f42, the extraction unit 114 associates the region data corresponding to the region f42 with identification information indicating the obtained candidate, i.e., identification information indicating "miso soup."

The extraction unit 114 outputs the region data of the region f42 updated by being associated with identification information, and the newly extracted co-occurrence probability data d14b, to the estimation unit 118.

The estimation unit 118 obtains the updated region data corresponding to the region f42 and the co-occurrence probability data d14b from the extraction unit 114.

The estimation unit 118 updates the region data corresponding to the region f42 before updating which has already been obtained, with the region data corresponding to the updated region f42 which is newly obtained. Thereafter, for each of the obtained pieces of region data, the estimation unit 118 determines whether or not the region data has been associated with identification information indicating the result of identification of an object in a region indicated by the region data, and extracts region data which has not been associated with identification information. In the example of FIG. 15, the estimation unit 118 extracts the region data corresponding to the region f43.

For the extracted region data corresponding to the region f43, the estimation unit 118 multiplies the identification scores d13c of the object in the region f43 by the obtained co-occurrence probability data d14 to calculate new identification scores d13'.

Here, in the example of FIG. 15, the estimation unit 118 obtains, as the co-occurrence probability data d14, co-occurrence probability data d14a corresponding to "fish dish" which is the object in the region f41, and co-occurrence probability data d14a corresponding to "miso soup" which is the object in the region f42.

When there is a plurality of pieces of co-occurrence probability data d14 as described above, the estimation unit 118 multiplies each piece of co-occurrence probability data d14 by the identification scores d13c to calculate identification score d13' for each piece of co-occurrence probability data d14. In the example of FIG. 15, the estimation unit 118 multiplies the identification scores d13c by the co-occurrence probability data d14a to calculate identification score d13', and multiplies the identification scores d13c by the co-occurrence probability data d14b to calculate identification score d13'.

Thereafter, the estimation unit 118 calculates the average of the identification scores d13' calculated for the pieces of co-occurrence probability data d14, as identification score d13' for the corresponding region.

Note that the subsequent process is similar to the "process based on obtaining of an image" or the "process based on setting of a region" and therefore will not be described in detail. By repeatedly performing the above operation, regions indicating objects captured in an image are set in the image, and identification information indicating the objects in the regions is displayed in the set regions in association with the regions.

On the other hand, an image in which a region of an object captured in the image and identification information indicating the object in the region have been set may be used as sample data for calculating the identification scores d13 or the co-occurrence probability data d14.

As a specific example, it is assumed that "fish dish" and "miso soup" have been detected as objects from an image obtained from the image capture unit 202. In this case, a partial image of a region corresponding to "fish dish" in the image may be used as sample data for calculating the identification score d13 indicating the correctness with which an object is "fish dish." Also, "fish dish" and "miso soup" have been detected as objects from the image. Therefore, the image from which "fish dish" and "miso soup" have been detected may be used as sample data for calculating the co-occurrence probability between "fish dish" and "miso soup."

Therefore, the information processing device 10 of this embodiment may include the updating unit 122 for updating the identification scores d13 and the co-occurrence probability data d14 for each object class.

Specifically, the updating unit 122 obtains an obtained image, region data corresponding to a region set in the image, and identification information with which the region data has been associated, from the estimation unit 118. Here, the identification information with which the region data has been associated indicates the result of identification of an object in a region indicated by the region data.

Specifically, the updating unit 122 stores an obtained image, and region data which has been associated with identification information, into the feature amount data storage unit 110. For example, it is assumed that "fish dish" and "miso soup" have been detected as objects from the obtained image. In this case, a partial image of a region corresponding to "fish dish" in the image may be used as sample data for calculating the identification score d13 indicating the correctness with which an object is "fish dish." Therefore, the updating unit 122 stores the image from which "fish dish" and "miso soup" have been detected as objects, as sample data for calculating the identification scores d13 of "fish dish" and "miso soup," to the feature amount data storage unit 110.

The updating unit 122 may store an obtained image, and region data which has been associated with identification information, into the co-occurrence probability data storage unit 116. For example, an image in which "fish dish" and "miso soup" have been detected may be used as sample data for calculating the co-occurrence probability between "fish dish" and "miso soup." Therefore, the updating unit 122 stores the image in which "fish dish" and "miso soup" have been detected as objects, as sample data for calculating or updating the co-occurrence probability between "fish dish" and "miso soup," into the co-occurrence probability data storage unit 116.

Thus, if the updating unit 122 is provided, the information processing device 10 of this embodiment can improve the accuracy of recognition and identification of an object in an image by repeatedly performing the obtaining of an image and the process of recognizing and identifying objects in the image.

Although, in the foregoing, an example has been described in which one for identification information indicating an object in a region is selected from candidates presented as the identification information, the user U1 may be allowed to directly input identification information indicating an object in an image. In this case, the identification information specification unit 112 may output identification information indicating an object which has been input by the user U1, and information indicating a region, to the extraction unit 114. Note that processes following this are similar to those which are performed when a candidate for identification information indicating an object in an image is selected.

When a region has been specified and then an object has been identified in the region, an object in another region may be identified based on the co-occurrence probability data d14 corresponding to the newly identified object. For example, the example of FIG. 14 has been described above in which when the region f43 has been specified, it is difficult to recognize the object in the region f43 as "rice." On the other hand, it is assumed that the object has been recognized as "rice" based on the identification scores d13 of the object in the region f43. In this case, the information processing device 10 may extract the co-occurrence probability data d14 corresponding to the identified "rice." Thereafter, the information processing device 10 may determine whether the object in the region f42 is "miso soup" or "western soup" which are presented as candidates in the identification information m421, based on the extracted co-occurrence probability data d14 of "rice."

Although an example has been described above in which a dish captured in an image is recognized and identified as an object, the object is not limited to a dish. As a specific example, a human captured in an image may be recognized and identified as an object by applying a facial recognition technology. For example, FIG. 16 is a diagram for describing an example application of the information processing system 1 of this embodiment, showing an example in which a human captured in an image is detected using a facial recognition technology.

Figure 16:
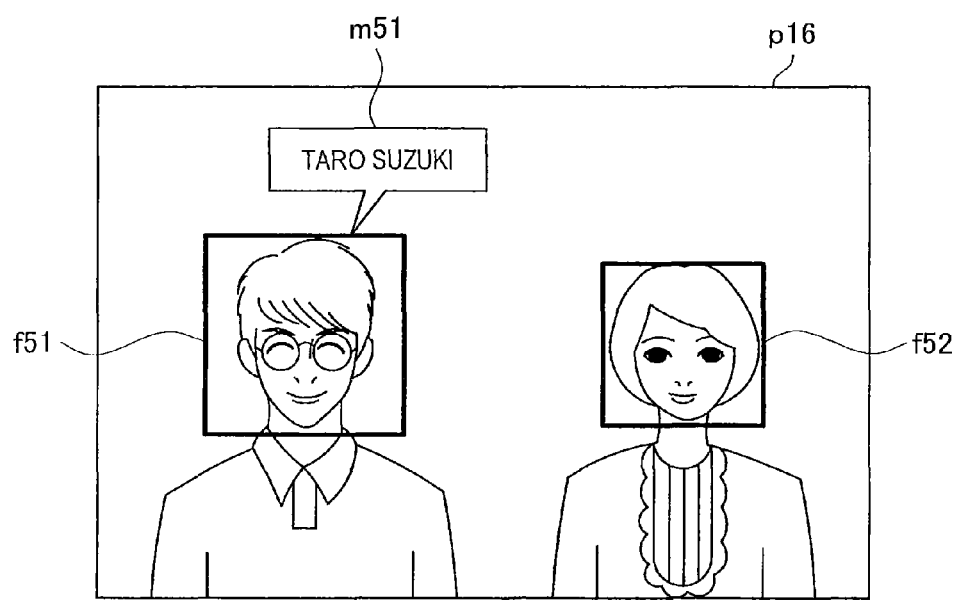
FIG. 16 is a diagram for describing an example application of the information processing system of this embodiment.

In the example of FIG. 16, it is assumed that a man and a woman have been captured in an image p16, and a region f51 corresponding to the man and a region f52 corresponding to a woman have been set based on the result of recognition of the faces of the man and woman. It is also assumed that, at this time, the user U1 has set identification information m51 indicating "Taro Suzuki" as identification information indicating the human in the region f51.

Figure 17:
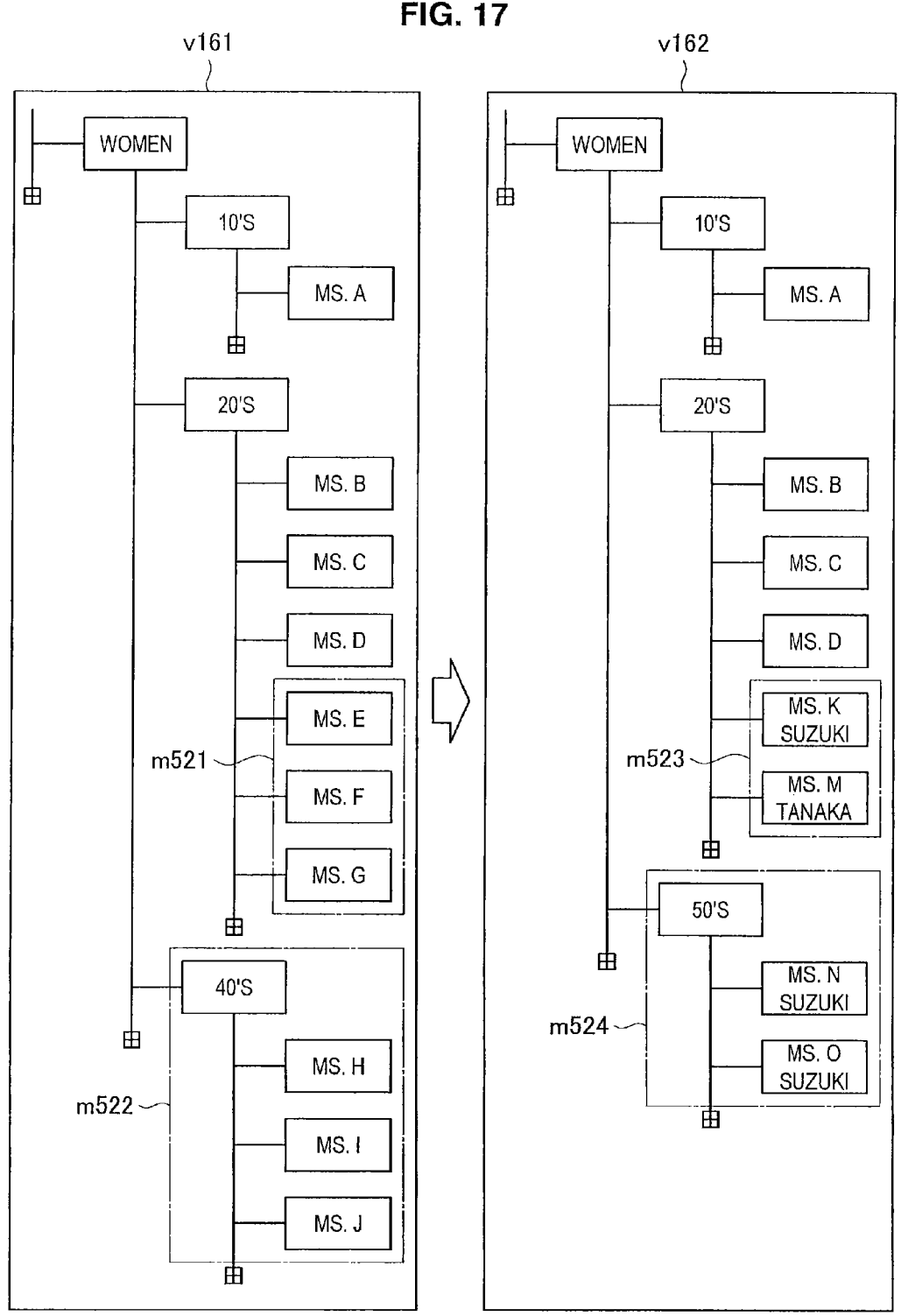
FIG. 17 is a diagram for describing an example application of the information processing system of this embodiment.

Here, refer to FIG. 17. FIG. 17 is a diagram for describing an example application of the information processing system 1 of this embodiment, showing the results of estimation of the human in the region f52 before and after the identification information m51 has been set for the human in the region f51. In FIG. 17, a list v161 indicates the result of estimation of the human in the region f52 before the identification information m51 has been set for the human in the region f51. In other words, the estimation result indicated in the list v161 is the result of estimation of the human in the region f52 only based on the identification scores d13 of the human in the region f52.

In contrast to this, a list v162 indicates the result of estimation of the human in the region f52 after the identification information m51 has been set for the human in the region f51. In other words, the list v162 indicates the result of estimation of the human in the region f52 based on the identification scores d13 of the human in the region f52, and the co-occurrence probability data d14 corresponding to "Taro Suzuki" indicated by the identification information m51.

As shown in FIG. 17, for example, it is assumed that "Taro Suzuki" has only a few female acquaintances in their forties, and there has been little chance of him being photographed together with them. In this case, the co-occurrence probability between "Taro Suzuki" and a woman in her forties is low. Based on such an assumption, for example, as indicated in the list v161, humans indicated by a reference character m522 are extracted as candidates when the human in the region f52 is determined only based on the identification scores d13. In contrast to this, when the identification information m51 is set for the human in the region f51, the humans indicated in the reference character m522 are excluded from candidates as indicated in the list v162.

When attention is paid to women in their twenties, then if the determination is performed only based on the identification scores d13 of the human in the region f52, the human in the region f52 is highly likely to be among humans indicated by a reference character m521. In contrast to this, when the identification information m51 is set for the human in the region f51, the human in the region f52 is more likely to be among humans (e.g., family members etc.) indicated by a reference character m523 than among humans indicated by the reference character m521, as indicated by the list v162.

Also, as indicated by a reference character m524 in the list v162, humans which have not been considered as candidates, because of the low probability, before the identification information m51 has been set, may be estimated based on the co-occurrence probability between those humans and "Taro Suzuki."

Although, in the above example in which objects are dishes, the co-occurrence probability is calculated based on accumulated sample data, the present disclosure is not limited to this. Any technique that can determine the co-occurrence probability between one object and another object may be employed. For example, when objects are dishes, the co-occurrence probability may be determined based on whether or not dishes go well together (e.g., dishes taste good together). When humans are detected from an image, the co-occurrence probability may be determined based on a history of mail between humans to be detected, a human relationship between relatives or friends, etc.

Also, if sample data is shared by a plurality of users, the accuracy of the identification scores d13 or the co-occurrence probability data d14 may be improved. As a specific example, this may be achieved by managing the feature amount data storage unit 110 or the co-occurrence probability data storage unit 116 in a cloud server, such as a social network etc., and thereby allowing a plurality of users to share the feature amount data storage unit 110 or the co-occurrence probability data storage unit 116.

The configuration of FIG. 6 is only for illustrative purposes. The arrangement of the components of the information processing device 10 and the user terminal 20 are not limited, if the input-output relation between the components is not changed. For example, the components of the information processing device 10 may be incorporated in the user terminal 20 to provide a standalone configuration. Although, in the example of FIG. 6, the display control unit 120 is provided in the information processing device 10, the display control unit 120 may be provided in the user terminal 20. Note that, in the configuration of FIG. 6, when attention is paid to the information processing device 10, the estimation unit 118 corresponds to an example of the "identification information obtaining unit." Similarly, when attention is paid to the user terminal 20, a configuration which obtains region data from the display control unit 120 in the display unit 206 obtains identification information indicating candidates with which the region data has been associated, and corresponds to an example of the "identification information obtaining unit."

[1. 3. Process]

Next, a flow of a series of steps in the information processing device 10 of this embodiment will be described, particularly the characteristic "process based on setting of a region," "process based on setting of identification information," and "process involved in displaying identification information."

(Process Based on Setting of Region)

Figure 18:
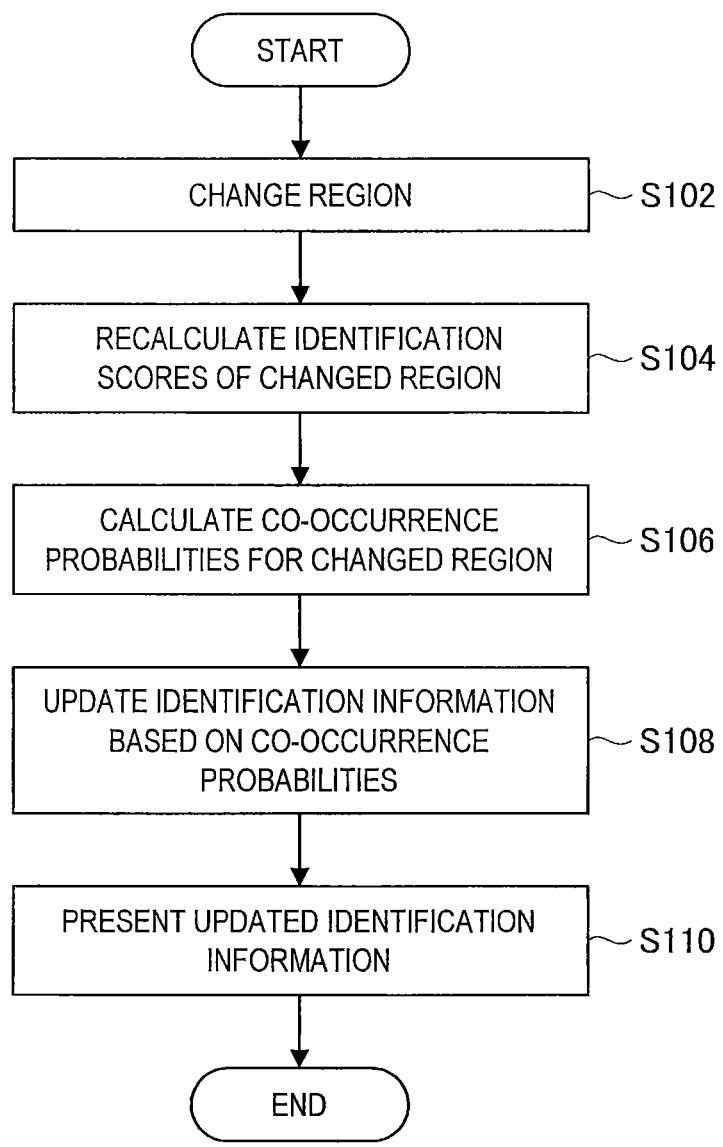
FIG. 18 is a flowchart showing an operation of the information processing device of this embodiment.

Firstly, a series of operations of the information processing device 10 based on setting of a region will be described with reference to FIG. 18, particularly an example where the user U1 changes a region set in an image. FIG. 18 is a flowchart showing an operation of the information processing device 10 of this embodiment, particularly a case where a region set in an image is changed.

(Step S102)

For example, it is assumed that regions f41 and f42 have been set in an image, and an object in the region f41 has been identified as "rice." At this time, when the user U1 changes the range of the region f42, the object specification unit 106 obtains information indicating the region f42 modified according to the user U1's operation, and the region data of the modified region f42, from the operation unit 204. The object specification unit 106 outputs the information indicating the region f42 and the region data corresponding to the modified region f42 to the correctness determination unit 108.

(Step S104)

The correctness determination unit 108 obtains the information indicating the region f42 and the region data corresponding to the modified region f42 from the object specification unit 106. Based on the obtained information indicating the region f42, the correctness determination unit 108 selects the region data corresponding to the unmodified region f42 from pieces of region data which have already been obtained. Thereafter, the correctness determination unit 108 updates the selected region data corresponding to the unmodified region f42 with the newly obtained region data corresponding to the modified region f42. Note that, in the description that follows, even unless particularly specified, it is assumed that the extraction unit 114, the estimation unit 118, and the display control unit 120 are notified of the information indicating the region f42 to specify the region data corresponding to the region f42. Note that the technique of specifying region data based on the information indicating the region f42 is only for illustrative purposes. Any technique that can specify region data corresponding to the region f42 may be employed.

After the region data corresponding to the region f42 has been updated, the correctness determination unit 108 specifies the updated region f42 in the image which has already been obtained, i.e., the image displayed on the display unit 206. After the region f42 has been specified in the image, the correctness determination unit 108 recalculates the identification scores d13 of an object included in the region f42. The identification scores d13 of the object corresponding to the updated region f42 may be hereinafter referred to as "identification scores d13b."

The correctness determination unit 108 outputs the region data corresponding to the updated region f42, and the recalculated identification scores d13b of the object in the region f42, to the extraction unit 114.

(Step S106)

The extraction unit 114 obtains the region data corresponding to the updated region f42, and the recalculated identification scores d13b of the object in the region f42, from the correctness determination unit 108.

The extraction unit 114 looks up the obtained identification scores d13b to find an object class for which the identification score d13b has a value of not less than a predetermined threshold. Note that the operation which is performed when an object class has been successfully found, is similar to the above "process based on obtaining of an image." That is, the extraction unit 114 extracts the co-occurrence probability data d14 corresponding to the object class, and associates the region data with identification information indicating the object class.

The extraction unit 114 outputs the region data of the updated region f42 to the estimation unit 118. Also, the extraction unit 114, when extracting the co-occurrence probability data d14 based on the identification scores d13b of the object in the updated region f42, outputs the extracted co-occurrence probability data d14 to the estimation unit 118.

Note that, here, it is assumed that the extraction unit 114 has failed to extract the co-occurrence probability data d14 based on the identification scores d13b of the object in the updated region f42. Therefore, it is assumed that the region data corresponding to the updated region f42 has not been associated with identification information indicating the object in the updated region f42.

(Step S108)

The estimation unit 118 obtains the region data corresponding to the updated region f42, and the identification scores d13b of the object in the updated region f42, from the extraction unit 114.

The estimation unit 118 determines whether or not the obtained region data corresponding to the updated region f42 has been associated with identification information. Here, it is assumed that the region data corresponding to the updated region f42 has not been associated with identification information.

The estimation unit 118 multiplies the identification scores d13b of the object in the updated region f42 by the co-occurrence probability data d14 which has already been obtained for the object in the region f41, i.e., the co-occurrence probability data d14 for "rice" to calculate new identification scores d13'.

The estimation unit 118 compares the identification scores d13' corresponding to the object in the updated region f42 with the criteria 1 and 2, and based on the result of the comparison, associates the region data corresponding to the region f42 with identification information.

The estimation unit 118 outputs the region data corresponding to the updated region f42 to the display control unit 120.

(Step S110)

The display control unit 120 obtains the region data corresponding to the updated region f42 from the estimation unit 118. The display control unit 120 updates the region f42 which has already been displayed in the image, based on the obtained region data corresponding to the updated region f42.

The display control unit 120 also extracts the identification information with which the obtained updated region f42 has been associated, and the displayed identification information with which the region f42 has already been associated, with the extracted identification information.

Thus, when the range of the region f42 is changed, the result of identification of the object in the region f42 is updated based on the changed region f42, and based on the updated identification result, the identification information with which the region f42 has been associated is updated.

(Process Based on Setting of Identification Information)

Figure 19:
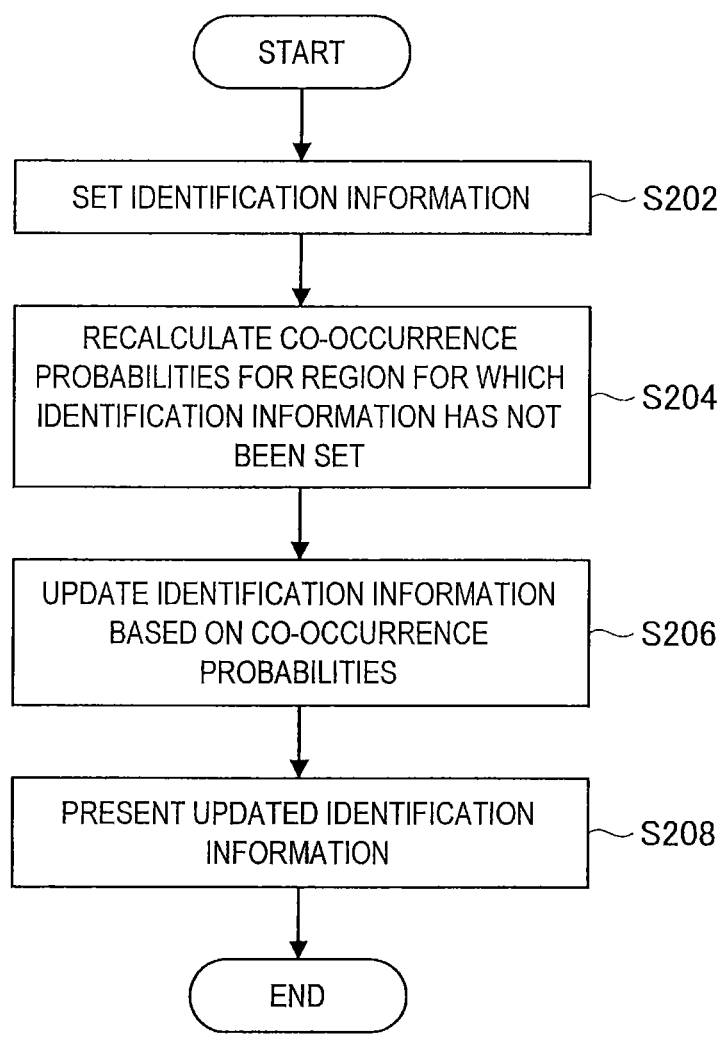
FIG. 19 is a flowchart showing an operation of the information processing device of this embodiment.

Next, a series of operations of the information processing device 10 based on setting of identification information will be described with reference to FIG. 19, particularly an example where the user U1 sets identification information for a region in an image. FIG. 19 is a flowchart showing an operation of the information processing device 10 of this embodiment which is performed when identification information is set for a region in an image.

(Step S202)

For example, it is assumed that regions f41 and f42 have been set in an image, and "miso soup" and "ramen (a Japanese noodle dish)" are presented as candidates for the result of identification of an object in the region f42. At this time, when the user U1 sets "rice" as identification information indicating an object in the region f41, the identification information specification unit 112 obtains information indicating "rice" set as identification information indicating the object, and information indicating the region f41 for which the "rice" has been set, from the operation unit 204.

The identification information specification unit 112 outputs the information indicating "rice" selected by the user U1, and the information indicating the region f41, to the extraction unit 114.

(Step S204)

Based on the obtained information indicating "rice," the extraction unit 114 extracts the co-occurrence probability data d14a corresponding to "rice" from the co-occurrence probability data storage unit 116.

Based on the obtained information indicating the region f41, the extraction unit 114 also selects region data corresponding to the region f41 from pieces of region data which have already been obtained. After the region data corresponding to the region f41 has been selected, the extraction unit 114 associates the region data corresponding to the region f41 with the identification information indicating "rice." Note that, in the description that follows, even unless particularly specified, it is assumed that the estimation unit 118 and the display control unit 120 are notified of the information indicating the region f41 to specify the region data corresponding to the region f41.

The extraction unit 114 outputs the region data of the region f41 updated by being associated the identification information, and the newly extracted co-if, occurrence probability data d14a corresponding to "rice," to the estimation unit 118.

(Step S206)

The estimation unit 118 obtains the region data corresponding to the updated region f41 and the co-occurrence probability data d14a from the extraction unit 114.

The estimation unit 118 updates the region data corresponding to the region f41 which has already been obtained and has not yet been updated, with the newly obtained region data corresponding to the updated region f41. Thereafter, for each of the obtained pieces of region data, the estimation unit 118 determines whether or not the region data has been associated with identification information indicating the result of identification of an object in a region indicated by the region data, to newly extract region data which has not been associated with identification information. Note that the region f42 has been associated with identification information indicating candidates for the result of identification rather than identification information indicating the result of identification of an object. Therefore, here, it is assumed that the region data corresponding to the region f42 has been extracted.

For the extracted region data corresponding to the region f42, the estimation unit 118 multiplies the identification scores d13 of the object in the region f42 by the obtained co-occurrence probability data d14 to recalculate identification scores d13' corresponding to the object in the region f42.

Here, the estimation unit 118 obtains, as the co-occurrence probability data d14, the co-occurrence probability data d14a corresponding to "rice" which is the object in the region f41. Therefore, the estimation unit 118 multiplies the identification scores d13 of the object in the region f42 by the co-occurrence probability data d14a corresponding to "rice" to recalculate identification scores d13' corresponding to the object in the region f42.

The estimation unit 118 compares the recalculated identification scores d13' corresponding to the object in the region f42 with the criteria 1 and 2, and based on the result of the comparison, associates the region data corresponding to the region f42 with identification information. As a result, the region data corresponding to the region f42 is updated.

The estimation unit 118 outputs the region data corresponding to the updated region f42 to the display control unit 120.

(Step S208)

The display control unit 120 obtains the region data corresponding to the updated region f42 from the estimation unit 118. Based on the region data corresponding to the updated region f42, the display control unit 120 updates the region f42 which has already been displayed in the image.

The display control unit 120 also extracts identification information with which the obtained updated region f42 has been associated, and updates identification information which has already been displayed in association with the region f42 with the extracted identification information.

Thus, when identification information indicating the object in the region f41 is set, the result of identification of the object in the region f42 is updated based on co-occurrence probability data corresponding to the result of identification of the region f41, and based on the updated identification result, identification information with which the region f42 has been associated is updated.

(Process Involved in Displaying Identification Information)

Figure 20:
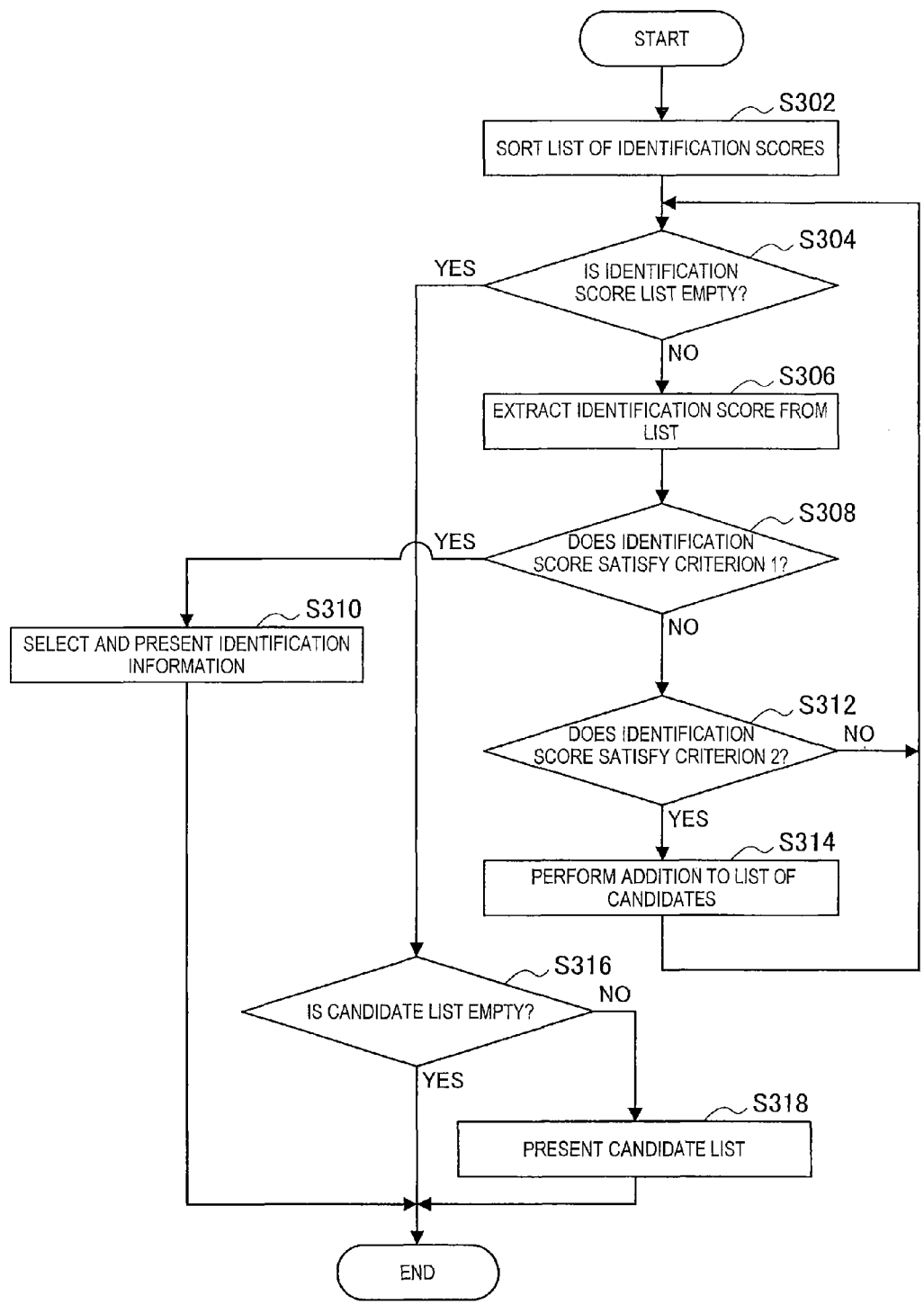
FIG. 20 is a flowchart showing an operation of the information processing device of this embodiment.

Next, a process involved in displaying identification information will be described with reference to FIG. 20, particularly an example detailed process of specifying identification information indicating the result of identification of an object in a region or identification information indicating candidates for the result of identification, and displaying the specified identification information in association with a corresponding region. FIG. 20 is a flowchart showing an operation of the information processing device 10 of this embodiment, particularly an operation which is performed when identification information indicating the result of identification of an object in a region or identification information indicating candidates for the result of identification is specified, and displayed in association with a corresponding region. Note that, in the description that follows, attention is paid to a process which is performed on a region f41 in an image, and it is assumed that the identification scores d13' of an object in the region f41 have already been calculated.

(Step S302)

After having calculated the identification scores d13' of the object in the region f41, the estimation unit 118 generates a list of the identification scores d13' for respective object classes, and sorts the identification scores d13' on the list into ascending order. Note that the list of the identification scores d13' may be hereinafter referred to as an "identification score list."

(Steps S304 and S306)

The estimation unit 118 determines whether or not the identification score list is empty, and when the identification score list is not empty (NO in step S304), extracts the identification score d13' of an object class included in the identification score list (step S306).

(Step S308)

The estimation unit 118 determines whether or not the identification score d13' extracted from the identification score list satisfies the criterion 1.

(Step S310)

If the extracted identification score d13' satisfies the criterion 1 (YES in step S308), i.e., the identification score d13' is higher than or equal to a first threshold, the estimation unit 118 recognizes an object class corresponding to the identification score d13' as the result of identification of the object in the region f41. Note that the first threshold is for allowing the estimation unit 118 to identify an object based on the identification scores d13'.

For example, when the identification score d13' of the object to be determined corresponds to "miso soup," the estimation unit 118 identifies the object in the region f41 as "miso soup." In this case, the estimation unit 118 associates the region data corresponding to the region f41 with identification information indicating an object class corresponding to the identification score d13', i.e., identification information indicating "miso soup," as identification information indicating the result of the identification of the object.

The estimation unit 118 outputs the region data corresponding to the region f41 which has associated with the identification information to the display control unit 120. The display control unit 120 superimposes the region f41 based on the obtained region data on top of an image displayed on the display unit 206. Thereafter, the display control unit 120 displays identification information indicating "miso soup" with which the region data corresponding to the region f41 has been associated, as the result of the identification of the object in the region f41, in association with the region f41.

Note that, when an identification score d13' satisfying the criterion 1 has been detected, it is not necessary for the estimation unit 118 to determine whether or not the other identification scores d13' on the identification score list satisfy the criteria 1 and 2.

(Step S312)

If the extracted identification score d13' does not satisfy the criterion 1 (NO in step S308), i.e., the identification score d13' is lower than the first threshold, the estimation unit 118 determines whether or not the identification score d13' satisfies the criterion 2.

(Step S314)

If the extracted identification score d13' satisfies the criterion 2 (YES in step S312), i.e., the identification score d13' is higher than or equal to a second threshold, the estimation unit 118 recognizes an object class corresponding to the identification score d13' as a candidate for the result of identification indicating the object in the region f41. Note that the second threshold is for allowing the estimation unit 118 to select a candidate for the result of identification of an object based on the identification scores d13'.

The estimation unit 118 adds the object class corresponding to the identification score d13' satisfying the criterion 2 to a list of candidates for the result of identification of the object in the region f41. Note that the list of candidates for the result of identification of an object may be hereinafter referred to as a "candidate list."

Note that if the extracted identification score d13' does not satisfy the criterion 2 (NO in step S312), i.e., the identification score d13' is lower than the second threshold, the estimation unit 118 does not add the object class corresponding to the identification score d13' to the candidate list.

(Step S304)

Thus, the estimation unit 118 performs steps S306 to S314 until an identification score d13' satisfying the criterion 1 has been detected or the identification score list has been empty.

(Step S316)

If the identification score list has been empty (YES in step S304), the estimation unit 118 determines whether or not the candidate list contains a candidate for the result of identification of the object in the region f41.

If the candidate list is empty (YES in step S316), the estimation unit 118 outputs the region data corresponding to the region f41 to the display control unit 120. The display control unit 120 superimposes the region f41 based on the obtained region data on top of the image displayed on the display unit 206. At this time, the region data corresponding to the region f41 has not been associated with identification information. Therefore, in this case, the display control unit 120 does not associate the region f41 with identification information.

If the candidate list is not empty (NO in step S316), the estimation unit 118 associates the region data corresponding to the region f41 with identification information included in the candidate list as a candidate(s) for the result of identification of the object in the region f41. Thereafter, the estimation unit 118 outputs the region data corresponding to the region f41 which has been associated with identification information, to the display control unit 120. The display control unit 120 superimposes the region f41 based on the obtained region data on top of the image displayed on the display unit 206. Thereafter, the display control unit 120 displays each piece of identification information with which the region data corresponding to the region f41 has been associated, as a candidate for the result of identification of the object in the region f41, in association with the region f41.

Thus, the estimation unit 118 determines whether or not each of the identification scores d13' of the object of the region f41 satisfies the criterion 1 or 2 to specify identification information indicating the result of identification of the object in the region or identification information indicating a candidate for the result of identification. As a result, based on the result of the determination of the identification scores d13', the display control unit 120 can display the identification information indicating the result of the identification of the object in the region f41 or the identification information indicating a candidate(s) for the result of the identification, in association with the region f41.

[1. 4. Example 1: Method for Specifying Region (Pointer Operation)]

Next, an example method for specifying a region in an image will be described as Example 1. Here, an example method for specifying a region in an image by operating a pointer c1 using a device, such as a mouse, a trackball, etc., will be described.

(Setting of Region)

Figure 21:
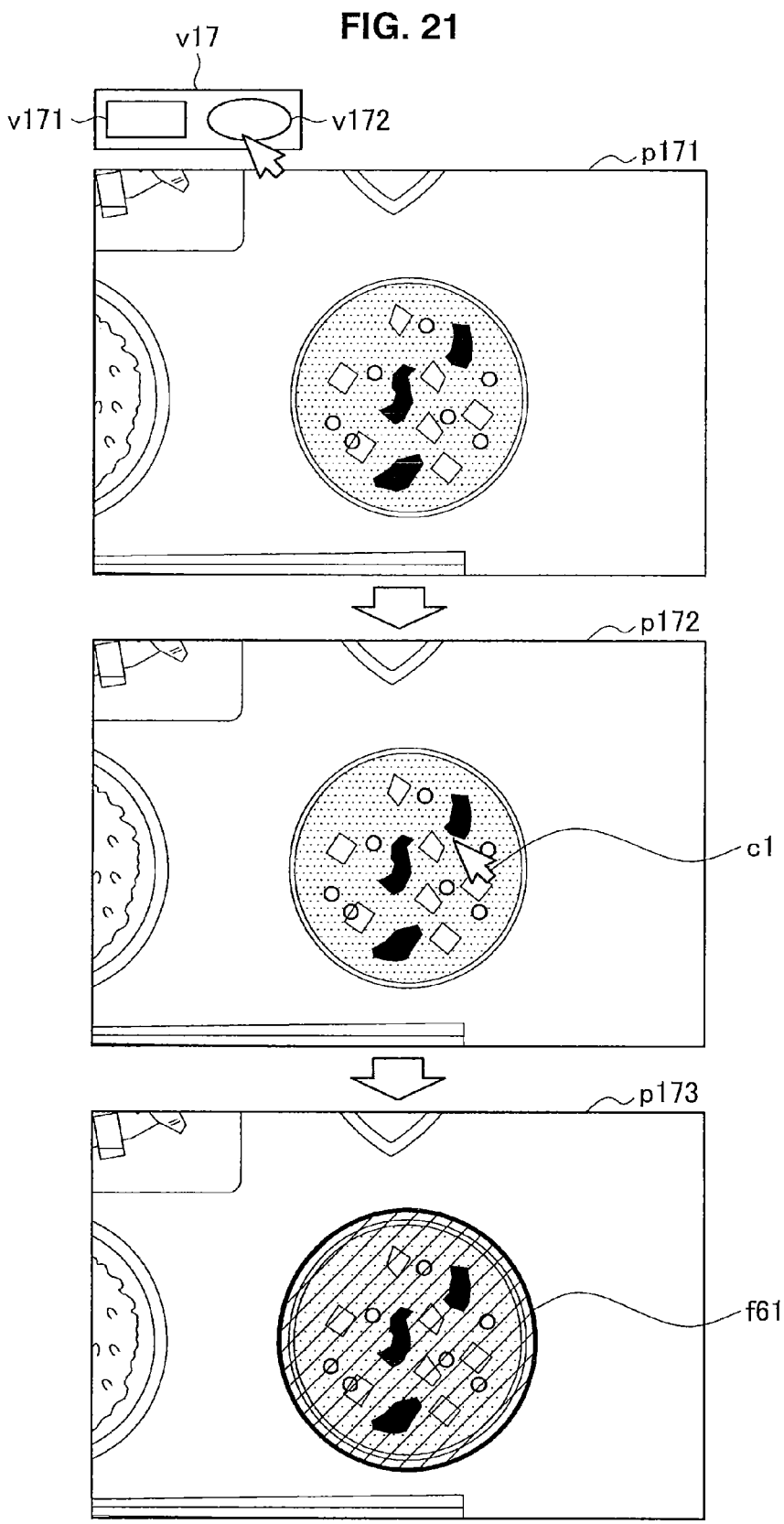
FIG. 21 is a diagram for describing an example method for specifying a region according to Example 1.

Firstly, refer to FIG. 21. FIG. 21 is a diagram for describing an example method for specifying a region according to Example 1, showing an example in which a region having a predetermined shape and size is set at a specified location in an image.

For example, a screen p171 of FIG. 21 shows a situation which occurs before a region has been set in an image. A reference character v17 indicates a region specification screen (hereinafter referred to as a "region specification portion v17") for specifying a region in an image. For example, in the example of FIG. 21, the region specification portion v17 includes an icon v171 for setting a rectangular region and an icon v172 for setting an elliptical region.

As shown in the screen p171, the user U1 selects an attribute (i.e., a shape or a size) of a region by clicking an icon corresponding to a desired region using the pointer c1. After having selected an attribute of a region to be set, the user U1 clicks a desired location in an image as shown in a screen p172.

When the user U1 clicks a location in an image by operating the pointer c1, the information processing device 10 sets a region having the selected attribute with reference to the location clicked by the pointer c1. In the example of FIG. 21, as shown in the screen p171, the user U1 clicks the icon v172 using the pointer c1 Therefore, as shown in a screen p173, the information processing device 10 sets an elliptical region f61 in the image.

(Deletion of Region)

Next, an example in which a region set in an image is deleted will be described with reference to FIG. 22. FIG. 22 is a diagram for describing an example method for specifying a region according to Example 1, showing an example in which a region set in an image is deleted.

For example, a screen p174 of FIG. 22 shows a situation in which a region f61 has been set in an image. As shown in the screen p174, the user U1 double-clicks a portion of the region f61 using the pointer c1.

After a portion of the region f61 has been double-clicked by the user U1 operating the pointer c1, the information processing device 10 deletes the region f61 chosen by double-clicking using the pointer c1, from the image, as shown in a screen p175.

(Movement of Region)

Figure 23:
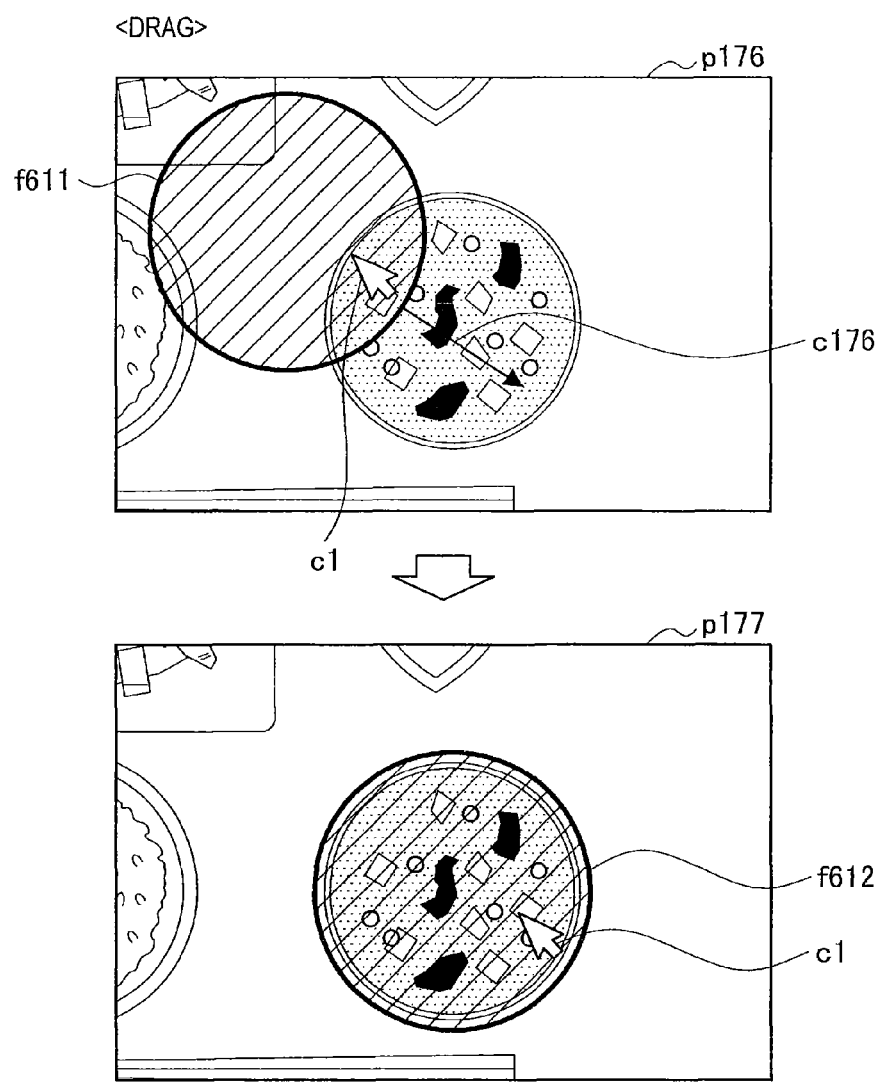
FIG. 23 is a diagram for describing an example method for specifying a region according to Example 1.

Next, an example in which a region set in an image is moved will be described with reference to FIG. 23. FIG. 23 is a diagram for describing an example method for specifying a region according to Example 1, showing an example in which a region set in an image is moved.

For example, a screen p176 of FIG. 23 shows a situation in which a region f611 has been set in an image. The user U1 drags a portion of the region f611 using the pointer c1 as indicated by a reference character c176 in the screen p176.

After a portion of the region f611 has been dragged by the user U1 operating the pointer c1, the information processing device 10 causes the region f611 to follow the drag operation performed using the pointer c1, thereby changing a location of the region f611 as shown by a region f612 in a screen p177. Note that the region f612 in the screen p177 indicates the region f611 which has been moved based on the drag operation.

(Changing of Size of Region)

Figure 24:
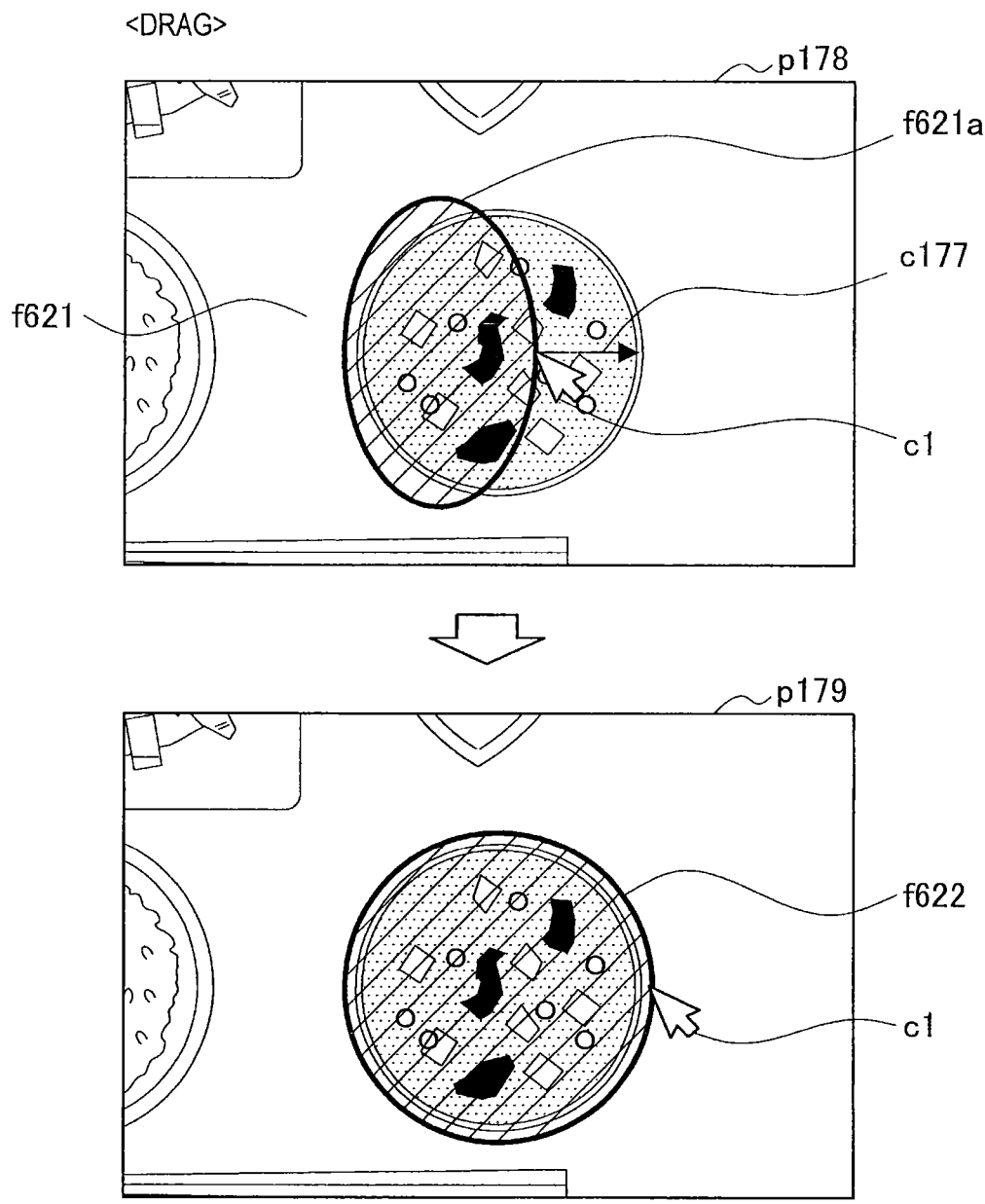
FIG. 24 is a diagram for describing an example method for specifying a region according to Example 1.

Next, an example in which a size of a region set in an image is changed will be described with reference to FIG. 24. FIG. 24 is a diagram for describing an example method for specifying a region according to Example 1, showing an example in which a size of a region set in an image is changed.

For example, a screen p178 of FIG. 24 shows a situation in which a region f621 has been set in an image. As indicated by a reference character c177 in the screen p178, the user U1 drags an outer edge f621a of the region f621 using the pointer c1.

After the outer edgef621a of the regionf621 has been dragged by the user U1 operating the pointer c1, the information processing device 10 changes a shape of the region f621 so that the outer edge f621a follows the drag operation performed using the pointer c1. As a result, a size of the region f621 is changed as indicated by a region f622 in a screen p179. Note that the region f622 in the screen p179 indicates the region f621 whose size has been changed based on the drag operation.

(Rotation of Region)

Figure 25:
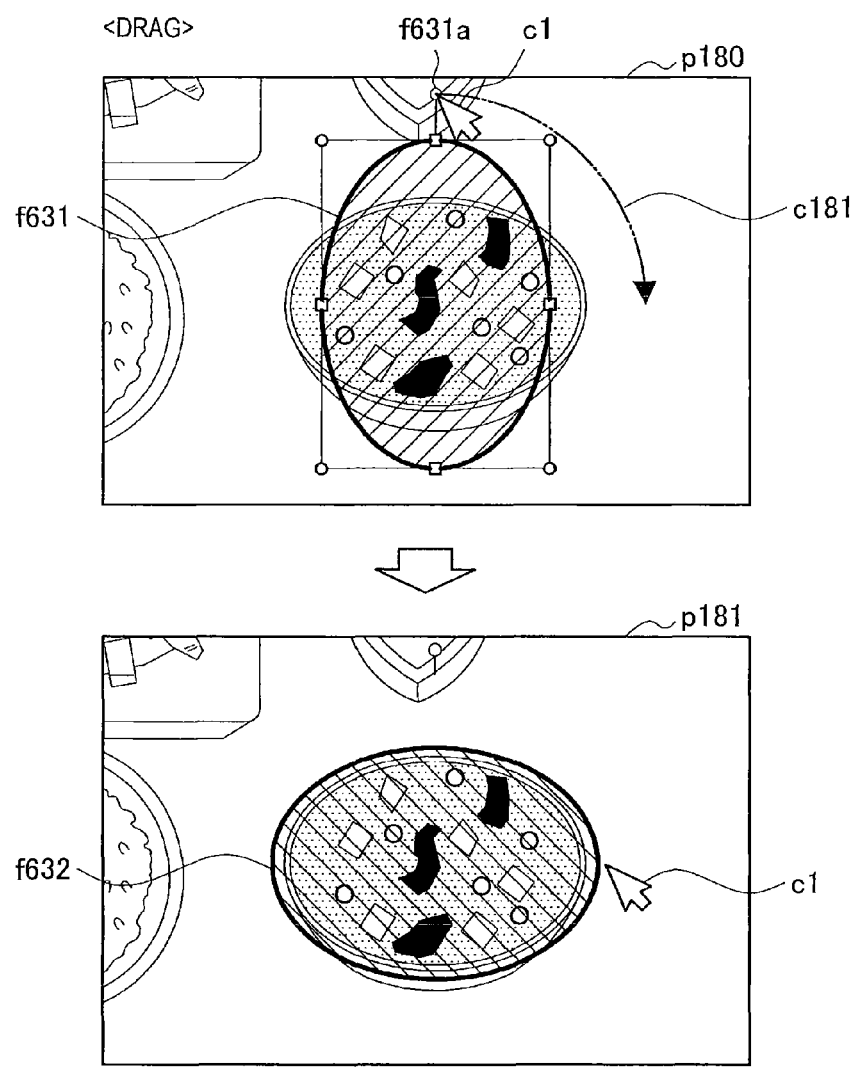
FIG. 25 is a diagram for describing an example method for specifying a region according to Example 1.

Next, an example in which an orientation of a region set in an image is changed by rotating the region will be described with reference to FIG. 25. FIG. 25 is a diagram for describing an example method for specifying a region according to Example 1, showing an example in which an orientation of a region set in an image is changed by rotating the region.

For example, a screen p180 of FIG. 25 shows a situation in which a region f631 has been set in an image. When the user U1 clicks the region f631 in the screen p180 using the pointer c1, the information processing device 10 displays a handle f631a. Next, the user U1 drags the handle f631a using the pointer c1 as indicated by a reference character c181 in the screen p180.

After the handle f631a has been dragged by the user U1 operating the pointer c1, the information processing device 10 rotates the region f631 so that the handle f631a follows the drag operation performed by the pointer c1. As a result, an orientation of the region f631 is changed as indicated by a region f632 in a screen p181. Note that the region f632 in the screen p181 indicates the region f631 whose orientation has been changed based on the drag operation.

Note that the above methods for specifying a region in an image by operating the pointer c1 are only for illustrative purposes. Therefore, it may not be necessary to provide all of the above specifying methods, and only a portion of the above specifying methods may be employed. The present disclosure is not limited to the above methods. Any method that can specify a region in an image by operating the pointer c1 may be employed.

[1. 5. Example 2: Method for Specifying Region (Touchscreen)]

Next, as Example 2, an example method for specifying a region in an image will be described. Here, an example method for specifying a region in an image by an operation using a touchscreen will be described.

(Setting of Region: Setting of Region Having Existing Shape and Size)

Firstly, refer to FIG. 26. FIG. 26 is a diagram for describing an example method for specifying a region according to Example 2, showing an example in which a region having a predetermined shape and size is set at a specified location in an image.

For example, a screen p211 of FIG. 26 shows a situation which occurs before a region has been set in an image. As shown in the screen p211, the user U1 taps a desired location in an image using a finger, a stylus, etc. (may be hereinafter referred to as a "finger c2").

When the user U1 taps a location in an image, the information processing device 10 sets a region having a predetermined shape and size with reference to the tapped location. In the example of FIG. 26, the information processing device 10 sets a rectangular region f64 in an image as shown in a screen p212.

(Setting of Region: Setting of Region Having any Size)

Figure 27:
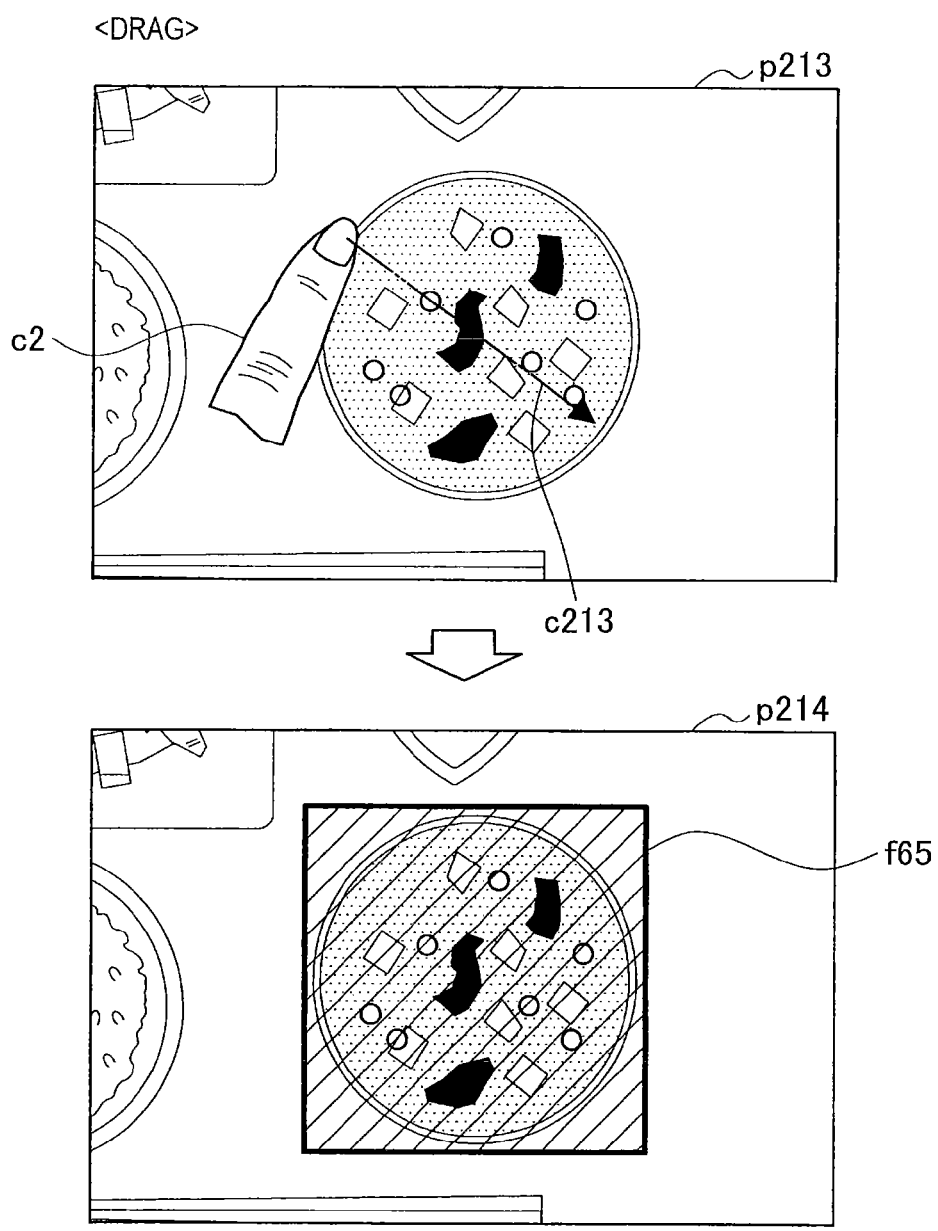
FIG. 27 is a diagram for describing an example method for specifying a region according to Example 2.

Next, an example in which a region having any size is set in an image will be described with reference to FIG. 27. FIG. 27 is a diagram for describing an example method for specifying a region according to Example 2, showing an example in which a region having any size is set in an image.

For example, a screen p213 of FIG. 27 shows a situation which occurs before a region has been set in an image. As indicated by a reference character c213 in the screen p213, the user U1 drags using the finger c2 from a portion of the image at which a region has not been set, as a starting point.

After the user U1 has performed a drag operation from a portion of the image in which a region has not been set, as a starting point, the information processing device 10 sets a rectangular region f65 having a diagonal line extending from the starting point to the end point of the drag operation in the image as shown in a screen p214.

(Setting of Region: Setting of Region Having any Shape and Size)

Figure 28:
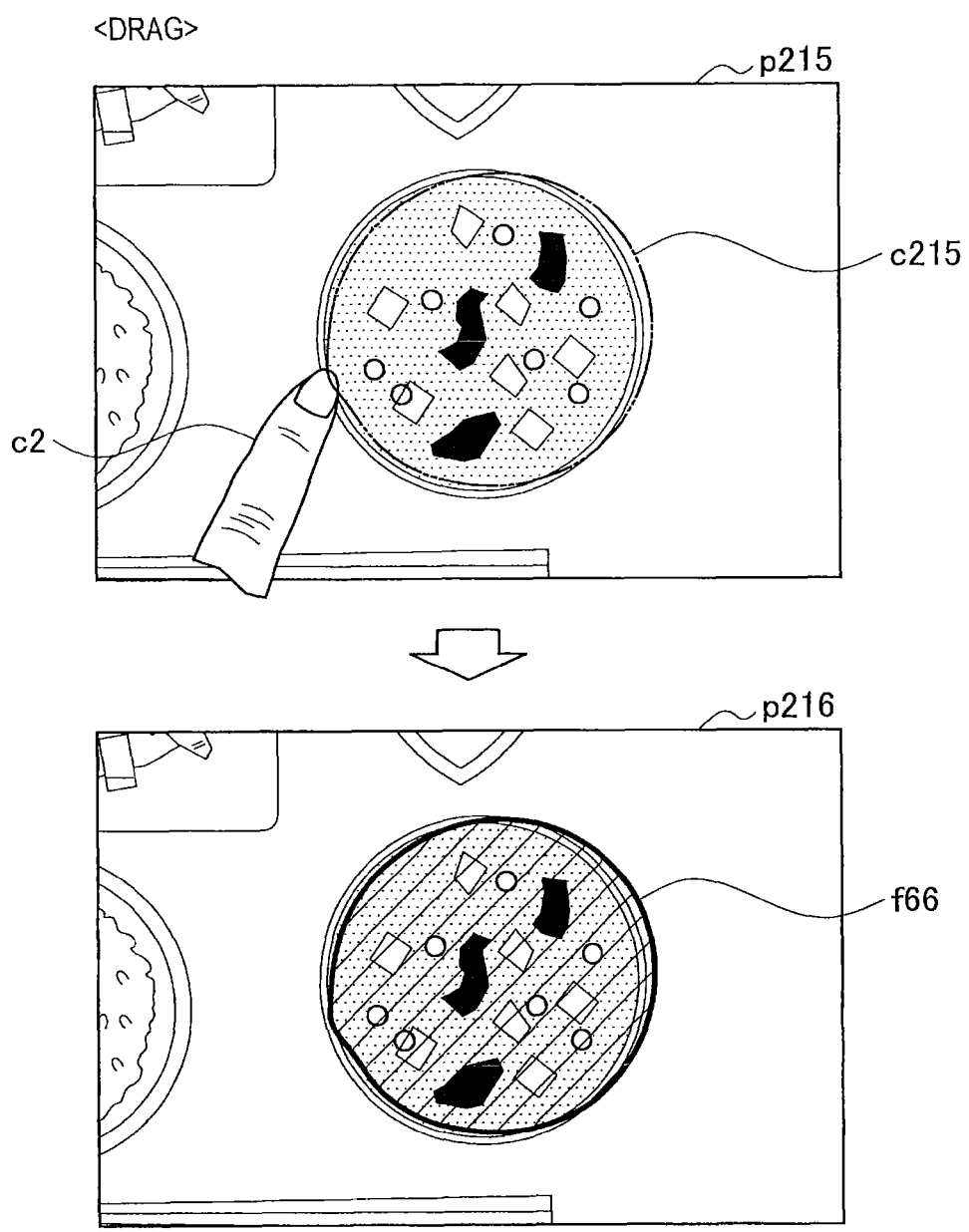
FIG. 28 is a diagram for describing an example method for specifying a region according to Example 2.

Next, an example in which a region having any shape and size is set in an image will be described with reference to FIG. 28. FIG. 28 is a diagram for describing an example method for specifying a region according to Example 2, showing an example in which a region having any shape and size is set in an image.

For example, a screen p215 of FIG. 28 shows a situation which occurs before a region has been set in an image. As indicated by a reference character c215 in the screen p215, the user U1 drags using the finger c2 to enclose a desired region in the image.

After the user U1 has performed a drag operation to enclose a region in the image, the information processing device 10 sets the region enclosed by the drag operation performed using the finger c2, as a region f66, as shown in a screen p216.

(Setting of Region: Setting of Region Having any Shape and Size)

Next, another example in which a region having any shape and size is set in an image will be described with reference to FIG. 29. FIG. 29 is a diagram for describing an example method for specifying a region according to Example 2, showing another example in which a region having any shape and size is set in an image.

For example, a screen p217 of FIG. 29 shows a situation which occurs before a region has been set in an image. As indicated by a reference character c217 in the screen p217, the user U1 drags using the finger c2 to fill in a desired region in the image.

After the user U1 has performed a drag operation to fill in a region in the image, the information processing device 10 sets the region filled in by the drag operation using the finger c2, as a region f66, in the image as shown in a screen p218.

(Setting of Region: Automatic Setting Based on Image Process)

Next, an example in which when the user U1 chooses a location, the information processing device 10 automatically sets a region based on an image process, will be described with reference to FIG. 30. FIG. 30 is a diagram for describing an example method for specifying a region according to Example 2, showing an example in which when the user U1 chooses a location, the information processing device 10 automatically sets a region based on an image process.

For example, a screen p219 of FIG. 30 shows a situation which occurs before a region has been set in an image. As shown in the screen p219, the user U1 taps a desired location in the image using the finger c2.

After the user U1 has tapped a location in the image, the information processing device 10 specifies a region which continuously spreads from the tapped location as a reference location and has a color similar to that at the reference location, based on an image process. Thereafter, as shown in a screen p220, the information processing device 10 sets the specified region as a region f67 in the image.

(Movement of Region)

Figure 31:
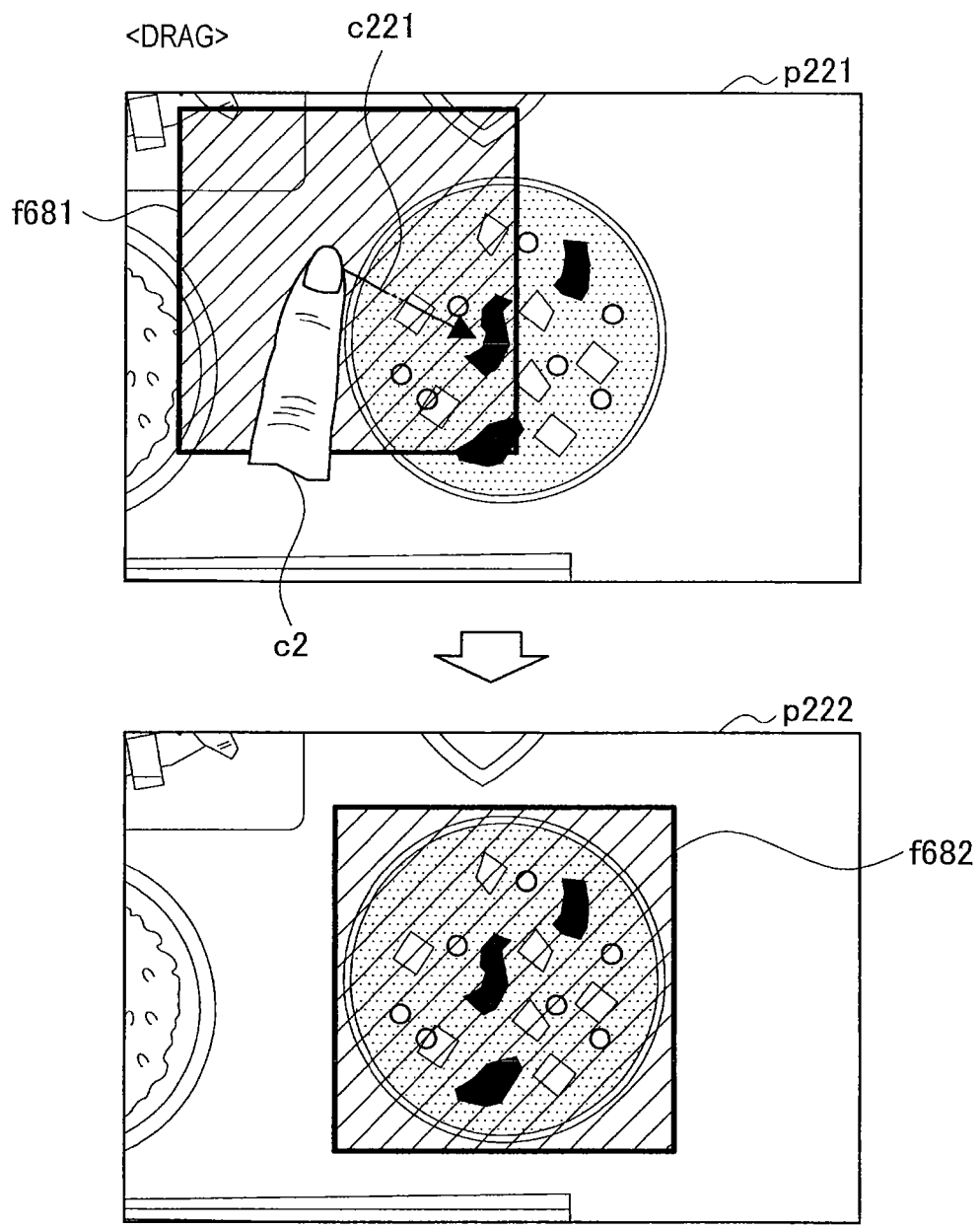
FIG. 31 is a diagram for describing an example method for specifying a region according to Example 2.

Next, an example in which a region set in an image is moved will be described with reference to FIG. 31. FIG. 31 is a diagram for describing an example method for specifying a region according to Example 2, showing an example in which a region set in an image is moved.

For example, a screen p221 of FIG. 31 shows a situation in which a region f681 has been set in an image. As indicated by a reference character c221 in the screen p221, the user U1 drags a portion of the region f681 using the finger c2.

After the user U1 has dragged a portion of the region f681, the information processing device 10 causes the region f681 to follow the drag operation performed using the finger c2, thereby changing a location of the region f681 as indicated by a region f682 in a screen p222. Note that the region f682 in the screen p222 indicates the region f681 which has been moved based on the drag operation.

(Changing of Size of Region)

Figure 32:
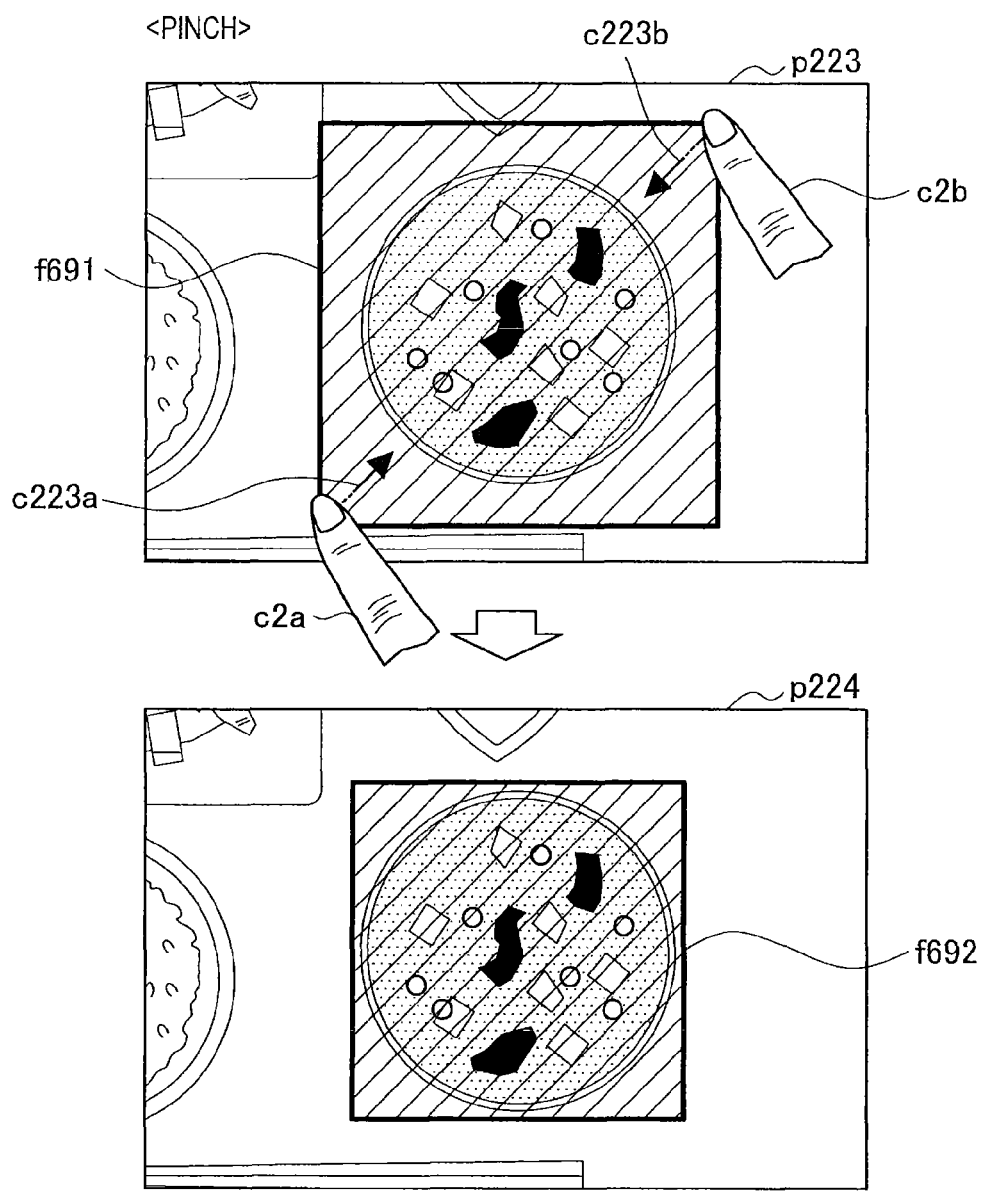
FIG. 32 is a diagram for describing an example method for specifying a region according to Example 2.

Next, an example in which a size of a region set in an image is changed will be described with reference to FIG. 32. FIG. 32 is a diagram for describing an example method for specifying a region according to Example 2, showing an example in which a size of a region set in an image is changed.

For example, a screen p223 of FIG. 32 shows a situation in which a region f691 has been set in an image. As indicated by reference characters c223a and c223b in the screen p223, the user U1 performs a pinch operation on a portion of the region f691 using fingers c2a and c2b. Note that, in the example of FIG. 32, the user U1 performs a pinch-in (pinch-close or pinch-together) operation on the region f691.

After the user U1 has performed a pinch operation on a portion of the region f691, the information processing device 10 changes a shape or size of the region f691 so that the region f691 follows the pinch operation performed using the fingers c2a and c2b. As a result, a size of the region f691 is changed as indicated by a region f692 in a screen p224. Note that the region f692 in the screen p224 indicates the region f691 whose size has been changed based on a pinch operation. Note that, needless to say, a pinch-in operation decreases a size of a region, and a pinch-out (pinch-open or pinch-apart) operation increases a size of a region.

(Deletion of Region)

Next, an example in which a region set in an image is deleted will be described with reference to FIG. 33. FIG. 33 is a diagram for describing an example method for specifying a region according to Example 2, showing an example in which a region set in an image is deleted.

For example, a screen p225 of FIG. 33 shows a situation in which a region f70 has been set in an image. The user U1 double-taps a portion of the region f70 using the finger c2 as shown in the screen p225.

After the user U1 has double-tapped a portion of the region f70, the information processing device 10 deletes the region f70 chosen by double-tap using the finger c2 as shown in a screen p226.

(Deletion of Region)

Figure 34:
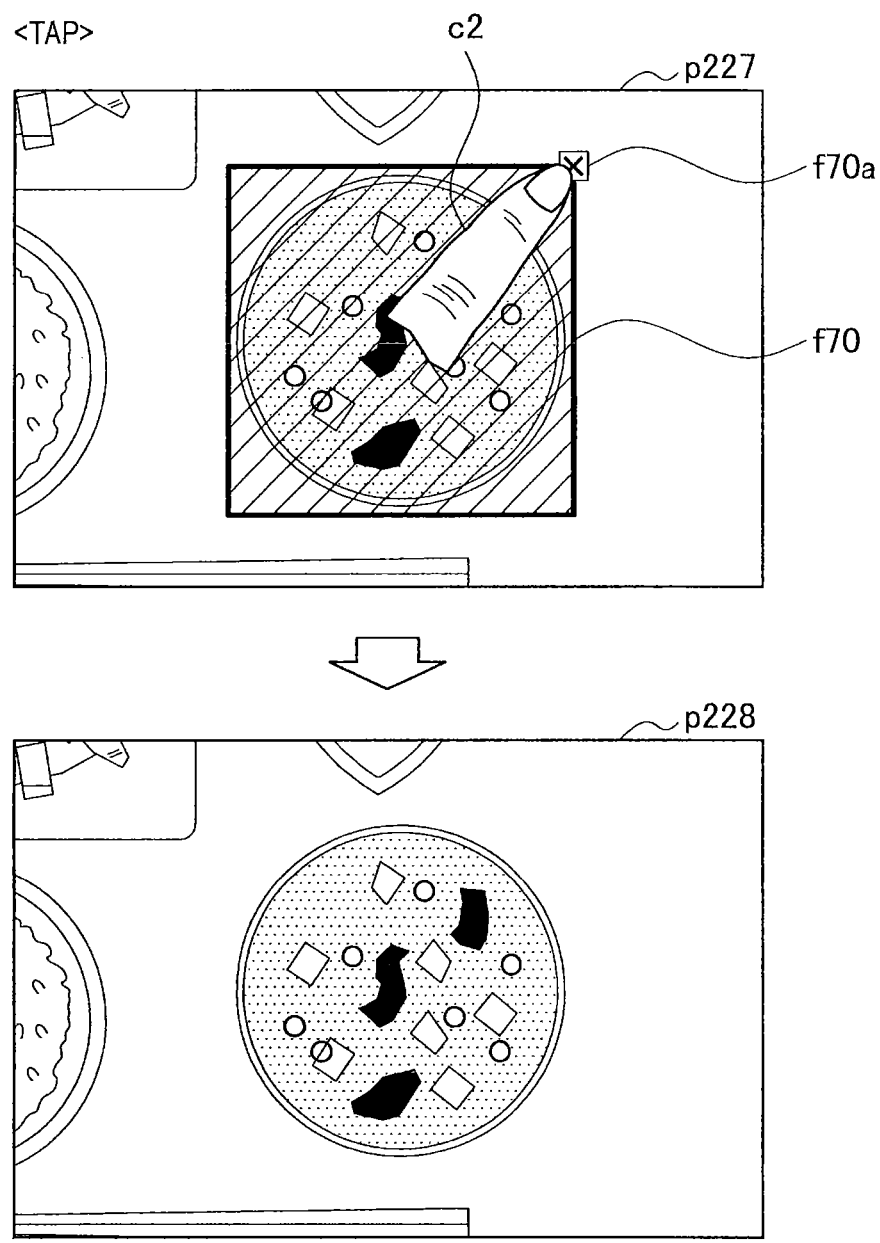
FIG. 34 is a diagram for describing an example method for specifying a region according to Example 2.

Next, another example in which a region set in an image is deleted will be described with reference to FIG. 34. FIG. 34 is a diagram for describing an example method for specifying a region according to Example 2, showing another example in which a region set in an image is deleted.

For example, a screen p227 of FIG. 34 shows a situation in which a region f70 has been set in an image. When the user U1 taps the region f70 in the screen p227 using the finger c2, the information processing device 10 displays a delete icon f70a. In the screen p227, the information processing device 10 displays the delete icon f70a at an upper right end portion of the region f70. Next, the user U1 taps the delete icon f70a using the finger c2.

After the user U1 has tapped the delete icon f70a, the information processing device 10 deletes the region f70 corresponding to the tapped delete icon f70a from the image as shown in a screen p228.

(Division of Region)

Figure 35:
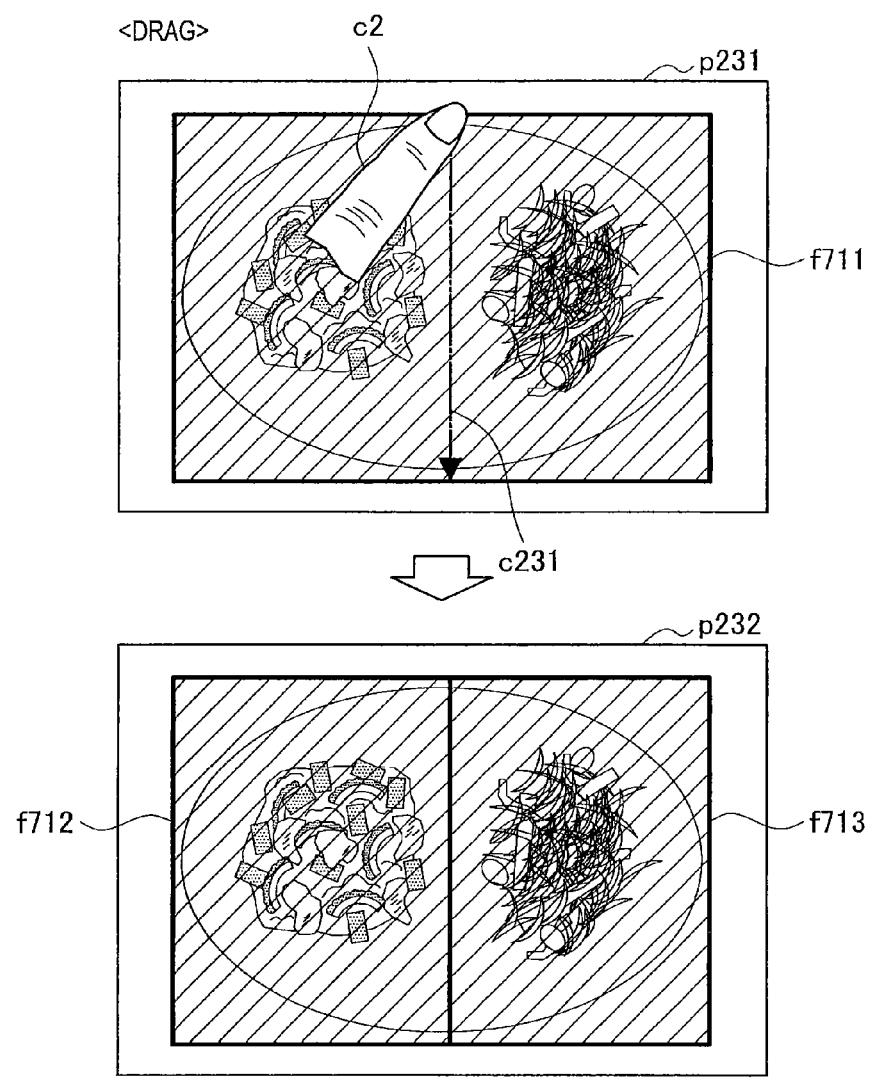
FIG. 35 is a diagram for describing an example method for specifying a region according to Example 2.

Next, an example in which a region set in an image is divided into a plurality of regions will be described with reference to FIG. 35. FIG. 35 is a diagram for describing an example method for specifying a region according to Example 2, shwing an example in which a region set in an image is divided into a plurality of regions.

For example, a screen p231 of FIG. 35 shows a situation in which a region f711 has been set in an image. As indicated by a reference character c231 in the screen p231, the user U1 performs a drag operation using the finger c2 so that the region f711 is divided.

After the user U1 has performed a drag operation so that the region f711 is divided, the information processing device 10 divides the region f711 into a plurality of regions f712 and f713, where a trajectory of the drag operation indicated by the reference character c231 is the border therebetween, as shown in a screen p232.

(Method for Setting Region by Operating Image)

Examples have been described above in which a region in an image is set or operated. Here, a method for setting a region in an image by operating the image will be described with reference to FIGS. 36 to 38. When a region is set in an image by operating the image, then if, for example, a dedicated editing mode is previously prepared and is activated, an operation involved in specifying a region and a normal screen operation can be separated from each other. An example in which after the editing mode has been activated, a region in an image is set by operating the image, will now be described.

Figure 36:
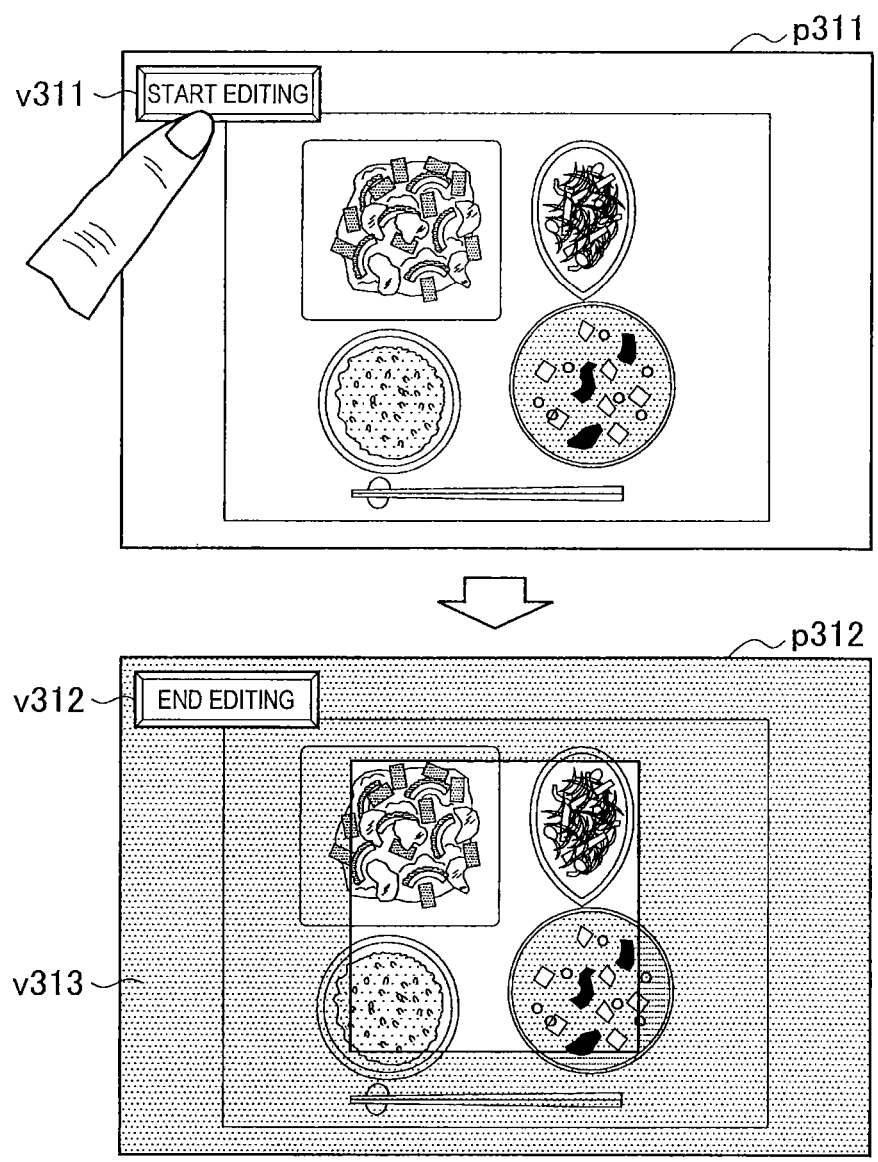
FIG. 36 is a diagram for describing an example method for specifying a region according to Example 2.

Firstly, refer to FIG. 36. FIG. 36 is a diagram for describing an example method for specifying a region according to Example 2, showing an example in which the editing mode is activated.

For example, a screen p311 of FIG. 36 shows a screen which occurs before the editing mode has been activated, i.e., a screen for a normal operation. A reference character v311 indicates an editing start button for activating the editing mode. The user U1 taps the editing start button v311 as shown in the screen p311.

When the user U1 taps the editing start button v311, the information processing device 10 activates the editing mode. In the editing mode, as shown in a screen p312, the information processing device 10 displays a U/I which indicates a region which is to be set in an image, in an identifiable fashion. Note that, in the example indicated by the screen p312, the information processing device 10 superimposes a shading v313 having an opening in a portion thereof on top of the image. Note that a region is to be set in a portion of the image which is displayed in the opening of the shading v313.

After the editing mode has been activated, the information processing device 10 displays an editing end button v312 in place of the editing start button v311. Note that when the user U1 taps the editing end button v312, the editing mode is ended.

Figure 37:
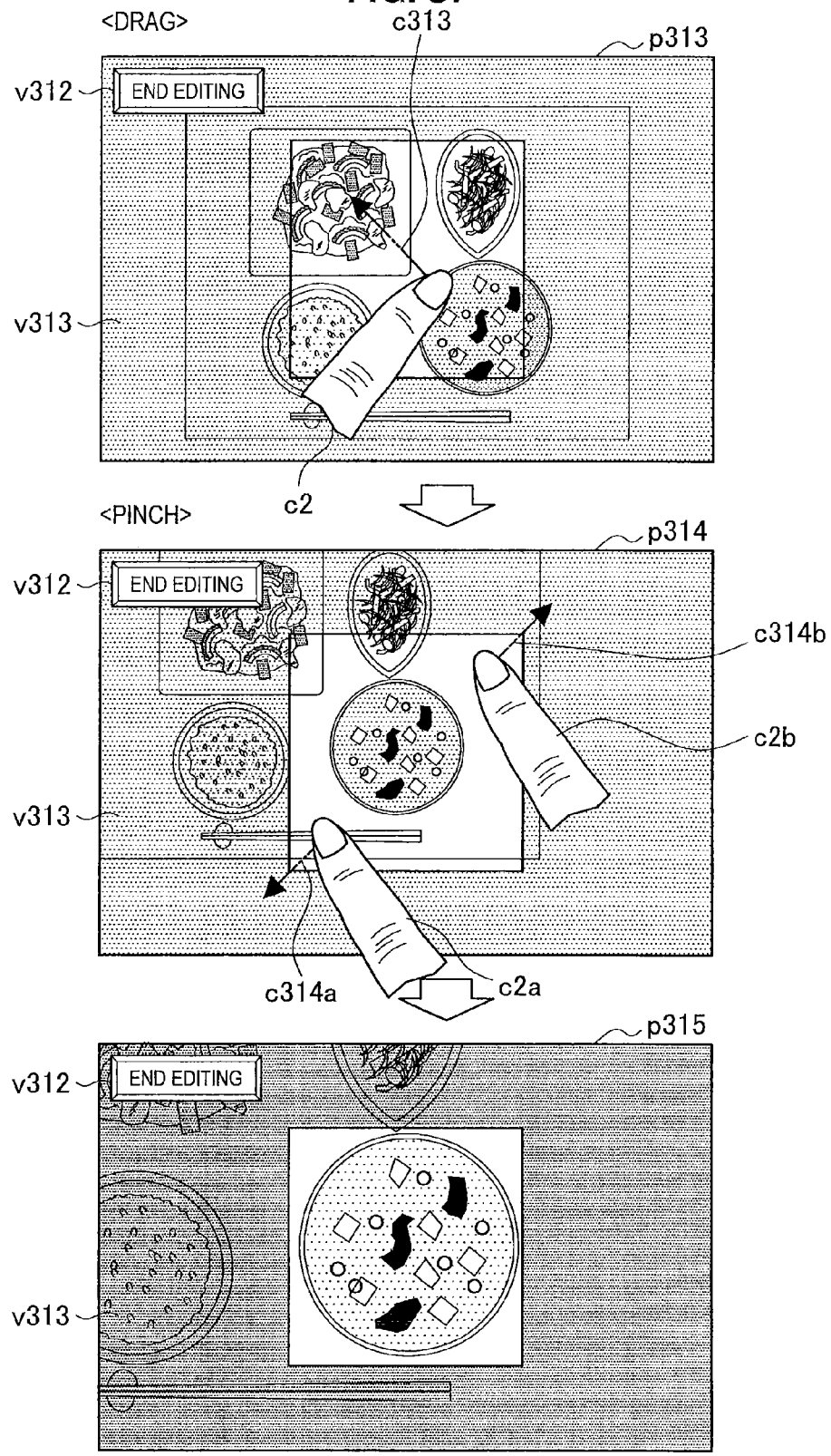
FIG. 37 is a diagram for describing an example method for specifying a region according to Example 2.

Next, an operation of setting a region will be described with reference to FIG. 37. FIG. 37 is a diagram for describing an example method for specifying a region according to Example 2, showing an example in which a region is specified by operating an image.

Firstly, refer to a screen p313. As indicated by a reference character c313, the user U1 drags an image using the finger c2 to adjust a location of the image so that a portion of the image for which the user U1 desires to set a region is included in the opening of the shading v313. In the example shown in the screen p313, the user U1 drags the screen diagonally upward and to the left as indicated by the reference character c313 to move the screen so that a lower right region of the image is included in the opening of the shading v313.

Next, refer to a screen p314. As indicated by reference characters c314a and c314b, the user U1 performs a pinch operation using the fingers c2a and c2b to change a size of a displayed image. For example, in the example shown in the screen p314, the user U1 performs a pinch-out operation as indicated by the reference characters c314a and c314b to increase a size of a displayed image. As a result, a size of a region in the image enclosed by the opening of the shading v313 is relatively decreased compared to before the operation. Note that, needless to say, when a pinch-in operation is performed, a size of a region in an image enclosed by the opening of the shading v313 is relatively increased compared to before the operation.

Here, refer to a screen p315. The screen p315 shows a situation which occurs after the size of the displayed image has been changed by the pinch operation. Thus, by changing a size of a displayed image using a pinch operation, a size of a region in the image can be specified.

Figure 38:
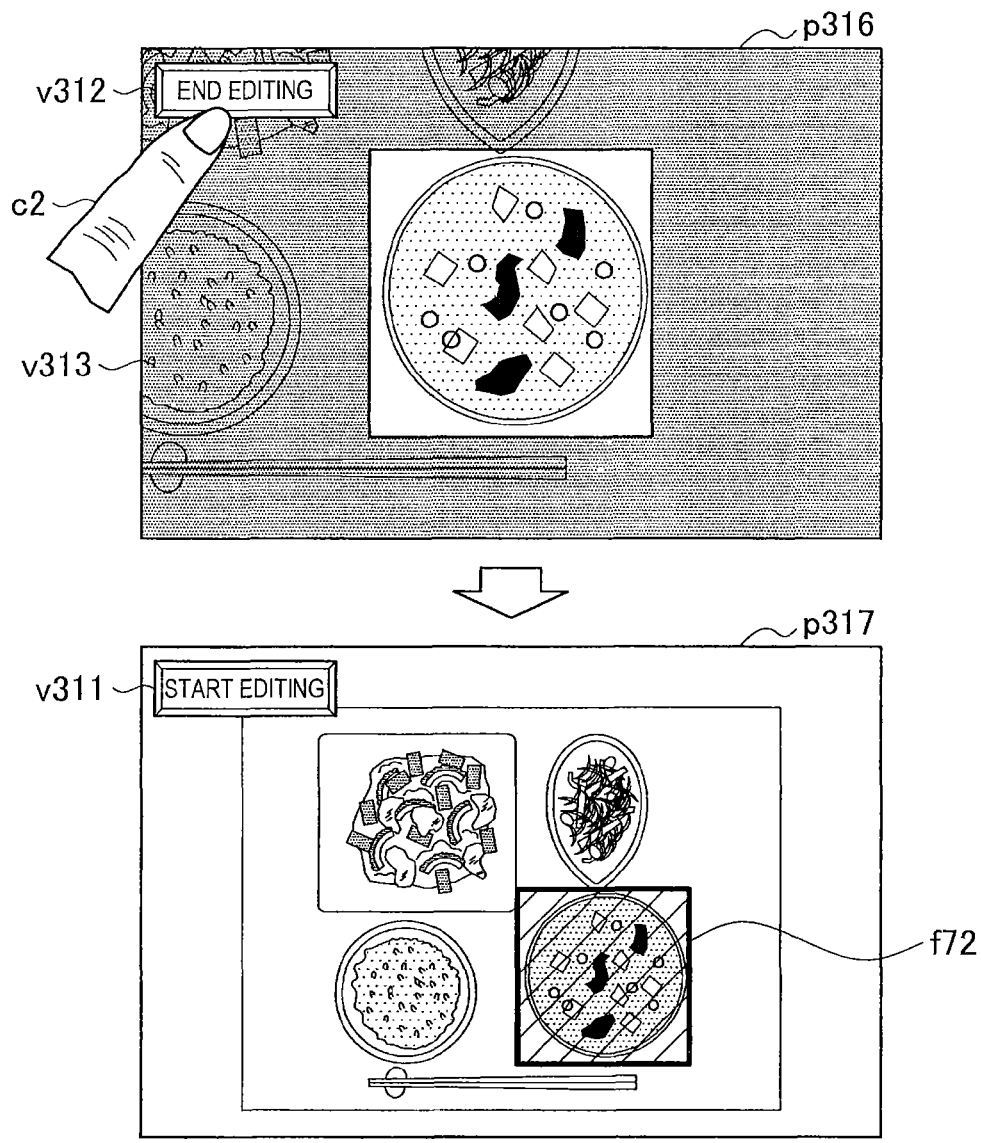
FIG. 38 is a diagram for describing an example method for specifying a region according to Example 2.

Next, an operation which is performed when the editing mode is ended will be described with reference to FIG. 38. FIG. 38 is a diagram for describing an example method for specifying a region according to Example 2, showing an example in which the editing mode is ended.

Firstly, refer to a screen p316. The screen p316 shows a situation in which a region has been specified based on an operation of an image, corresponding to the screen p315 of FIG. 37. The user U1 taps the editing end button v312 as shown in the screen p316.

After the user U1 has tapped the editing end button v312, the information processing device 10 sets a region in an image included in the opening of the shading v313, as a region f72, as shown in a screen p317. After the region f72 has been set, the information processing device 10 ends the editing mode. After having ended the editing mode, the information processing device 10 displays the editing start button v311 in place of the editing end button v312.

Note that the above methods for specifying a region in an image by operating a touchscreen are only for illustrative purposes. Therefore, it may not be necessary to provide all of the above specifying methods, and only a portion of the above specifying methods may be employed. The present disclosure is not limited to the above methods. Any method that can specify a region in an image by operating a touchscreen may be employed.

[1. 6. Example 3: Method for Displaying Identification Information]

Next, as Example 3, an example method for displaying identification information indicating candidates for an object captured in an image will be described. In the above embodiments, for example, as indicated by the identification information m421 of FIG. 14, candidates for the result of identification of an object are presented. On the other hand, the presented candidates may have different identification scores d13' (i.e., higher and lower identification scores d13')

which indicate the correctness with which the object is truly the candidate. Therefore, in Example 3, an example will be described in which the information processing device 10 presents, to the user U1, different probabilities that the object is the candidate in a manner that allows the user to recognize differences therebetween, based on the different identification scores d13' corresponding to the respective candidates for the result of identification of the object.

Firstly, refer to FIG. 39. FIG. 39 is a diagram for describing an example display form according to Example 3, showing example information for presenting different probabilities that the object is the candidate. Data d21 shown in FIG. 39 indicates icons d211 for presenting the different identification scores d13'. As indicated by a reference character d212, the identification scores d13' having different ranges are associated with the different icons d211. For example, in the data d21, an identification score d13' of "at least 0.75" is associated with an icon v51a. Similarly, an identification score d13' of "at least 0.5 and less than 0.75" is associated with an icon v51b. An identification score d13' of "at least 0.25 and less than 0.5" is associated with an icon v51c. An identification score d13' of "less than 0.25" is associated with an icon v51d.

Figure 40:
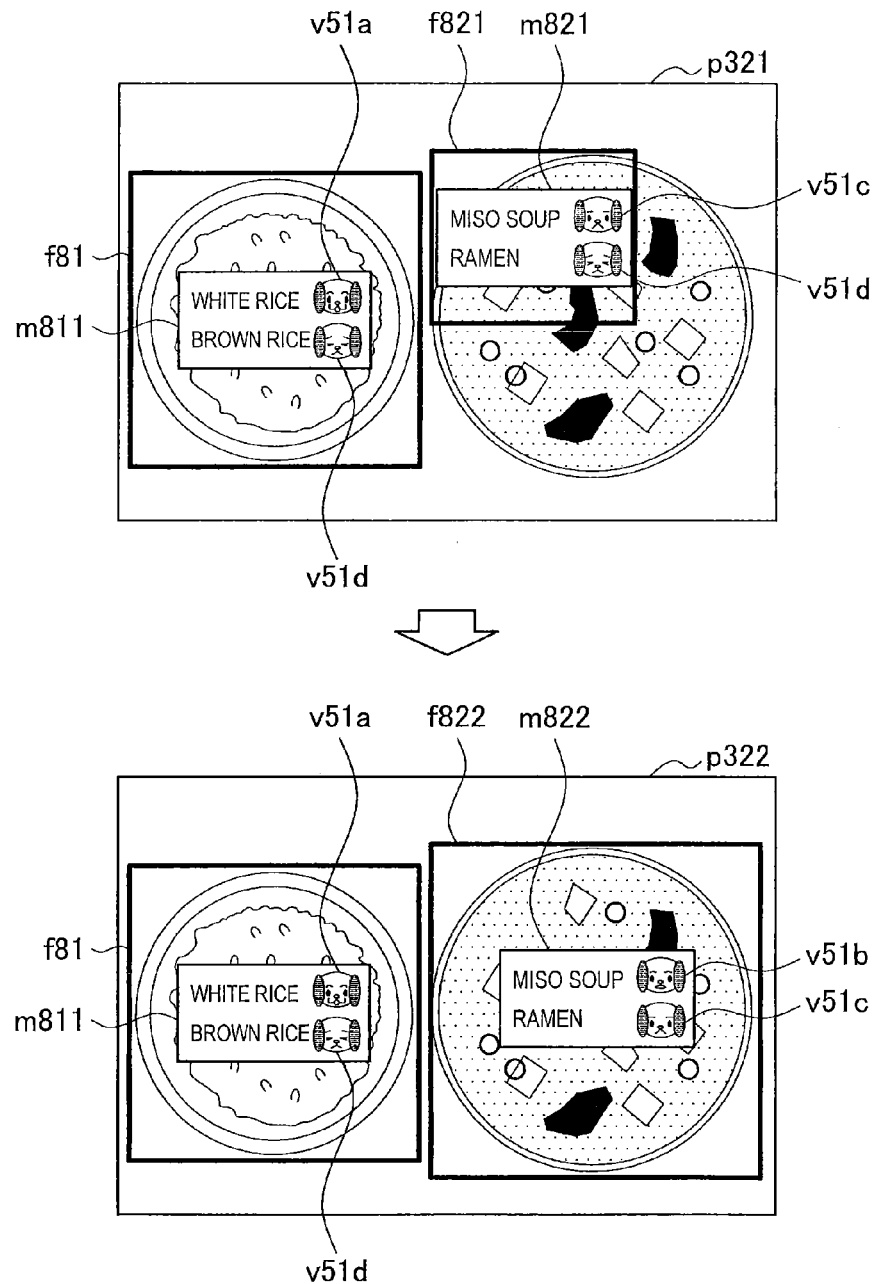
FIG. 40 is a diagram for describing an example display form according to Example 3.

Next, refer to FIG. 40. FIG. 40 shows an example display form according to Example 3. For example, in a screen p321 of FIG. 40, a region f81 corresponding to "white rice" has been set in an image. In the region f81, identification information m811 presenting "white rice" and "brown rice" has been set as candidates for the result of identification of an object in the region f81. Note that "white rice" in the identification information m811 has been associated with the icon v51a indicating that the identification score d13' is at least 0.75. Similarly, "brown rice" in the identification information m811 has been associated with the icon v51d indicating that the identification score d13' is less than 0.25.

In this case, the display control unit 120 of the information processing device 10 may obtain region data corresponding to the region f81 which has been associated with the identification information indicating the candidates, and the identification scores d13' calculated for the respective candidates, from the estimation unit 118. Thereafter, the display control unit 120 may determine within which of the ranges indicated by the data d21 the identification score d13' of each candidate falls, and based on the result of the determination, select one of the icons v51a to v51d with which the candidate is associated. Note that the data d21 may be stored in a place from which the display control unit 120 can read the data 21.

Here, refer back to the screen p321 of FIG. 40. In the screen p321, a region f821 corresponding to a portion of "miso soup" has been set in the image. In the region f821, identification information m821 presenting "miso soup" and "ramen" as candidates for the result of identification of an object in the region f821 has been set. Note that the icon v51c indicating that the identification score d13' is at least 0.25 and less than 0.5 is presented in association with "miso soup" in the identification information m821. Similarly, the icon v51d indicating that the identification score d13' is less than 0.25 is presented in association with "ramen" in the identification information m821.

Next, refer to a screen p322 of FIG. 40. The screen p322 shows a situation in which, with reference to the situation in the screen p321, the user U1 edits the range of the region f821 so that all of a region in the image corresponding to "miso soup" is included in the region f821. Note that a region f822 indicates the region f821 whose range has been changed.

As indicated by the region f822 in the screen p322, after the region in the image corresponding to "miso soup" has been updated, the correctness determination unit 108 updates the identification scores d13 of the object in the region f822. After the identification scores d13 have been updated, the estimation unit 118 recalculates the identification scores d13'. Thereafter, the display control unit 120 obtains the result of the recalculation of the identification scores d13' performed by the estimation unit 118, and updates the icons with which the candidates indicated by the identification information m821 have been associated. Identification information m822 in the screen p322 indicates the identification information m821 which has been updated based on the result of the recalculation of the identification scores d13'.

As indicated by the identification information m822, the icons with the candidates for the result of identification indicating the object in the region f822 have been associated are updated. Specifically, the icon with which "miso soup" in the identification information m822 has been associated is updated from the icon v51c to the icon v51b, and the icon corresponding to "ramen" is updated from the icon v51d to the icon v51c.

With such a configuration, the region in the image indicating "miso soup" is updated from the region f821 to the region f822, whereby the user U1 can recognize that the correctness corresponding to each candidate for identification information indicating the object in the region f822 has been improved.

Figure 41:
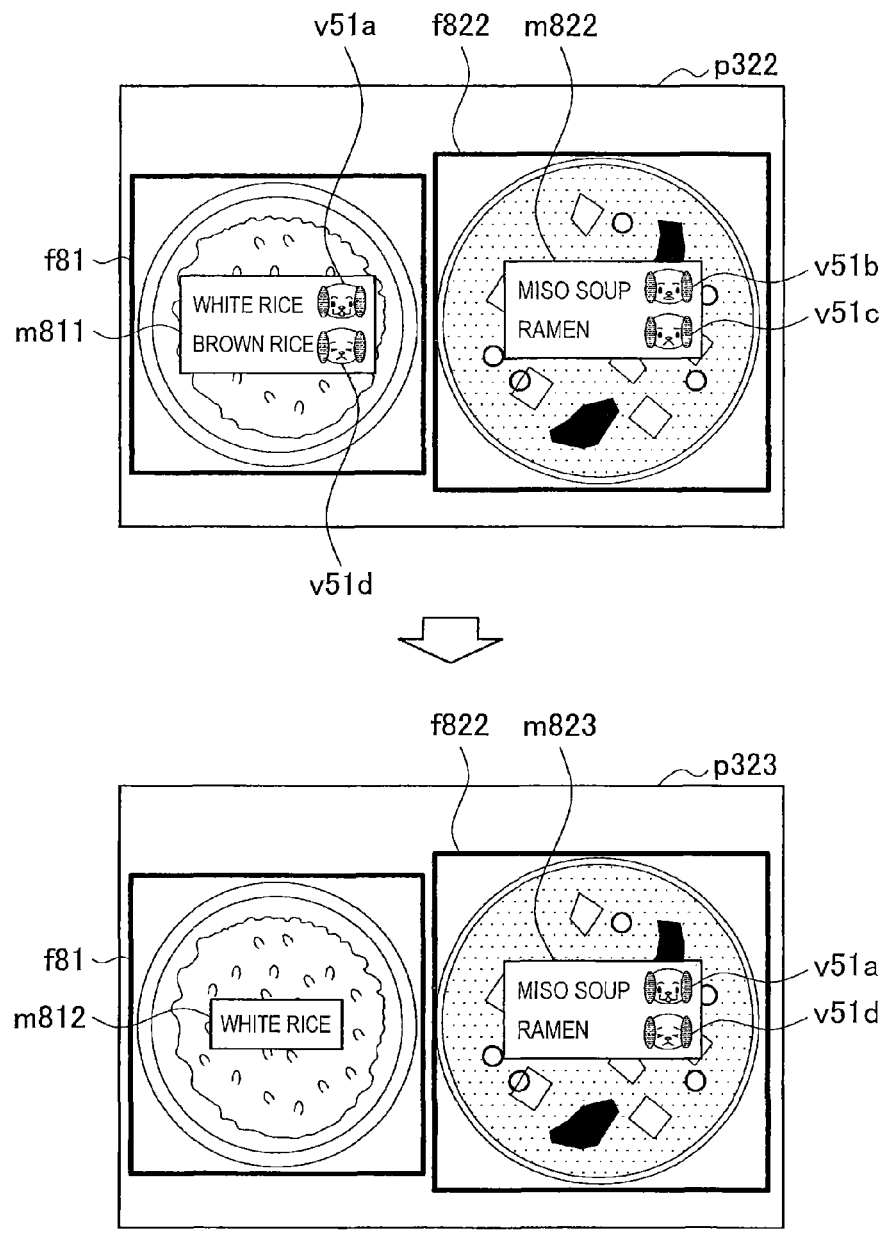
FIG. 41 is a diagram for describing an example display form according to Example 3.

Next, refer to FIG. 41. FIG. 41 shows an example display form according to Example 3. A screen p322 of FIG. 41 corresponds to the screen p322 of FIG. 40.

Next, refer to a screen p323 of FIG. 41. The screen p323 shows a situation in which, with reference to the situation of the screen p322, the user U1 has selected "white rice" from the candidates indicated by the identification information m811. Note that identification information m812 indicates the identification information m811 which has been updated by selecting "white rice" from the candidates indicated by the identification information m811.

After "white rice" has been selected from the candidates indicated by the identification information m811, the extraction unit 114 extracts the co-occurrence probability data d14 corresponding to "white rice" from the co-occurrence probability data storage unit 116, and outputs the co-occurrence probability data d14 to the estimation unit 118. The estimation unit 118 recalculates the identification scores d13' corresponding to the object in the region f822 based on the co-occurrence probability data d14 of "white rice" obtained from the extraction unit 114. Thereafter, the display control unit 120 obtains the result of the recalculation of the identification scores d13' performed by the estimation unit 118, and updates the icons with which the candidates indicated by the identification information m822 have been associated. Identification information m823 in the screen p323 indicates the identification information m822 which has been updated based on the result of the recalculation of the identification scores d13'.

As indicated by the identification information m823, the icons with which the candidates for the result of identification indicating the object in the region f822 have been associated are updated. Specifically, the icon with which "miso soup" in the identification information m823 has been associated is updated from the icon v51b to the icon v51c. The icon corresponding to "ramen" is updated from the icon v51c to the icon v51d. With such a configuration, the user U1 can recognize, based on the change of the icon in the identification information m823, that the probability that the object in the region f822 is "miso soup" increases after the object in the region f81 has been identified as "white rice."

[1. 7. Summary]

As described above, in the information processing system 1 of this embodiment, when an object in an image has been recognized and identified, another object is recognized based on the co-occurrence probability between these objects. With such a configuration, when the user U1 has set identification information with respect to an object in an image, the information processing system 1 estimates the result of identification of another object based on the co-occurrence probability between these objects, and presents the identification result to the user U1. Therefore, the user U1 can remove or simplify an operation involved in setting identification information with respect to a portion of objects in an image, whereby a series of operations involved in setting identification information can be simplified.

<2. Second Embodiment>

[2. 1. Overview]

Next, an information processing system 1' according to a second embodiment will be described. As described in the first embodiment, the accuracy of the identification scores d13 or the co-occurrence probability data d14 is affected to some extent by the number of pieces of sample data for calculation of each value. Therefore, in the information processing system 1' of the second embodiment, the result of estimation of identification information indicating an object in a screen is presented to the user U1, and the result of determination of whether or not the result of the estimation is correct is obtained, and sample data based on the obtained determination result is accumulated. Thus, in the information processing system 1' of the second embodiment performs relearning by accumulating sample data based on the result of the user U1's determination of the result of estimation of an object, thereby improving the accuracy of the identification scores d13 or the co-occurrence probability data d14, i.e., the accuracy of identification of an object. An example of the information processing system 1' of this embodiment will now be described.

Figure 42:
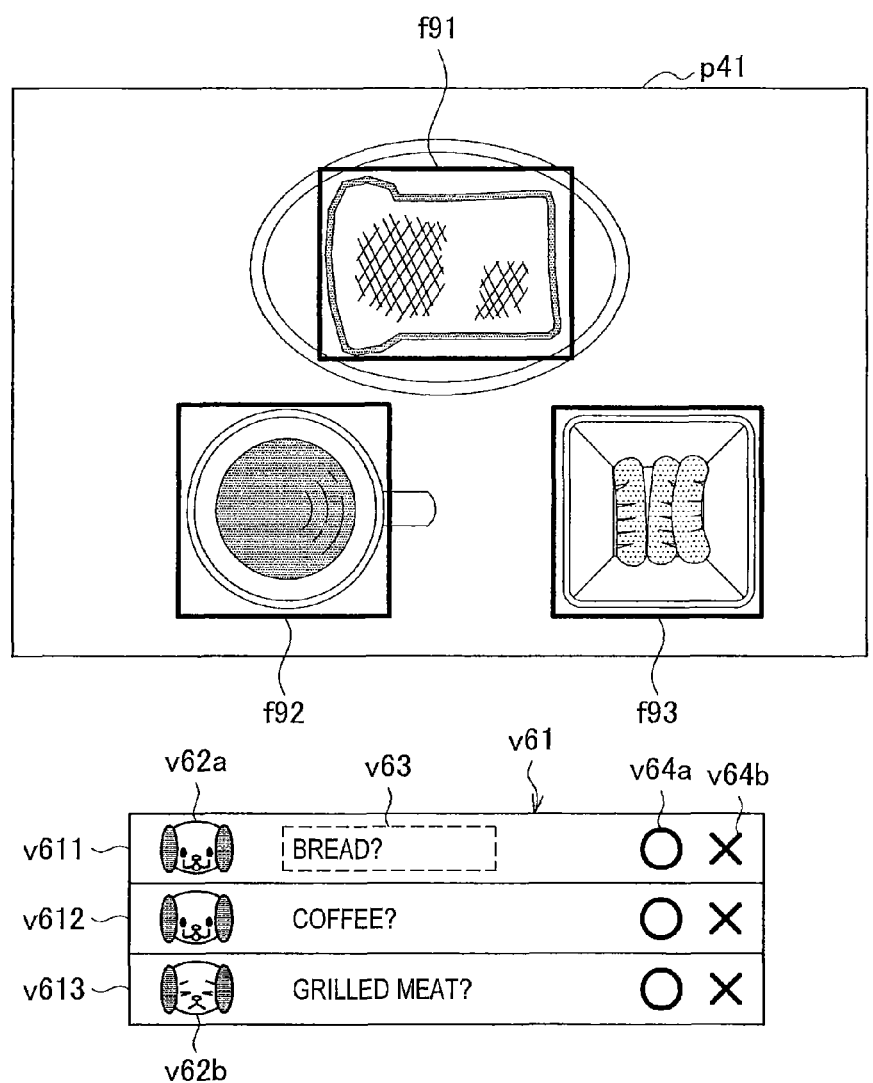
FIG. 42 is a diagram for describing an overview of an information processing system according to a second embodiment of the present disclosure.

Firstly, an overview of the information processing system 1' of this embodiment will be described with reference to FIG. 42. FIG. 42 is a diagram for describing an overview of the information processing system 1' of the second embodiment of the present disclosure.

In the example of FIG. 42, "bread," "coffee," and "sausage" have been captured as objects in an image p41. Regions f91 to f93 have been set in the image p41 based on the result of recognition of these objects.

In the information processing system 1' of this embodiment, the user U1 determines whether or not the result of estimation of an object in a region presented by the information processing system 1' is correct, to set identification information indicating the object. Therefore, the information processing system 1' presents a result presentation portion v61 which is a U/I for presenting the result of estimation of the objects included in the regions f91 to f93, together with the image p41.

The information processing system 1' presents, in the result presentation portion v61, the result of estimation of the objects in the image p41. As a specific example, in the example of FIG. 42, the result presentation portion v61 presents result presentation portions v611 to v613 as regions presenting the result of estimation of the objects in the regions f91 to f93. Note that the result presentation portion v611 presents the result of estimation of the object in the region f91. Similarly, the result presentation portion v612 presents the result of estimation of the object in the region f92, and the result presentation portion v613 presents the result of estimation of the object in the region f93. Note that when the result presentation portions v611 to v613 are not distinguished from each other, the result presentation portions v611 to v613 may be referred to as the "result presentation portions v610."

Here, refer to the result presentation portion v611. The result presentation portion v611 includes an icon v62a, an estimation result v63, an affirmative button v64a, and a negative button v64b.

The icon v62a relates to the estimation of the object in the corresponding region f91, and presents the level of proficiency of the information processing system 1', particularly a high level of proficiency, in a recognizable fashion. On the other hand, as with the icon v62a, an icon v62b indicated in the result presentation portion v613 presents the level of proficiency, particularly a low level of proficiency, in a recognizable fashion. Note that, in the description that follows, when the icons v62a and v62b are not distinguished each other, the icons v62a and v62b may be simply referred to as the "icons v62." The estimation result v63 indicates the result of estimation of the object in the region f91 performed by the information processing system 1'.

As used herein, the term "level of proficiency" refers to the level of experience of estimating (i.e., identifying) an "object" presented as the estimation result v63, which the information processing system 1' has gained. For example, the "level of proficiency" refers to how much sample data has been subjected to estimation of an "object" presented as the estimation result v63.

For example, when the information processing system 1' identifies "bread" shown in the region f91, the information processing system 1' can more accurately identify "bread" in an image as the number of images in which "bread" has been captured and the number of times "bread" has been successfully identified in the images increase. In this case, the images in which "bread" has been captured, and the results of successful identification of "bread" in the images, are sample data for identifying "bread."

Therefore, the information processing system 1' presents, as the icon v62, the level of proficiency in identifying an object presented as the estimation result v63, thereby presenting the reliability of the estimation result v63 in a recognizable fashion.

The affirmative button v64a and the negative button v64b are buttons for allowing the user U1 to input the result of determination of whether or not the estimation result v63 presented by the information processing system 1' is correct. The affirmative button v64a is a button for notifying the information processing system 1' that the estimation result v63 is correct. The negative button v64b is a button for notifying the information processing system 1' that the estimation result v63 is incorrect.

When the user U1 operates the affirmative button v64a, the information processing system 1' identifies an object in a corresponding region as an object indicated by the estimation result v63, and displays identification information indicating the object indicated by the estimation result v63 in association with the region. For example, in the example shown in the result presentation portion v611, the information processing system 1' displays the identification information indicating "bread" presented by the estimation result v63 in association with the region f91, in response to the operation performed on the affirmative button v64a.

When the affirmative button v64a is operated, the information processing system 1' stores the result of identification of an object in a corresponding region as sample data for estimating the object. As a specific example, in the example of FIG. 42, the information processing system 1' stores, as sample data, the image p41, region data corresponding to the region f91, and information indicating that the object in the region f91 is "bread" in association with each other. As a result, for example, the information processing system 1' can calculate the identification scores d13 for identifying an object in an image as "bread" based on the newly added sample data in addition to the previously stored sample data.

When the user U1 indicates that the estimation results v63 corresponding to a plurality of objects in images are correct, based on the operation of the affirmative button v64a, the estimation results v63 may be used as sample data for calculating the co-occurrence probability data d14 between the plurality of objects.

As a specific example, in FIG. 42, it is assumed that the affirmative button v64a has been operated for both of the result presentation portions v611 and v612. In this case, the object in the region f91 set in the image p41 is identified as "bread," and the object in the region f92 is identified as "coffee." In this case, the information processing system 1' stores the result of identification of the objects in the regions f91 and f92 as sample data for the co-occurrence probability between both of the identified objects. For example, in the example of FIG. 42, the information processing system 1' stores, as sample data, the image p41, region data corresponding to the region f91 and 192, information indicating that the object in the region f91 is "bread" and the object in the region f92 is "coffee" in association with each other. As a result, for example, the information processing system 1' can calculate the co-occurrence probability between "bread" and "coffee" based on the newly added sample data in addition to the previously stored sample data.

On the other hand, when the negative button v64b is operated, the information processing system 1' stores the result of identification of an object in a corresponding region as sample data indicating that the object in the region is different from the object indicated by the estimation result v63.

For example, refer to the region f93 and the result presentation portion v613. While "sausage" has been captured in the region f93, the information processing system 1' has a low level of proficiency in identifying "sausage" and therefore presents an estimation result v63 indicating that the object in the region f93 is "grilled meat." Here, it is assumed that the user U1 has operated the negative button v64b with respect to the result presentation portion v613.

In this case, the information processing system 1' stores, as sample data, the image p41, region data corresponding to the region f93, and information indicating that the object in the region f93 is not "grilled meat" in association with each other. As a result, for example, the information processing system 1', when obtaining another image similar to a partial image in the region P93, newly adds an object in that image to sample data to decrease the probability that the object is estimated as "grilled meat." In other words, if sample data based on the operation of the negative button v64b is accumulated, the information processing system 1', when obtaining a similar image, can present the identification score d13 indicating that an object in the image is "grilled meat" as a negative value.

Note that an icon mimicking a character may be employed as the icon v62 indicating the level of proficiency, and the display form of the icon v62 may be controlled so that the character grows, depending on the level of proficiency of the information processing system 1'. For example, FIG. 43 is a diagram showing an example display form which changes, depending on the level of proficiency.

Figure 43:
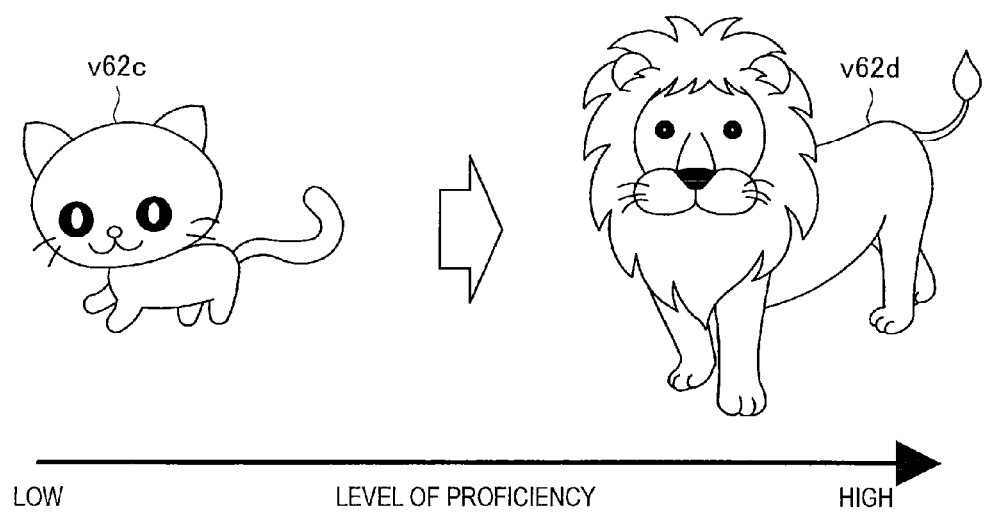
FIG. 43 is a diagram showing an example display form which changes, depending on the level of proficiency.

In the example of FIG. 43, the information processing system 1' presents an icon v62c when the information processing system 1' has a low level of proficiency, e.g., when the user U1 has just begun to use the information processing system 1'. Thereafter, the information processing system 1' may change the display form of the icon v62 to an icon v62d as the level of proficiency increases due to the use of the information processing system 1' by the user U1.

Note that the growth of the character indicated by the icon v62 of FIG. 43 may be controlled, for example, based on the total number of pieces of sample data for each object class. In this case, the information processing system 1' may present the total number of pieces of sample data in the form of the degree of growth of the character, and present the level of proficiency for each object class in the form of a change in the facial expression of the character. As a result, the information processing system 1' can present the level of proficiency based on the total number of pieces of sample data, and the level of proficiency based on the number of pieces of sample data for each object class, separately.

Thus, the icon v62 is controlled to grow, depending on the level of proficiency of the information processing system 1', and therefore, amusement similar to that which a user feels in playing a video game may be imparted to the operation of setting identification information corresponding to an object in an image. As a result, for example, in a system in which identification information is set to a dish captured in an image, and calorie management is performed based on an identified dish, the effect of motivating the user U1 to set identification information can be expected.

[2. 2. Process]

Figure 44:
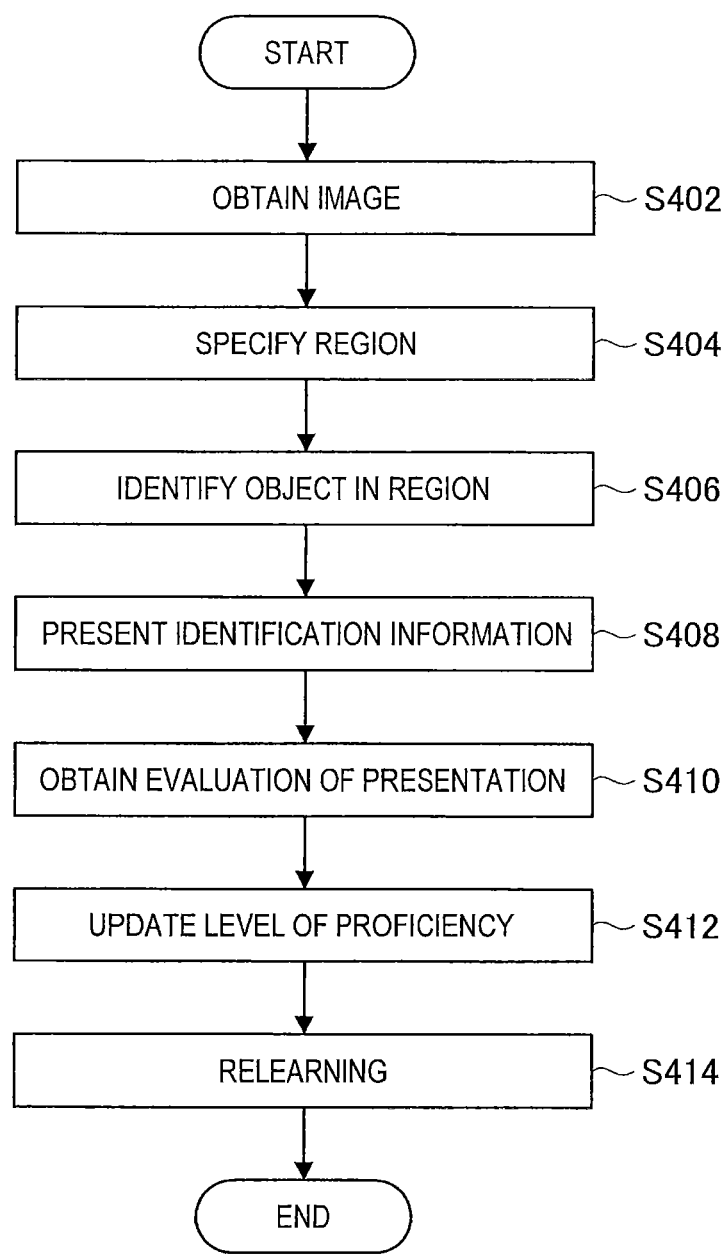
FIG. 44 is a flowchart showing an operation of the information processing device of this embodiment.

Next, a series of operations of the information processing system 1' of this embodiment will be described with reference to FIG. 44. FIG. 44 is a flowchart showing an operation of the information processing device of this embodiment.

(Step S402)

The image obtaining unit 102 obtains an image captured by the image capture unit 202. The image obtaining unit 102 outputs the obtained image to the object extraction unit 104.

(Step S404)

The object extraction unit 104 obtains the image from the image obtaining unit 102. The object extraction unit 104 extracts a region having a specific shape or a characteristic color component or texture, which is included in the obtained image, as a region of an object. For each of the extracted regions, the object extraction unit 104 generates region data indicating the region. The object extraction unit 104 outputs the obtained image, and the region data corresponding to the regions extracted from the image, to the correctness determination unit 108.

(Step S406)

The correctness determination unit 108 obtains the image, and the region data corresponding to the regions extracted from the image, from the object extraction unit 104. The correctness determination unit 108 specifies each of the regions set in the obtained image based on the obtained region data.

After having specified a region in the image, the correctness determination unit 108 identifies an object in the specified region. Specifically, the correctness determination unit 108 checks a feature amount determined from each region in the image against feature amounts which are previously stored for respective object classes, to calculate the identification scores d13 of the object included in the region for the respective object classes.

The correctness determination unit 108 outputs the obtained image, the region data corresponding to the regions extracted from the image, and the identification scores d13 calculated for each of the objects in the regions, to the extraction unit 114.

The extraction unit 114 obtains the image, the region data corresponding to the regions extracted from the image, and the identification scores d13 calculated for each of the objects in the region, from the correctness determination unit 108.

For each object, the extraction unit 114 looks up the identification scores d13 corresponding to the respective object classes indicated by the classes d12 to find any object class for which the identification score d13 has a value higher than or equal to the predetermined threshold.

If an object class for which the identification score d13 has a value higher than or equal to the predetermined threshold has been found, the extraction unit 114 extracts the co-occurrence probability data d14 corresponding to the found object class from the co-occurrence probability data storage unit 116.

The extraction unit 114 outputs the obtained image, the region data corresponding to the regions extracted from the image, the identification scores d13 of each of the objects in the regions, and the extracted co-occurrence probability data d14, to the estimation unit 118.

The estimation unit 118 obtains the image, the region data corresponding to the regions extracted from the image, the identification scores d13 of each of the objects in the regions, and the extracted co-occurrence probability data d14, to the extraction unit 114.

For each of the obtained pieces of region data, the estimation unit 118 multiplies the identification scores d13 of the object by the co-occurrence probability data d14 corresponding to an object in a region indicated by another piece of region data, to calculate new identification scores d13'. After having calculated the identification scores d13', the estimation unit 118 estimates an object in a region indicated by the region data based on the calculated identification scores d13'. At this time, the estimation unit 118 may select an object having the highest identification score d13' as the estimation result. If there is not the co-occurrence probability data d14 corresponding to an object in a region indicated by another piece of region data, the estimation unit 118 may use the identification scores d13 corresponding to the object in the region indicated by that region data as the identification scores d13'.

After having estimated an object, the estimation unit 118 calculates the level of proficiency in identifying the estimated object. As a specific example, the estimation unit 118 may calculate the number of pieces of sample data for identifying the estimated object, and based on the number of the calculated pieces of sample data, determine the level of proficiency.

For each of the obtained pieces of region data, the estimation unit 118 associates identification information indicating the estimation result of the object and information indicating the calculated level of proficiency. The estimation unit 118 outputs the obtained image, and the region data corresponding to the regions extracted from the image, to the display control unit 120.

(Step S408)

The display control unit 120 obtains the image, and the region data corresponding to the regions extracted from the image, from the estimation unit 118. The display control unit 120 displays the obtained image on the display unit 206.

The display control unit 120 also superimposes the regions based on the obtained region data on top of the image displayed on the display unit 206.

Next, the display control unit 120 extracts the identification information with which each piece of region data has been associated and the level of proficiency. The display control unit 120 generates the result presentation portion v610 for each piece of region data based on the extracted identification information and proficiency level, and associates the corresponding region data with the result presentation portion v610. Thereafter, the display control unit 120 generates the result presentation portion v61 which presents the result presentation portions v610 generated for the respective pieces of region data, and displays the result presentation portion v61 on the display unit 206.

(Step S410)

Here, it is assumed that the user U1 has operated the affirmative button v64a or the negative button v64b presented for each of the result presentation portions v610 for the respective pieces of region data, using the operation unit 204. In this case, for each piece of region data, the identification information specification unit 112 obtains information indicating the region data, identification information of objects presented as the estimation results v63 in the result presentation portions v610, and the results of determination based on the affirmative button v64a or the negative button v64b. The identification information specification unit 112 outputs the information indicating region data, the identification information of an object, and the determination result, which have been obtained for each piece of region data, from the extraction unit 114.

(Step S412)

The extraction unit 114 obtains the information indicating the region data, the identification information of the object, and the determination results, for each piece of region data, from the identification information specification unit 112. For each piece of region data, the extraction unit 114 may look up the determination result and the identification information of the object, and if there is the determination result based on the negative button v64b, newly obtain the co-occurrence probability data d14 corresponding to the identification information associated with the determination result based on the affirmative button v64a. In this case, the estimation unit 118 can obtain the newly obtained co-occurrence probability data d14 from the extraction unit 114, and recalculate the identification scores d13' for an object for which the estimation result has been negated based on the negative button v64b, to present a new estimation result.

The updating unit 122 obtains the image in which the regions indicated by the pieces of region data have been set, and the pieces of region data, from the estimation unit 118, for example. For each piece of region data, the updating unit 122 also obtains the information indicating the region data, and the identification information of the object, and the determination result, which are output from the identification information specification unit 112. At this time, the updating unit 122 may obtain the information indicating the region data, the identification information of the object, and the determination result from the identification information specification unit 112 directly or via the extraction unit 114 and the estimation unit 118.

Based on the obtained information indicated by the region data, the updating unit 122 specifies the corresponding piece of region data, and associates the specified piece of region data with the identification information and determination result of an object associated with the information indicated by the specified piece of region data.

The updating unit 122 stores the obtained image, the region data corresponding to the regions set in the image, the identification information of the objects, and the determination results in association with each other, as sample data, in the feature amount data storage unit 110 and the co-occurrence probability data storage unit 116.

(Step S414)

Thus, the identification scores d13 and the co-occurrence probability data d14 are calculated based on the newly added sample data in addition to the previously stored sample data. In other words, sample data for calculating the identification scores d13 and the co-occurrence probability data d14 is updated, resulting in an improvement in the accuracy of the identification scores d13 and the co-occurrence probability data d14.

[2. 3. Summary]

As described above, in the information processing system 1' of this embodiment, the result of estimation of identification information indicating an object in a screen is presented to the user U1, the result of determination of whether or not the estimation result is correct is obtained, and sample data based on the obtained determination result is accumulated. Thus, the information processing system 1' of the second embodiment performs relearning by accumulating sample data based on the result of determination of whether or not the result of estimation of an object is correct, which is performed by the user U1, resulting in an improvement in the accuracy of the identification scores d13 or the co-occurrence probability data d14, i.e., the accuracy of identification of an object.

<5. Hardware Configuration>

An embodiment of the present disclosure has been described above. The above information process performed by the information processing device 10 is achieved by cooperation with the following hardware of the information processing device 10.

Figure 45:
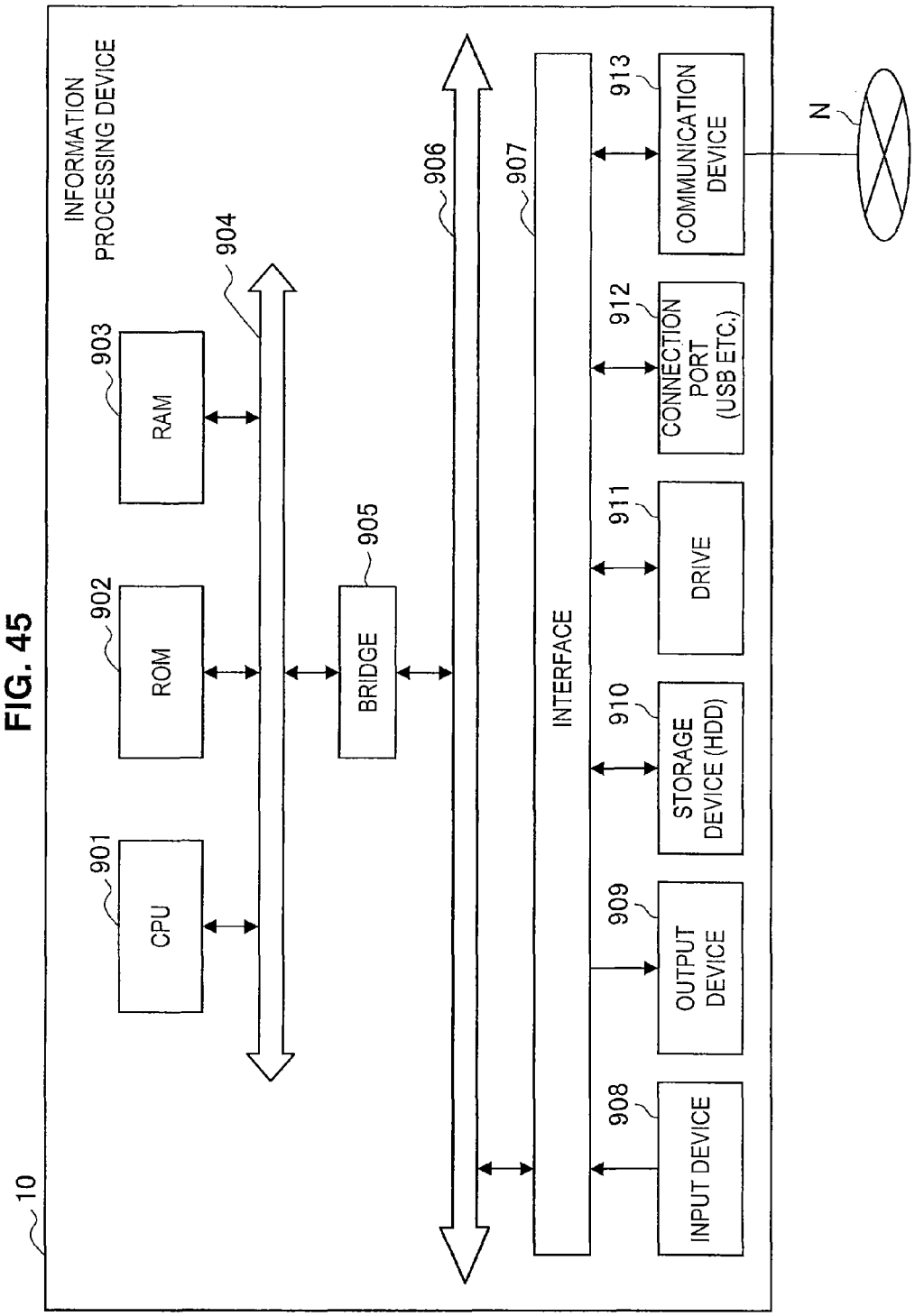
FIG. 45 is a diagram showing an example hardware configuration of an information processing device according to an embodiment of the present disclosure.

FIG. 45 is an explanatory diagram showing an example hardware configuration of the information processing device 10. As shown in FIG. 45, the information processing device 10 includes a central processing unit (CPU) 901, a read only memory (ROM) 902, a random access memory (RAM) 903, an input device 908, an output device 910, a storage device 911, a drive 912, and a communication device 915.

The CPU 901 functions as a calculation processing device and a control device to control the overall operation of the information processing device 10 according to various programs. The CPU 901 may be a microprocessor. The ROM 902 stores programs, calculation parameters, etc. which are used by the CPU 901. The RAM 903 temporarily stores programs used in execution by the CPU 901, parameters changed when necessary during the execution, etc. These components are connected together by a host bus including a CPU bus etc.

The input device 908 includes an input unit for allowing the user to input information, such as a button, a switch etc., an input control circuit which generates an input signal based on the user's input and outputs the input signal to the CPU 901, etc. The user of the information processing device 10 can instruct the information processing device 10 to perform a process by operating the input device 908.

The output device 910 includes, for example, a display device, such as a liquid crystal display (LCD) device, an organic light emitting diode (OLED) device, a lamp, etc. The output device 910 also includes an audio output device, such as a loudspeaker, a headphone, etc. For example, the display device displays a captured image, a generated image, etc. On the other hand, the audio output device converts audio data etc. into sound, and outputs the sound.

The storage device 911 is a device for storing data which is configured as an example storage unit of the information processing device 10 of this embodiment. The storage device 911 may include a storage medium, a recording device which records data to the storage medium, a reading device which reads data from the storage medium, an erasure device which erases data from the storage medium, etc. The storage device 911 stores programs executed by the CPU 901 and various items of data.

The drive 912 is a reader/writer for a storage medium, and is internal or external to the information processing device 10. The drive 912 reads information from a removable storage medium mounted therein, such as a magnetic disk, an optical disk, a magneto-optical disk, a semiconductor memory, etc., and outputs the information to the RAM 903. The drive 912 can also write information to a removable storage medium.

The communication device 915 is, for example, a communication interface including a communication device for connecting to a network N, etc. In particular, the communication device 915 of the embodiment of the present disclosure includes a wireless (local area network) LAN-compliant communication device. Note that the communication device 915 may include a long term evolution (LTE)-compliant communication device, or a wired communication device which performs communication via a wire.

Note that the network N is a wired or wireless transmission channel for information transmitted from a device connected to the network N. For example, the network N may include a public network such as the Internet, a telephone network, a satellite communication network, etc., various local area networks (LANs) such as Ethernet (registered trademark) etc., various wide area networks (WANs), etc. The network N may also include a dedicated network such as the Internet protocol-virtual private network (IP-VPN) etc.

The hardware configuration of FIG. 45 is only for illustrative purposes. The present disclosure is not limited to the hardware configuration of FIG. 45. Any hardware configuration may be employed that can achieve the operation of the information processing device 10 of the embodiment of the present disclosure.

A program for causing hardware such as a CPU, a ROM, a RAM etc. which are included in a computer to provide functions similar to those of components of the above information processing device can be created. A computer-readable storage medium storing the program may be provided.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:

an image obtaining unit configured to obtain an image including a plurality of objects; and a display control unit configured to, after an operation has been performed on a first object of the plurality of objects, control identification information associated with a second object, the identification information indicating the second object.

(2) The information processing device according to (1), wherein
the display control unit controls the identification information based on a result of identification of the first object on which the operation has been performed.
(3) The information processing device according to (2), wherein
the operation performed on the first object is an operation of specifying a region corresponding to the first object in the image.
(4) The information processing device according to (1), wherein
the operation performed on the first object is an operation of setting identification information indicating the first object.
(5) The information processing device according to any one of (1) to (4), further including:
an identification information obtaining unit configured to obtain one or more candidates for identification information indicating the second object, wherein
after the operation has been performed on the first object, the display control unit displays, as the identification information, a candidate or candidates estimated from the one or more candidates.
(6) The information processing device according to (5), wherein
the display control unit displays one or more candidates for identification information indicating the second object in association with the second object, and after the operation has been performed on the first object, updates the identification information indicating the second object based on identification information indicating a candidate or candidates estimated from the one or more candidates.
(7) The information processing device according to (5) or (6), wherein
the identification information obtaining unit obtains the one or more candidates for identification information indicating the first object, and
after one candidate has been selected from the one or more candidates for the identification information indicating the first object, identification information indicating the second object is estimated from the one candidates for the identification information indicating the second object, based on the one candidate that has been selected.
(8) The information processing device according to any one of (5) to (7), wherein
the identification information obtaining unit obtains one or more candidates for identification information indicating the object included in each of a plurality of regions set in the image.
(9) The information processing device according to (8), wherein
the identification information obtaining unit obtains a candidate or candidates for identification information indicating the object extracted based on a result of identification of the object included in the region.
(10) The information processing device according to (9), wherein
when the region has been updated, the identification information obtaining unit obtains a candidate or candidates for identification information indicating the object extracted based on a result of identification of the object included in the region that has been updated.
(11) The information processing device according to any one of (8) to (10), wherein
at least one of the plurality of regions is specified based on an image analysis process performed on the image.
(12) The information processing device according to (11), wherein
the object is a dish, and
the at least one region is specified based on a result of recognition of a container in which the dish is served.
(13) The information processing device according to (11), wherein
the object is a human, and
the at least one region is specified based on a result of recognition of a face of the human.
(14) The information processing device according to any one of (5) to (13), wherein
the identification information obtaining unit obtains one or more candidates for the identification information from an external server.
(15) The information processing device according to any one of (5) to (14), wherein
the identification information indicating the second object is estimated based on a co-occurrence probability indicating a probability with which an object indicated by each of one or more candidates for the identification information co-occurs with the first object.
(16) The information processing device according to any one of (5) to (15), wherein
the display control unit displays a correctness of a result of estimation of identification information indicating the second object in an identifiable fashion.
(17) The information processing device according to any one of (5) to (16), further including:
an image capture unit configured to capture the image.
(18) An information processing system including:
a terminal including a display unit; and
a server including an image obtaining unit configured to obtain an image including a plurality of objects, and a display control unit configured to display the image on the display unit, wherein
after an operation has been performed on a first object of the plurality of objects, the display control unit controls identification information associated with a second object, the identification information indicating the second object.
(19) A non-transitory computer-readable storage medium having a program stored therein, the program causing a computer to execute:
obtaining an image including a plurality of objects; and
after an operation has been performed on a first object of the plurality of objects, controlling identification information associated with a second object, the identification information indicating the second object.

What is claimed is:
1. An information processing device comprising:
circuitry configured to
obtain an image including a plurality of objects;
after an operation has been performed on a first object of the plurality of objects, control identification information associated with a second object based on the operation performed on the first object, the second object being contained by a container of the second object, the second object and the container of the second object being discrete from the first object, and the identification information indicating the second object; and
obtain one or more candidates for the identification information indicating the second object, wherein
at least one region of a plurality of regions set in the image is specified based on an image analysis process performed on the image and based on a result of recognition of the container of the second object.

2. The information processing device according to claim 1, wherein the circuitry is further configured to
control the identification information based on a result of identification of the first object on which the operation has been performed.

3. The information processing device according to claim 2, wherein
the operation performed on the first object is an operation of specifying a region in the image corresponding to the first object.

4. The information processing device according to claim 1, wherein
the operation performed on the first object is an operation of setting identification information indicating the first object.

5. The information processing device according to claim 1, wherein the circuitry is further configured to
control a display to display, as the identification information, a candidate or candidates estimated from the one or more candidates, after the operation has been performed on the first object.

6. The information processing device according to claim 5, wherein the circuitry is further configured to
control the display to display the one or more candidates for the identification information indicating the second object in association with the second object, after the operation has been performed on the first object, and
update the identification information indicating the second object based on identification information indicating a candidate or candidates estimated from the one or more candidates.

7. The information processing device according to claim 5, wherein the circuitry is further configured to
obtain one or more candidates for identification information indicating the first object, and
estimate identification information indicating the second object from the one or more candidates for the identification information indicating the second object, based on one candidate that has been selected from the one or more candidates for the identification information indicating the first object.

8. The information processing device according to claim 5, wherein the circuitry is further configured to
obtain one or more candidates for identification information indicating respective objects of the plurality of regions set in the image.

9. The information processing device according to claim 8, wherein the circuitry is further configured to
obtain a candidate or candidates for the identification information indicating the respective objects of the plurality of regions based on a result of identification of one of the objects of the plurality of regions.

10. The information processing device according to claim 9, wherein the circuitry is further configured to
obtain the candidate or candidates for the identification information indicating the respective objects of the plurality of regions based on a result of identification of the one of the objects of the plurality of regions that has been updated, when a region of the one of the objects of the plurality of regions has been updated.

11. The information processing device according to claim 8, wherein
the second object is a dish, and
the at least one region is specified based on the result of recognition of the container of the second object in which the dish is served.

12. The information processing device according to claim 5, wherein the circuitry is further configured to
obtain the one or more candidates for the identification information from an external server.

13. The information processing device according to claim 5, wherein
the identification information indicating the second object is estimated based on a co-occurrence probability indicating a probability with which an object indicated by each of the one or more candidates for the identification information co-occurs with the first object.

14. The information processing device according to claim 5, wherein the circuitry is further configured to
control the display to display a correctness of a result of estimation of the identification information indicating the second object in an identifiable fashion.

15. The information processing device according to claim 1, further comprising:
an image sensor configured to capture the image.

16. An information processing system comprising:
a terminal including a display; and
a server including circuitry configured to
obtain an image including a plurality of objects,
control the display to display the image, and
obtain one or more candidates for identification information indicating a second object, wherein
after an operation has been performed on a first object of the plurality of objects, the circuitry of the server controls identification information associated with the second object based on the operation performed on the first object, the second object being contained by a container of the second object, the second object and the container of the second object being discrete from the first object, the identification information indicating the second object, and
at least one region of a plurality of regions set in the image is specified based on an image analysis process performed on the image and based on a result of recognition of the container of the second object.

17. A non-transitory computer-readable storage medium having a program stored therein, the program causing a computer to execute:
obtaining an image including a plurality of objects;
after an operation has been performed on a first object of the plurality of objects, controlling identification information associated with a second object based on the operation performed on the first object, the second object being contained by a container of the second object, the second object and the container of the second object being discrete from the first object, and the identification information indicating the second object;
obtaining one or more candidates for identification information indicating the second object; and
setting at least one region of a plurality of regions in the image based on an image analysis process performed on the image and based on a result of recognition of the container of the second object.

18. The information processing device according to claim 15, wherein the image sensor is a camera.

* * * * *